United States Patent [19]

Johnson, Jr.

[11] Patent Number: 4,510,594

[45] Date of Patent: Apr. 9, 1985

[54] LOOP-AROUND TESTING FACILITIES FOR A MULTILINE PROTOCOL CONTROLLER

[75] Inventor: James M. Johnson, Jr., Glen Ellyn, Ill.

[73] Assignee: AT&T Bell Laboratories, Murray Hill, N.J.

[21] Appl. No.: 481,055

[22] Filed: Mar. 31, 1983

[51] Int. Cl.³ .............................................. H04J 3/14
[52] U.S. Cl. ......................................... 370/15; 370/60
[58] Field of Search ................... 370/13, 14, 15, 60, 370/94

[56] References Cited

U.S. PATENT DOCUMENTS

| | | | |
|---|---|---|---|
| 3,823,269 | 7/1974 | Saito | 370/14 |
| 4,022,979 | 5/1977 | Smith | 370/14 |
| 4,149,038 | 4/1979 | Pitroda et al. | 370/14 |
| 4,354,263 | 10/1982 | Bordry et al. | 370/60 |
| 4,380,810 | 4/1983 | Canniff | 370/15 |
| 4,402,075 | 8/1983 | Bargeton et al. | 370/15 |
| 4,453,247 | 6/1984 | Suzuki et al. | 370/60 |

FOREIGN PATENT DOCUMENTS 106259 7/1982 Japan ..................... 370/94

*Primary Examiner*—Douglas W. Olms
*Assistant Examiner*—Kenneth I. Rokoff
*Attorney, Agent, or Firm*—John C. Moran

[57] ABSTRACT

A communication method and digital multi-customer data interface for interconnecting a number of customer terminals to a main packet switching network of a local area data transport system that provides data communication services such as interactive video text service between data service vendors and customers. The digital multi-customer interface utilizes a main processor, control circuit, and multi-customer protocol controller to implement the protocol functions for the communication of packets and control information over individual serial transmission paths. The multi-customer protocol controller comprises a control processor and a formatter circuit for synchronously communicating packets for a plurality of customer terminals via customer line units and customer lines. The control processor performs byte-to-packet and packet-to-byte functions between the main processor and the formatter circuit. The formatter circuit is shared in common by all of the customer lines and performs the functions of assembling and disassembling data bytes from and to individual data bit signals, performing error cyclic redundancy checks and generations, performing flag recognition and generations, and performing bit stuffing and unstuffing. The control circuit handles communication of all control and status information between the main processor and the customer line units. The control buffer periodically transmits the control information received from the main processor to all of the customer units and receives back from them status information which is stored for later use by the main processor. The main processor has the capability of fault detection within the multi-customer protocol controller by the transmission of a test packet. The multi-customer protocol controller is responsive to the test packet to loop it back to the main processor while concurrently processing data packets.

11 Claims, 40 Drawing Figures

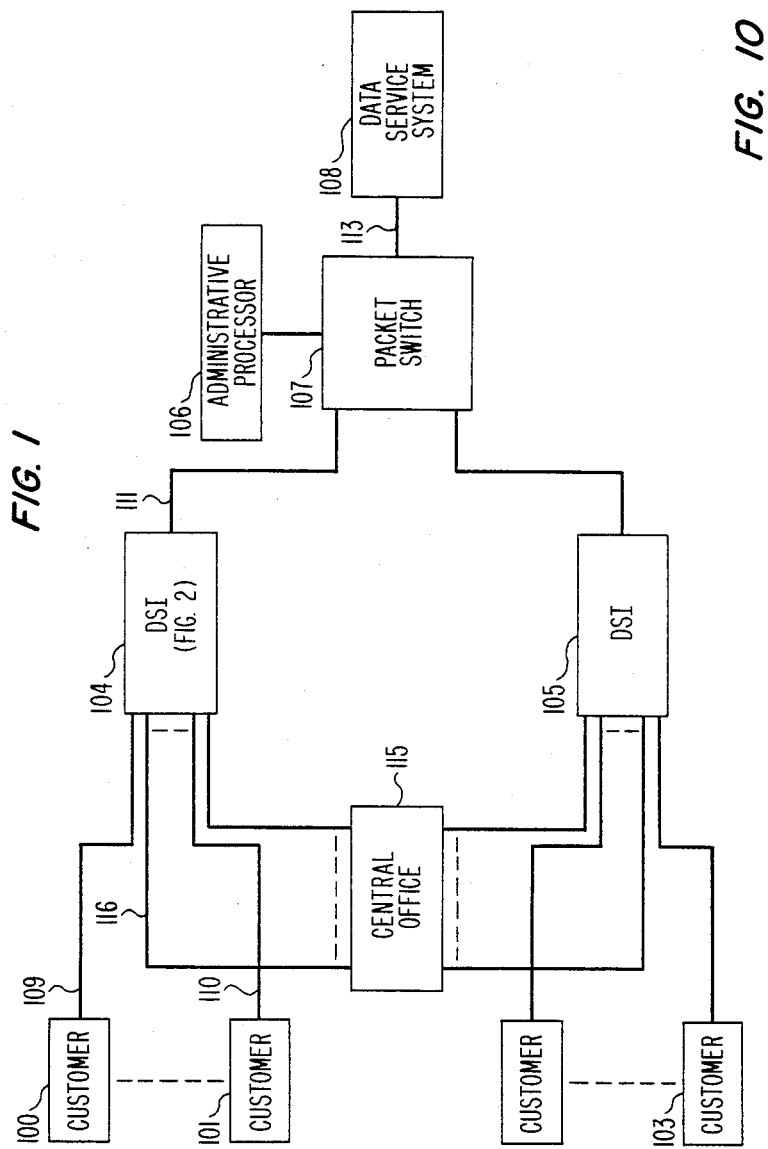

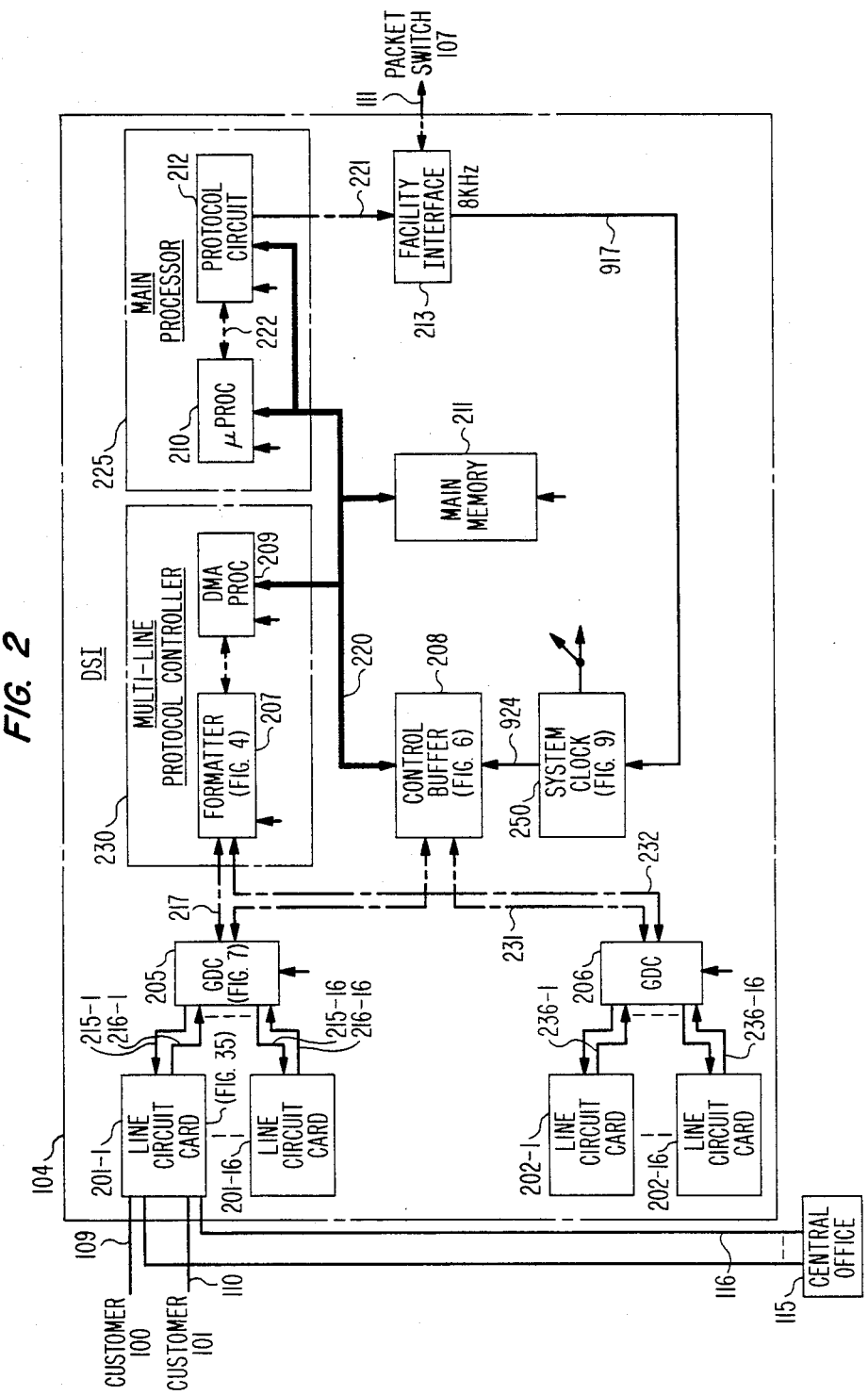

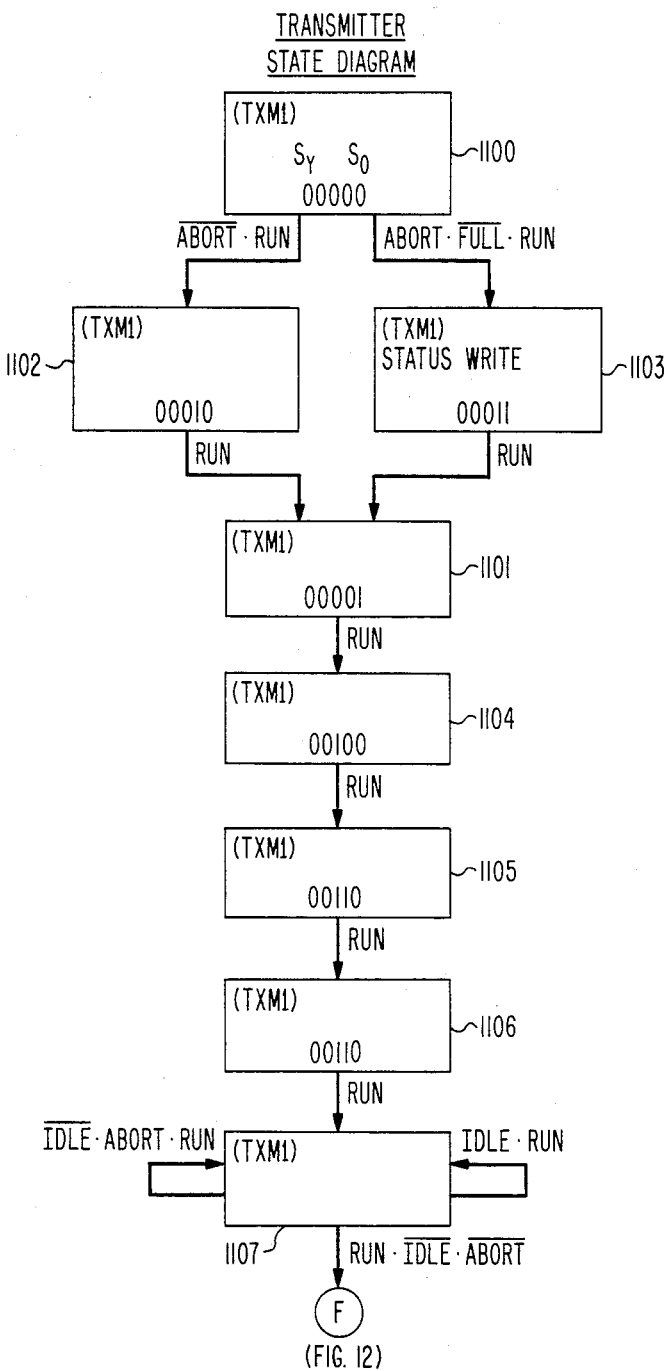

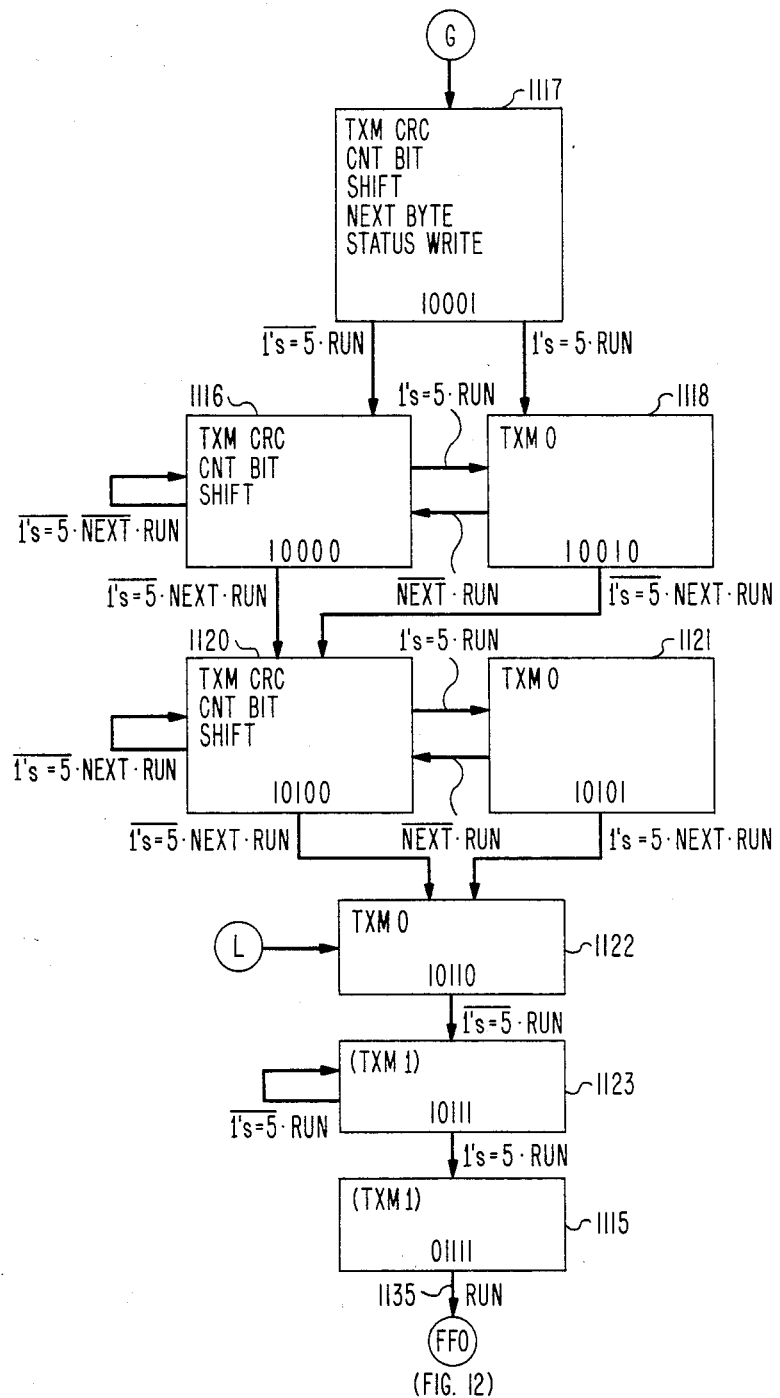

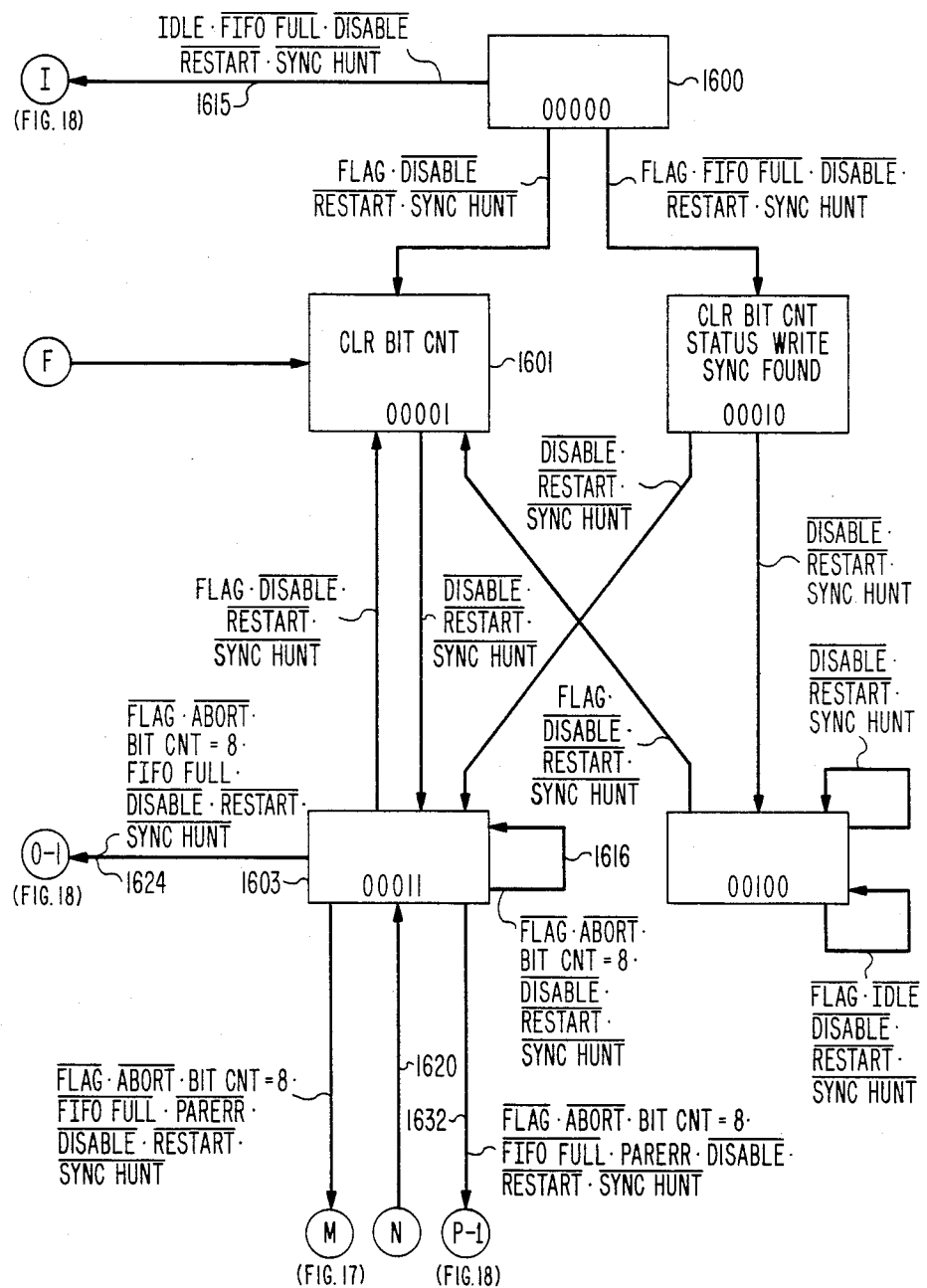

LOOP-AROUND TESTING FACILITIES FOR A MULTILINE PROTOCOL CONTROLLER

CROSS-REFERENCE TO RELATED APPLICATIONS

Concurrently filed herewith and assigned to the same assignee as this application are:
J. Chu, J. G. Hinch, J. M. Johnson, Jr., H. J. Kafka, D. J. Stelte, "Digital Multi-Customer Data Interface", Ser. No. 481057;
M. G. Hinch, "A Shared Memory With Two Distinct Addressing Structures", Ser. No. 481,056;
K. A. Hedlund, "Multiline Error Detection Circuit", Ser. No. 481058.

TECHNICAL FIELD

This invention relates to a method and testing facilities for maintaining the integrity of a packet switching system. The invention particularly pertains to a procedure and facilities for localizing specific faulty units by the loop-around testing of packets within and through a so called "multi-customer" circuit which is shared by a plurality of customer terminal equipment in an assembly and disassembly of bytes and packets of information.

BACKGROUND OF THE INVENTION

In packet switching systems having a large number of customers, it is customary to have the customers interconnected to a main packet switching network via digital subscriber interfaces (also called packet concentrators.) Each digital subscriber interface accepts packets from the attached customers via low-speed transmission lines and then retransmits those packets to the main packet switching network via a high-speed transmission link. Prior art systems have utilized multi-customer formatter circuits to assemble individual asynchronous data signals received from a plurality of customers into bytes that are later formed into packets by a program controlled processor and also to accept bytes of asynchronous data from the program controlled processor and to transmit those bytes as individual data signals to the destination customers. It is known in the prior art to loop-around packets for test purposes within a packet switching system. A problem in such loop-around test arrangements is the difficulty in localizing or isolating a failing structural element of a multi-customer formatter involved in a loop-around test. Another deficiency is that the time required to initialize such a customer interface unit greatly impacts the effectiveness of such a maintenance technique.

SUMMARY OF THE INVENTION

In an illustrative method and structural embodiment, a departure in the art is achieved in a packet switching system by a multi-customer line byte and packet formatter having its own processor cooperating with a main processor in controlling a looping of packets of information from a transmit section of that formatter to its receive section for transmission back to the main processor and a specific line. The discovery is the processing of test packets for a particular customer line under test while concurrently processing the communication of information for other customer lines through the shared or common equipment of the multi-customer formatter. Among the features of the invention are the provision of a loop-around control memory and a transmit bit memory for the processing of test packets between transmit and receive sections of the multi-customer formatter from and to the main processor and the processor of the formatter. Another aspect of the invention is that the control memory has a memory location per customer line for designating loop-around testing which allows for a plurality of simultaneous loop-around tests for a plurality of customer lines served by the same multi-customer formatter.

The specific illustrative embodiment detects malfunctions within a multi-customer protocol formatter by the transmission of specific test packets to the formatter processor from a main processor. The main processor controls the packet switching system by initially transmitting the test packet to the formatter which then internally loops the test packet from its receive section to its transmit section and then back to the main processor. Upon receiving the test packet, the main processor verifies that the packet contains the same data as that which was originally transmitted. A feature of the invention is that, the formatter includes a program controlled processor which is responsive to both information and loop-around test packets received from the main processor for disassembling those packets into bytes and transferring the bytes to the formatter's transmit section which in turn advantageously processes the bytes into bit signals for sequential transmission to each of the customers. The transmit section advantageously comprises a transmit bit memory for storing the bit signals transmitted to the customers. The receive section of the formatter is responsive to bit signals (information or loop-around bit signals) to form those signals into bytes each associated with a particular customer line and to transfer those bytes to the formatter processor for packetizing and conveyance to the main processor.

Upon receipt of a test packet for one of the customer lines under loop-around test, the formatter processor sends a loop signal for the set-up and maintenance control of the loop-around testing to a command memory associated with the receive section. Each time the receive section is to process bit signals for that particular customer, it selects the data stored in the transmit bit memory rather than data from the customer line. The selected data is formed into bytes by the formatter and then translated into a reformed test packet by the formatter processor for transfer to the main processor. Upon receiving the reformed test packet, the main processor verifies that the data has been successfully transmitted through the formatter.

Among the other specific features of the invention is the provision of a data selector controlled by the loop signal being read out of the command memory to select data from the transmit bit memory for use by the receive section during the time for processing data for the customer line under test. The provision of the data selector in the formatter circuit facilitates the concurrent processing and control of information and test packets.

The novel method tests a multi-customer formatter circuit that comprises a formatter processor and a formatter circuit. The latter is connected to a plurality of customer interface units which in turn are connected via customer access lines to customer terminals. The formatter circuit has a receive circuit for receiving bit signals from the customer interface units to form these bit signals into receive bytes associated with individual ones of the units and a transmit circuit responsive to transmit byte signals also associated with individual ones of the units received from the formatter processor for disassembling these transmit bytes into transmit bit signals for transmission to the units and to store these signals in a transmit bit memory. The method involves the following steps. The main processor generates a test packet identified with a particular unit which is under test and transfers this test packet to the formatter processor. The latter in response to the test packet transfers the test packet to the formatter circuit one byte at a time and generates a loop signal that is also transmitted to the formatter circuit. In response to the test bytes, the formatter circuit transmits these bytes to the particular customer unit one test bit signal at a time and also stores these signals in the transmit bit memory. During the time for processing signals for that particular customer unit, the stored test bit signals are transferred from the transmit bit memory to the receive circuit in response to the loop signal, and the receive circuit forms these signals into reformed test bytes for transfer to the main processor as a test packet via the formatter processor. The main processor verifies that the data contained in the original test packet is the same as that in the test packet received from the formatter processor.

BRIEF DESCRIPTION OF THE DRAWING

A packet switching system is disclosed in FIGS. 1 through 35. The present invention is particularly disclosed in FIGS. 2, 10A, 10B, 15A, and 15B. In general, system elements, when first introduced on a figure, are each designated with a number that uses the figure number as the most significant digits of the element number.

FIG. 1 is a block diagram of an illustrative data transport system;

FIG. 2 is a detailed block diagram of data subscriber interface 104;

FIG. 3 shows the manner in which certain of the figures should be arranged to show the specific illustrative embodiment of the invention;

FIG. 10 shows the manner in which certain of the figures should be arranged to show the specific illustrative embodiment of the invention;

FIGS. 10 through 14 are state diagrams of transmit state machine 409;

FIG. 15 shows the manner in which certain of the figures should be arranged to show the specific illustrative embodiment of the invention;

FIGS. 16 through 18 are state diagrams of receive state machine 404;

DETAILED DESCRIPTION

Figure 4:
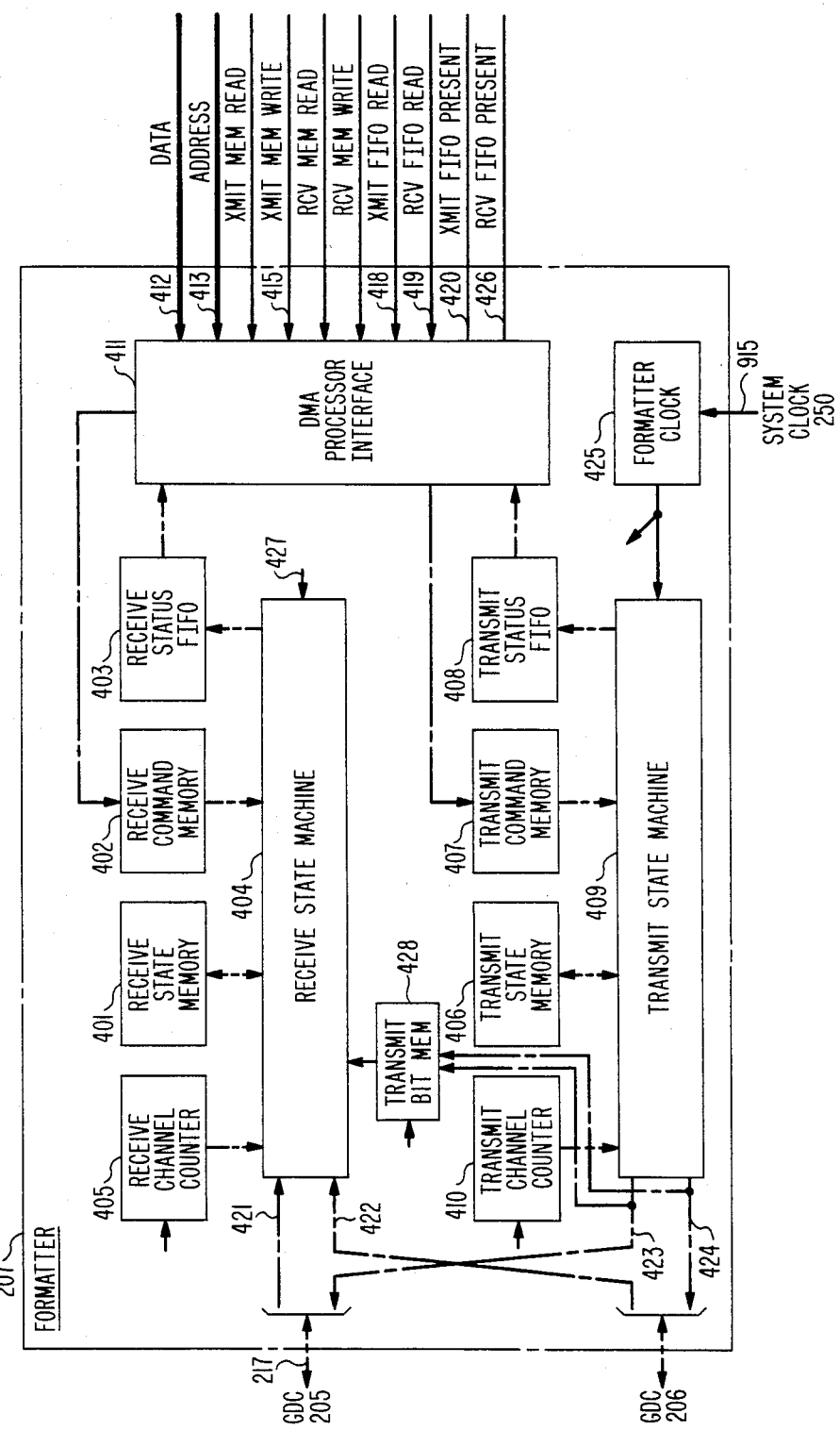
FIG. 4 is a detailed block diagram of formatter 207.

FIG. 1 shows an illustrative data transport system having a plurality of data subscriber interfaces 104 and 105 serving a plurality of customers, such as customer 100 or 103. The customer transmission paths can simultaneously be used for normal voice communications via central office 115, and for data communication via data subscriber interface 104 or 105. The data transport system provides data communication services such as interactive video text services between up to 128 customers per data subscriber interface, and data service system 108. All data transfer between the individual customers and data service system 108 is done via packets. Packets from the individual customers are multiplexed by data subscriber interface 104 or 105 and sent to data service system 108 via packet switch 107 on cable 113. Packets from data service system 108 are transferred to data subscriber interface 104 or 105 via packet switch 107 where they are demultiplexed and distributed to the individual customers. Data subscriber interface 104 interfaces with packet switch 107 via cable 111. Administrative processor 106 provides overall system management of the data subscriber interfaces, such as recent changes, maintenance, traffic measurement, and billing.

The following description first presents a general description of the components constituting the data transport system by way of an example describing a data transfer between customer 100 and data service system 108. Next, a description of data subscriber interface 105 is presented. Then, a brief resume of the functional operations of main processor 225 and multi-protocol controller 230 of FIG. 2 in the transmission of test packets for testing controller 230 is given to provide a focus on the invention. Finally, a detailed description of the components constituting data subscriber interface 105 is given.

Consider an example of data transfer between customer 100 and data service system 108. Customer 100 first makes a request for service to data subscriber interface 104 via cable 109. This request causes data subscriber interface 104 to generate a call setup packet, which contains the customer's physical address on data subscriber interface 104. This call setup packet is multiplexed with other packets from other customers, such as customer 101, and forwarded to packet switch 107 via cable 111. Packet switch 107 translates the address contained in the call setup packet to an internal address, which is the address of the desired service of data service system 108. Services provided by data service system 108 can include home information services, such as electronic shopping, electronic news service, etc. Once data service system 108 receives the call setup packet, it determines whether or not the requested service is available. If the requested service is not available, a call reject packet is generated and returned to customer 100. If the requested service is available, data service system 108 generates a call accept packet, as defined by the X.25 protocol, which it forwards to data subscriber interface 104 via packet switch 107. Data subscriber interface 104 then returns a confirmation packet to customer 100; this informs customer 100 that the call has been established. Once the call has been established, a virtual circuit has been set up by data subscriber interface 104, packet switch 107, and data service system 108 for the transfer of data packets between customer 100 and data service system 108. Either customer 100 or data service system 108 can terminate the call. To do this, either customer 100 or data service system 108 generates an end of call packet, which is sent through the data path, causing the path to be torn down.

Data subscriber interface 104 is shown in greater detail in FIG. 2. The other data subscriber interfaces are similar to data subscriber interface 104. In the receive direction, data subscriber interface 104 receives packets at a 4.8 kb/sec rate from each of the 128 customers, and transmits these packets at a 56 kb/sec rate to data service system 108 via cable 113 and packet switch 107. In the transmit direction, data subscriber interface 104 receives packets from data service system 108 via packet switch 107, and distributes the packets to the correct customers. For the purpose of this description, transmit data refers to data coming from packet switch 107 and sent to the individual customers; receive data refers to the data originating from the customers and sent to packet switch 107. The following description first describes the receive data flow from customer 100 to packet switch 107. Then, the transmit data flow from packet switch 107 to customer 100 is described.

Customer 100 is connected to line circuit card 201-1 via cable 109, which is the normal telephone drop. In addition to customer 100, line circuit card 201-1 also has connected to it up to three other customers, such as customer 101, which is connected via cable 110. Line circuit card 201-1, which is similar to the other line circuit cards, such as line circuit card 201-16, provides filtering for each of the four customers, which separates the data signals from the normal voice signals. As illustrated in FIG. 1, the voice signals are forwarded to central office 115 via cable 116. Line circuit card 201-1 combines receive data and parity bits from the four customers into a 38.4 kb/sec multiplexed serial bit stream, which is passed to group distributor circuit 205 via conductor 216-1. Group distributor circuit 205 receives a similar multiplexed serial bit stream from 15 other line circuit cards 201-2 through 201-16 via conductors 216-2 through 216-16. Line circuit card 202-1 receives data from up to four customers, combines this data with parity into a 38.4 kb/sec bit stream, and passes it to group distributor circuit 206 via conductor 236-1. Group distributor circuit 206 receives a similar multiplexed serial bit stream from 15 other line circuit cards 202-2 through 202-16 via conductors 236-2 through 236-16.

The serial bit stream from line circuit card 201-1, which includes the data from customer 100, is passed to group distributor circuit 205 via conductor 216-1. Group distributor circuit 205 also receives a similar bit stream from the other 15 line circuit cards. For example, group distributor circuit 205 receives a similar multiplexed bit stream from line circuit card 201-16 via conductor 216-16. Group distributor circuit 205 receives these 16 multiplexed bit streams in parallel and combines them into two 307.2 kbit/sec serial bit stream, one containing data and one containing parity, which are forwarded to formatter 207 via cable 217. Similarly, group distributor circuit 206 forwards its two 307.2 kbit/sec serial bit streams to formatter 207 via cable 232.

The two serial bit streams that are forwarded to formatter 207 contain the customer data for all 128 customers. This serial bit stream is divided into 128 time slots; each time slot contains a single data bit for one customer. Formatter 207 contains a receive state machine that continually samples each of the time slots and is thus able to identify and process each data bit from each of the 128 customers as that data bit becomes available. Formatter 207 converts the incoming serial bit stream into bytes for each of the 128 customers. Additionally, formatter 207 performs some of the level 2 protocol functions of X.25 (CCITT 1976, amended 1980). These protocol functions change the incoming frames (which include flag fields at the beginning and end of the frame, and a CRC code which is calculated over the entire frame) into packets. For convenience, the word "packet" in this and all subsequent uses refers to a packet that also contains level 2 control and address information. It should be understood that the use of this word "packet" is not identical to the packet specified in the X.25 protocol. An exception to this is a reference to a packet that is transferred from microprocessor 210 to protocol circuit 212; this packet is a packet that is specified in the X.25 protocol. Formatter 207 performs some of the level 2 protocol functions; the rest of the protocol functions are performed by DMA processor 209 and main processor 225 and are described later. One protocol function performed by formatter 207 is calculating the CRC code of the incoming frame and checking the computed code with the CRC code included in the incoming frame. Formatter 207 then notifies main processor 225, via DMA processor 209, if the CRC code indicates an error. Formatter 207 also performs flag recognition, to determine the beginning and end of incoming frames; and it performs bit unstuffing to remove bits stuffed by the customer equipment. Bit stuffing is done so that a flag pattern (01111110) never appears in any portion of the frame except the flag field. Bit stuffing is done as follows. Each time the customer equipment detects a sequence of five "1's" in any portion of the frame except the flag field, it automatically stuffs a "0". This bit stuffing prevents the flag pattern from ever appearing anywhere in the frame except the flag field. Whenever formatter 207 detects a sequence of five "1's" followed by a "0", it removes the "0", which is the bit that was stuffed by the customer equipment.

After formatter 207 has assembled a byte from customer 100, it transfers the byte to DMA processor 209. DMA processor then writes the byte into a buffer in main memory 211 via direct memory access. The buffer in main memory 211 to which the byte is written is determined by DMA processor 209 reading a shared memory, contained in DMA processor 209. This shared memory has separate memory locations for each of the 128 customers. These shared memory locations are written by main processor 225 and are used to pass the buffer location in main memory 211 to which the data bytes are to be written. This process continues until formatter 207 detects the end of the packet and notifies DMA processor 209 that an entire packet has been received. After the entire packet has been written, DMA processor 209 notifies main processor 225, via a FIFO memory, that there is a packet assembled in main memory 211 that is ready to be transmitted to packet switch 107.

All transfer of data between DMA processor 209, main processor 225, main memory 211, and protocol circuit 212, which is contained in main processor 225, is via system bus 220. System bus 220 contains a separate data and address portion. The actual data transfer is via the data portion of the bus. The various memory locations to which data is written into and read from is under control of the address portion of system bus 220. In addition to the normal address and data, each portion of the bus also has parity bits associated with each data transfer. For a write operation, these parity bits are generated by the circuit that originates the write. For a read operation, these parity bits are generated by the circuit that is being read. For example, when DMA processor 209 writes data into main memory, DMA processor generates the associated parity bits for the data and address portions of system bus 220.

Once the packet has been written into main memory 211, main processor 225 adds the necessary header information and inserts a logical channel number. Microprocessor 210 then notifies protocol circuit 212 that there is a packet ready for transmission. Protocol circuit 212 reads the buffer that contains the packet, via direct memory access, and forms the packet into a frame, which it then transmits to packet switch 107 via facility interface 213 and cable 111. This transformation of the packet into a frame conforms to level 2 of the X.25 protocol. This includes handling level 2 sequence numbers and level 2 acknowledgements, inserting a flag pattern at the beginning and end of the frame, stuffing bits as required, and calculating and inserting a CRC field.

Main processor 225 comprises microprocessor 210 and protocol circuit 212. Microprocessor 210 provides control over system bus 220. This control consists of arbitrating over which of the circuits connected to system bus 220 has control of the bus at a given time. Microprocessor 210 also contains RAM and ROM memory, which are used for system initialization. Protocol circuit 212 performs the level 2 Link Access Procedure B (LAPB) of the X.25 protocol on the transmit and receive data. Additionally, it notifies microprocessor 210 each time it has transferred a packet into or out of main memory 211, via an interrupt on cable 222. Facility interface 213 provides a direct interface between packet switch 107 and data subscriber interface 104 over a 56 kb/sec data link.

Consider an example of transmit data flow from packet switch 107 to customer 100. A frame destined for customer 100 is transmitted from data service system 108 and passed via packet switch 107 before entering data subscriber interface 104 in a serial manner on cable 111, which is a 56 kb/s data link. This transmit frame passes to facility interface 213, which provides the control, clock, and data interface between packet switch 107 and the rest of data subscriber interface 104. The data and clock interface follow the V.35 standard (CCITT 1968, amended 1972 and 1976), and the control interface follows the RS-232 standard (EIA). The frame for customer 100 is then forwarded to the protocol circuit 212 portion of main processor 225 over cable 221. Protocol circuit 212 performs level 2 protocol of X.25 on the incoming frame, in order to convert the frame to a packet. These protocol functions include flag detection and removal, and bit unstuffing. Additionally, protocol circuit 212 calculates the CRC of the frame and compares it with the CRC value that was present in the CRC field of the incoming frame. This is done to verify that no errors were introduced into the packet during the transmission from packet switch 107 to data subscriber interface 104. As protocol circuit 212 is performing these protocol functions, it is writing the packet into main memory 211. The packet is written into an assigned buffer. Once the entire packet has been written into main memory 211, protocol circuit 212 notifies microprocessor 210 via cable 222.

Microprocessor 210 then performs level 3 of X.25 protocol on the packet; this includes determining the customer to which the packet is intended, by looking up the logical channel number in a table located in main memory 211. Once microprocessor 210 has assembled a packet, it places the packet length and the location of the packet in main memory 211 into shared memory 506 in DMA processor 209. This is done to inform DMA processor 209 where in main memory the packet for customer is located, and how long the packet is. Microprocessor 210 then notifies DMA processor 209 that a frame is ready to be transmitted to a customer location by transmitting a command via a FIFO. DMA processor 209 then reads the first byte of data from memory 211 at the address specified by microprocessor 210. Once DMA processor 209 has read a byte, it writes the byte into the memory location that is associated with customer 100 in formatter 207.

Formatter 207 has one separate memory location for each customer. Formatter 207 scans the memory location associated with each of the 128 customers, and creates a multiplexed bit stream that consists of one bit from each of the 128 customer memory locations. Formatter 207 transmits this multiplexed bit stream to group distributor circuits 205 and 206. After beginning to process the data byte for customer 100, formatter immediately requests another byte from DMA processor 209. DMA processor 209 reads the next byte from main memory 211 (via direct memory access), and transfers the byte to formatter 207; formatter 207 continues to request bytes and continues to forward the multiplexed bit stream to group distributor circuit 205. After DMA processor 209 has transferred the last data byte to formatter 207, (determined by the packet length value in the shared memory), it notifies formatter 207, and formatter 207 appends a CRC code, which it has been computing over all the data bits, to the end of the frame.

Group distributor circuit 205 receives the multiplexed bit stream (containing data for 64 customers) from formatter 207 and divides this bit stream into 16 separate bit streams. Each bit stream goes to one of the 16 line circuit cards associated with the group distributor circuit. Group distributor circuit 205 transfers 16 bits simultaneously. One of these data bits goes to line circuit card 201-1 via conductor 215-1; the other bits go to line circuit cards 201-2 through 201-16, via conductors 215-2 through 215-16. Line circuit card 201-1 routes the appropriate data bit to customer 100, and routes the other data bits to the associated customers. This process is repeated until the entire frame has been sent to customer 100.

Figure 5:
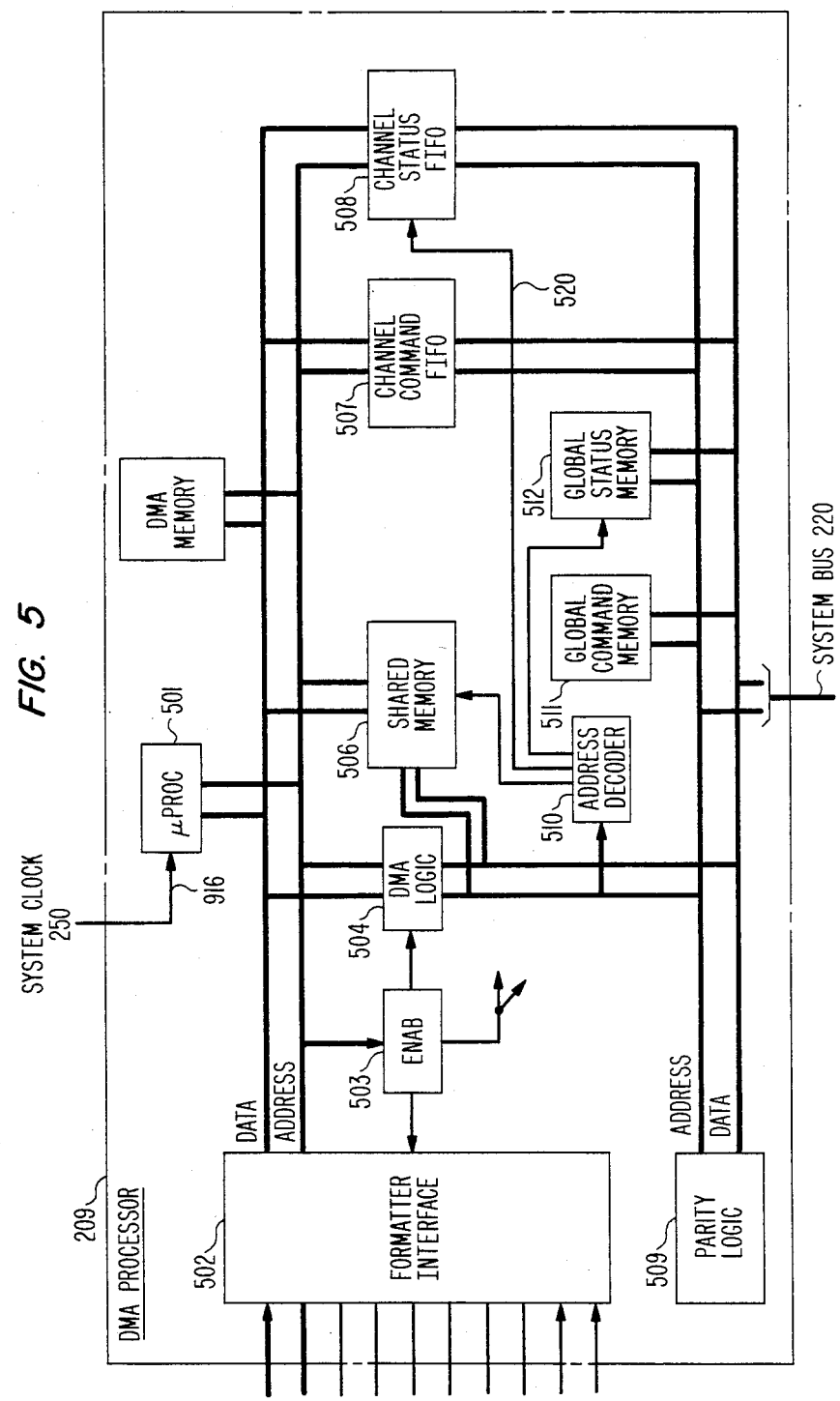
FIG. 5 is a detailed block diagram of DMA processor 209.

Multiline protocol controller 230 is shown in greater detail in FIGS. 4 and 5. Multiline protocol controller 230 comprises formatter 207 and DMA processor 209. These two circuits cooperate to transfer customer data in and out of main memory 211 via direct memory access. Multiline protocol controller 230 transmits data to and receives data from group distributor circuits 205 and 206 via cables 217 and 231, respectively. It transmits data to and receives data and address information from system bus 220. The following description first presents the circuit elements that are contained in formatter 207 and DMA processor 209. Then a description is presented of how these circuit elements cooperate to transfer data in and out of main memory 211.

Formatter 207 is shown in greater detail in FIG. 4. Formatter 207 consists of separate transmit and receive sections, which operate on the receive and transmit data. In the receive direction, formatter 207 receives a serial bit stream that consists of one bit from each of the 128 customers. These bits could be for a data frame, a control frame, or from a bit stream that indicates an idle line. Formatter 207 forms this incoming bit stream into separate bytes for each customer, and then forwards these bytes to DMA processor 209, which writes them into main memory 211 for transmission to packet switch 107. If data subscriber interface 104 cannot provide service for a customer, multiline protocol controller 230 transmits, via formatter 207, an idle indication for that customer to main processor 225. The idle condition consists of all "13 s" in the customer's data stream. In the transmit direction, formatter 207 receives packets, one byte at a time, that could be destined for any one of the 128 customers, and creates a serial bit stream that consists of one bit for each of the 128 customers. These packets could be data packets or control packets. If there is no packet being transmitted to a particular customer, formatter 207 automatically fills a flag pattern into the time slots associated with the idle customer. Formatter 207 receives its clock signals from system clock 250 via cable 915. These clock signals are distributed within formatter 207 by formatter clock 425.

Consider the receive portion of formatter 207. The receive portion comprises receive state machine 404, receive state memory 401, receive command memory 402, receive status FIFO 403, and receive channel counter 405. Receive state machine 404 performs the actual formatting functions previously described. Receive state memory 401 contains a separate 40-bit memory location for each of the 128 customers, and allows receive state machine 404 to store the current state of each customer line, retrieve that state before operating on a new bit, and then write the new state back into memory. Receive command memory 402 contains a separate 8-bit memory location for each customer. This memory is written by DMA processor 209 and contains control information for each customer line. This information includes line speed (1200 or 4800 bit-per-second) and data format: NRZ (non-return to zero), or NRZI (non-return to zero inverted).

Formatter 207 receives a serial bit stream from group distributor circuit 205 on cable 421. This serial bit stream consists of one data bit and one parity bit from each of its 64 associated customers. Formatter 207 also receives a similar bit stream from group distributor circuit 206 on cable 422. Formatter 207 divides these incoming bit streams into 128 time slots, which correspond to each of the 128 customers. Receive channel counter 405 continuously counts from 0 to 127 in order to inform receive state machine 404 which customer is associated with each incoming bit. Before receive state machine 404 reads the incoming bit, it reads receive state memory 401, in order to determine the previous state of the customer line. It then reads the bit from the customer, performs the necessary function on that bit, then stores the current status in receive state memory 401. When there is a significant change in the line status (for example when a data byte has been formed), this status is written into receive status FIFO 403. Each entry in FIFO 403 also contains the channel number to which the entry pertains. This is obtained from receive channel counter 405. Receive status FIFO 403 is read by DMA processor 209, as described later with respect to FIG. 5.

The timing of receive state machine 404 is controlled by receive channel counter 405, which counts from 0 to 127. This count corresponds to the 128 customer lines, which means that receive state machine 404 sequentially functions on each of the 128 customers lines, one line at a time. Each time receive channel counter 405 increments, the following actions occur. Receive state machine 404 reads receive command memory 402 at the location corresponding to the customer line being serviced, and it reads receive state memory 401 at the location corresponding to the customer line being serviced. This memory contains the prior state of the line. Receive state machine 404 uses the previous state of the line and adds the new bit being received to determine the new state of the line. After receive state machine 404 determines the new state of the line, it writes the new state into receive state memory 401 at the memory location corresponding to the line being serviced. If the new state causes a change in status, the status is written into receive status FIFO 403. Receive channel counter 405 then increments, and the same functions are performed on the next customer line. This process is continually repeated over each of the 128 customer lines.

Consider the transmit portion of formatter 207. The transmit portion comprises transmit state machine 409, transmit state memory 406, transmit command memory 407, transmit status FIFO 408 and transmit channel counter 410. Transmit state machine 409 performs the actual formatting functions previously described. Transmit state memory 406 contains a separate 40-bit memory location for each of the 128 customers, and allows transmit state machine 409 to store the current state of each customer line, retrieve that state before functioning on a new bit, and then write the new state back into memory. Transmit command memory 407 provides one 16-bit memory location for each of the 128 customers. These memory locations are written by DMA processor 209 and read by formatter 207, and are used by DMA processor 209 to pass transmit data bytes, as well as various command messages, such as baud rate, data format, etc. Transmit status FIFO 408 is used to pass status information from formatter 207 to DMA processor 209. The status information is either a request for a new data byte, or a message that a frame was aborted. In addition to the status information, each FIFO entry also contains the customer number to which the entry pertains. This is obtained from transmit channel counter 410.

The transmit portion of formatter 207 receives packets from DMA processor 209 one byte at a time via cable 412 and DMA processor 42. The data byte is written into the correct memory location on transmit command memory 407 via an address on cable 413. The actual write is controlled by microprocessor 501 via a signal on conductor 415. Transmit channel counter 410 continually counts from 0 to 127, which corresponds to the 128 customers. Each time transmit channel counter increments, the following actions occur. Transmit state machine 409 simultaneously reads transmit state memory 406 to determine the previous state of the customer line, and reads transmit command memory 407. Transmit state machine 409 uses the information from these memories to determine the new state of the customer line, and to determine the data bit to be transmitted to the customer. Transmit state machine then writes the new line state back into transmit state memory 406 at the memory location associated with the customer whose line is being serviced. If transmit state machine 409 takes a new data byte from transmit command memory 407, it requests another data byte for that customer by, placing a next byte request into transmit status FIFO 408. Included in this FIFO entry is the customer number associated with the next byte request. This customer number is obtained from transmit channel counter 410. Transmit channel counter 410 then increments, and the circuit action repeats for the next customer line. By using this sequence, transmit state machine 409 creates two multiplexed bit streams. Transmit state machine 409 alternates the transmission of these two multiplexed bit streams, such that one multiplexed bit stream is forwarded to group distributor circuit 205 via cable 423, and the other multiplexed bit stream is forwarded to group distributor circuit 206 via cable 424.

DMA processor 209 is shown in greater detail in FIG. 5. DMA processor 209 is the basic interface between formatter 207 and main memory 211. In the transmit direction, DMA processor 209 reads main memory 211 in order to extract packets that could be destined for any one of the 128 customers. The packets are read one byte at a time, and are forwarded to DMA processor 209 via system bus 220. DMA processor 209 then forwards the bytes to formatter 207 via cables 412 and 413. In the receive direction, DMA processor 209 receives data from any one of the 128 customers, one byte at a time, from formatter 207 via cable 412. DMA processor 209 then writes these bytes into main memory 211 via system bus 220.

DMA processor 209 contains a number of logic and memory elements that are used to communicate between main processor 225, main memory 211 and formatter 207. The memory elements are described first. The logic elements are then described in conjunction with the data flow description.

Communication between main processor 225 and DMA processor 209 is accomplished via global command memory 511, global status memory 512, channel command FIFO 507, channel status FIFO 508, and shared memory 506. Global memories 511 and 512 are used for commands and returning status information that affects the entire DMA processor 209 operation; channel FIFOs 507 and 508 are used for commands and returning status information that affects per customer channel operation. Global commands passed from main processor 225 to global command memory 511 include initialization and interrupt commands that occur only during initialization, or during failures. Status information passed from global status memory 512 include various error and interrupt messages.

Channel command FIFO 507 is used to pass per channel commands from main processor 225 to DMA processor 209. Each FIFO entry includes the customer number to which the command applies, as well as the command. The command portion of the entry can be such things as an indication that there is a packet ready to be sent to a customer, or a command to loop the data for maintenance purposes. A command to loop data is used to test data subscriber interface 104. In addition, the command portion contains a bit that, when set, causes DMA processor 209 to read a portion of shared memory 506 that contains additional command information for the specific customer.

Channel status FIFO 508 is used to pass status information from DMA processor 209 to main processor 225. Each FIFO entry contains the customer number to which the FIFO entry applies, and the status information. The status information can be transmit good, indicating that a frame was successfully sent to the proper customer; receive good, indicating that a frame was successfully received from a customer and forwarded to main memory 211; or first byte received, indicating to main processor 225 that the buffer allocated to a customer is being used. This is a warning to main processor 225 that it must now allocate another buffer to that customer in order to allow DMA processor 209 to receive more messages from that customer. In addition, various maintenance status reports are transferred by this FIFO.

Shared memory 506 is written and read by Main processor 225 and DMA processor 209. Shared memory 506 contains a separate 16 word (32 byte) memory block for each of the 128 customers. Included are memory locations for the following: the transmit start address, which is the address in main memory 211 that contains the data bytes to be transmitted to the respective customer; the transmit byte count, which is the total byte count of the frame stored in main memory 211 that is to be transmitted to a specified customer; the receive start address, which is the address in main memory 211 to which the data received from a specified customer is to be written; the receive length, which is the length of the buffer to which data from a specified customer is to be written; and the actual receive byte count, which is the total number of bytes actually received. The other words in shared memory 506 for each separate customer are words that convey maintenance information. Shared memory 506 is discussed in greater detail with respect to FIG. 19.

Consider an example of the transmission of a frame from main memory 211 through DMA processor 209 and formatter 207, to customer 100. Before the data is transferred out of main memory 211, main processor 225 passes the transmit start address and byte count of the frame to shared memory 506, as follows. Main processor 225 forwards the start address and byte count on system bus 220. The address sent by main processor 225 is the location in shared memory 506 that is associated with customer 100. The information passes through parity logic 509, which verifies the sense of parity. The information is then written into the correct portion of shared memory 506. DMA processor 209 is now ready to begin receiving the frame.

Main processor 225 notifies DMA processor 209 that there is a frame ready to be transmitted to customer 100 via a command written into channel command FIFO 507. This command is passed via system bus 220 and is passed through parity logic 509. The address transmitted by main processor 225 is the address associated with channel command FIFO 507; the FIFO data from main processor 225 includes the customer number (in this case customer 100) as part of the entry. Microprocessor 501 then reads channel command FIFO 507 and determines that there is a frame ready to be transmitted to customer 100. Microprocessor 501 reads shared memory 506 at the location associated with customer 100 and causes DMA logic 504 to read the first byte out of main memory 211 at the location specified in the shared memory entry. This first byte is transferred to DMA processor 209 via system bus 220. Microprocessor 501 then activates formatter interface 502 via enable circuit 503, and causes the data byte to be written into transmit command memory 407, as follows. DMA processor 209 transmits a signal via conductor 415, indicating to formatter 207 that a transmit memory write will take place. DMA processor then forwards the byte using cables 412 and 413. Cable 412 transfers the actual data, and cable 413 is the address of the memory location in transmit command memory 407 that is associated with customer 100. Transmit state machine then reads transmit command memory 407 and begins to process the data byte. Formatter 207 immediately requests the next data byte by placing a next byte request into transmit status FIFO 408. This FIFO entry includes the customer number (in this example, customer 100) as part of the entry. Formatter 207 indicates to DMA processor 209 that it has placed an entry into transmit status FIFO 408 by transmitting a signal via conductor 420.

DMA processor 209 reads transmit status FIFO via a signal on conductor 418, determines that formatter 207 will soon need the next data byte for customer 100, and reads the next byte out of main memory 211 using the previously noted method. This process continues until DMA processor 209 has read the entire frame from main memory 211 and has transferred that frame to formatter 207. The last byte is known because main processor 225 placed the length of the frame into shared memory 506 before the transmission took place. DMA processor 209 maintains a counter that increments each time a byte is read, and compares this counter with the byte count included in the frame. When the last byte has been transferred to formatter 207, DMA processor 209 informs formatter 207 that the last byte has been transferred by placing an end of message command into transmit command memory 407. Formatter 207 responds to this end of message command by appending a CRC code to the end of the frame that is being sent to customer 100.

Consider an example of receive data flow from customer 100 through formatter 207 and DMA processor 209, to main memory 211. Data from customer 100 and from the other customers connected to group distributor circuit 205 is sent in a multiplexed serial bit stream to formatter 207 via conductor 421 and is formatted by receive state machine 404. Once receive state machine 404 has assembled a complete byte for customer 100, it writes this byte into receive status FIFO 403. Part of the FIFO entry is the customer number to which the entry applies (in this example, customer 100). Formatter 207 then notifies DMA processor 209 that it has made an entry into receive status FIFO 403 by placing a signal on conductor 426. DMA processor 209 reads receive status FIFO 403 by placing a signal on conductor 419; this causes the contents of the FIFO to be transferred to DMA processor 209 via cable 412.

Once DMA processor 209 has received the receive data byte, it reads shared memory 506 at the location associated with customer 100 to determine into which buffer in main memory 211 the byte is to be written. At the same time, DMA processor places an entry into channel status FIFO 508 indicating that the first byte of a frame from customer 100 has been received and is about to be written into main memory 211. This is an indication to main processor 225 that it must allocate another buffer for customer 100 in order to be able to receive subsequent frames. DMA processor 209 then writes the first byte into main memory 211 via DMA logic 504. This process continues until DMA processor 209 has written the entire frame from customer 100 into main memory 211. After the last byte of the frame has been received, formatter 207 notifies DMA processor 209 of this fact via an entry in receive status FIFO 403. If the entire frame has been successfully received from customer 100 and successfully written into main memory 211, DMA processor 209 places an entry into channel status FIFO 508 indicating that a frame from customer 100 has been successfully received. If at any time during the transfer of the frame an error is indicated, a frame unsuccessfully received entry is placed into channel status FIFO 508.

Turning now to the testing of multi-line protocol controller 230, this testing is accomplished by main processor 225 transmitting a test packet to multi-line protocol controller 230. The test packet is identified with a particular line circuit whose data path through multi-line protocol controller 230 is under test. The latter is responsive to the test packet to perform a loop-around transfer of the test packet from the transmit output of transmit state machine 409 to the receive input of receive state machine 404. From the receive input, the test packet is transferred back to main processor 225 in the same manner as a data packet. Upon receipt of the test packet, main processor 225 verifies that the test packet has been correctly transmitted using well known programming techniques to compare the transmitted test packet with the looped-back test packet.

The loop-around transfer is accomplished in the following manner. As described in greater detail in the discussion of FIG. 15B, transmit bit memory 428 stores each bit signal transmitted by transmit state machine 409 to the line circuits via group distributor circuits 205 and 206. Transmit bit memory 428 has one memory location identified with each line circuit. When a bit signal is transmitted to a line circuit, that bit signal is also stored in transmit bit memory 428's memory location identified with that line circuit until the next bit signal is transmitted to that line circuit. This storage of transmitted bit signals occurs for both data and test packets. The looping of the transmitted bit signals stored in transmit bit memory 428 is controlled in the following way. When DMA processor 209 receives a test packet, it transfers the test packet to formatter 207 as previously described for a data packet; but, in addition, it transmits to receive command memory 402 a loop signal, which command memory 402 stores in the memory location identified with the line circuit under test. During the time for processing data from the line circuit under test, receive state machine 404 is responsive the loop signal, which is read out of the command memory 402, to select the stored test transmitted bit signal from transmit bit memory 428 for forming the byte. The result is that the test packet is looped back to main processor 225.

Figure 15A:
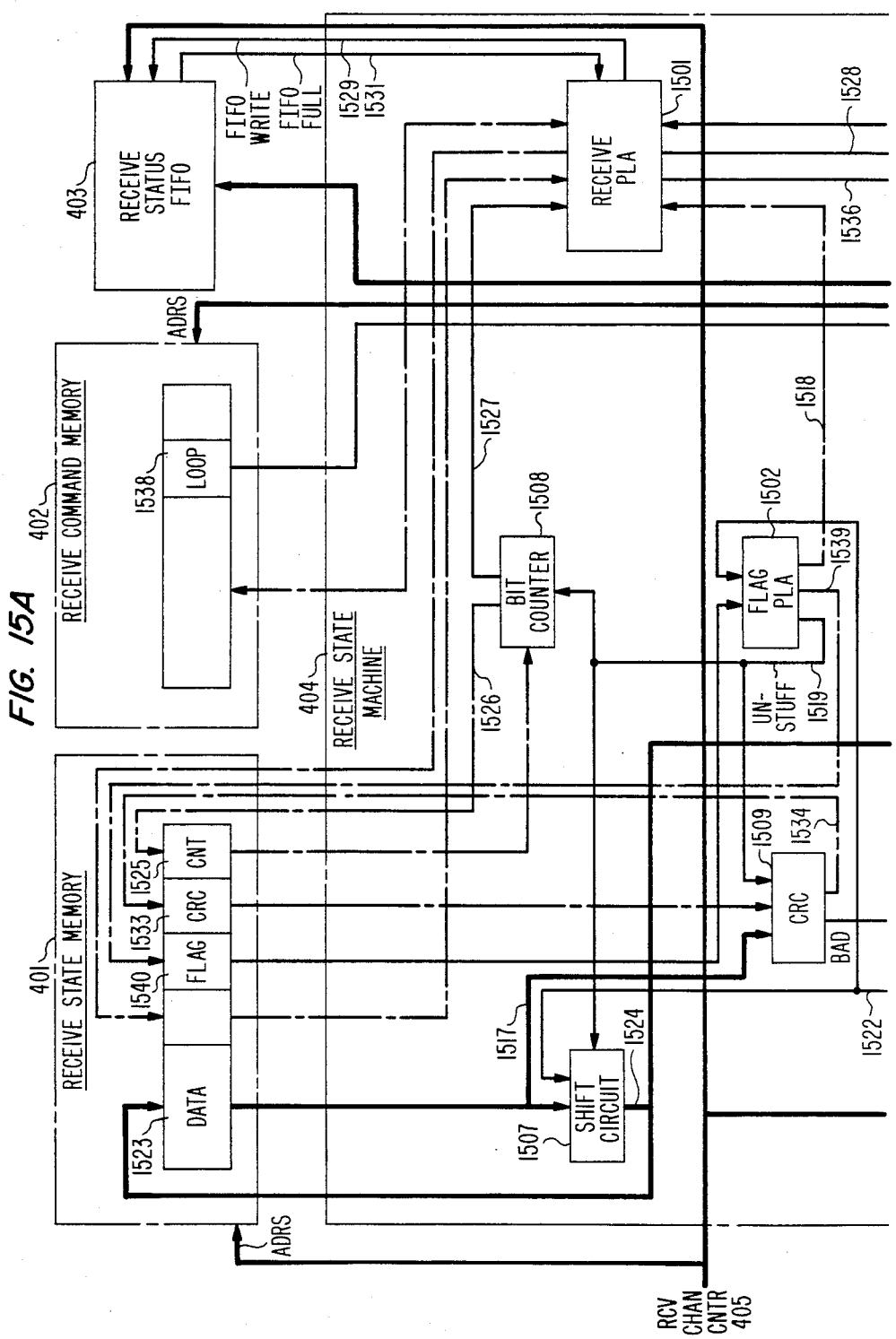
FIGS. 15A and 15B illustrate, in block diagram form, receive state machine 404.
Figure 15B:
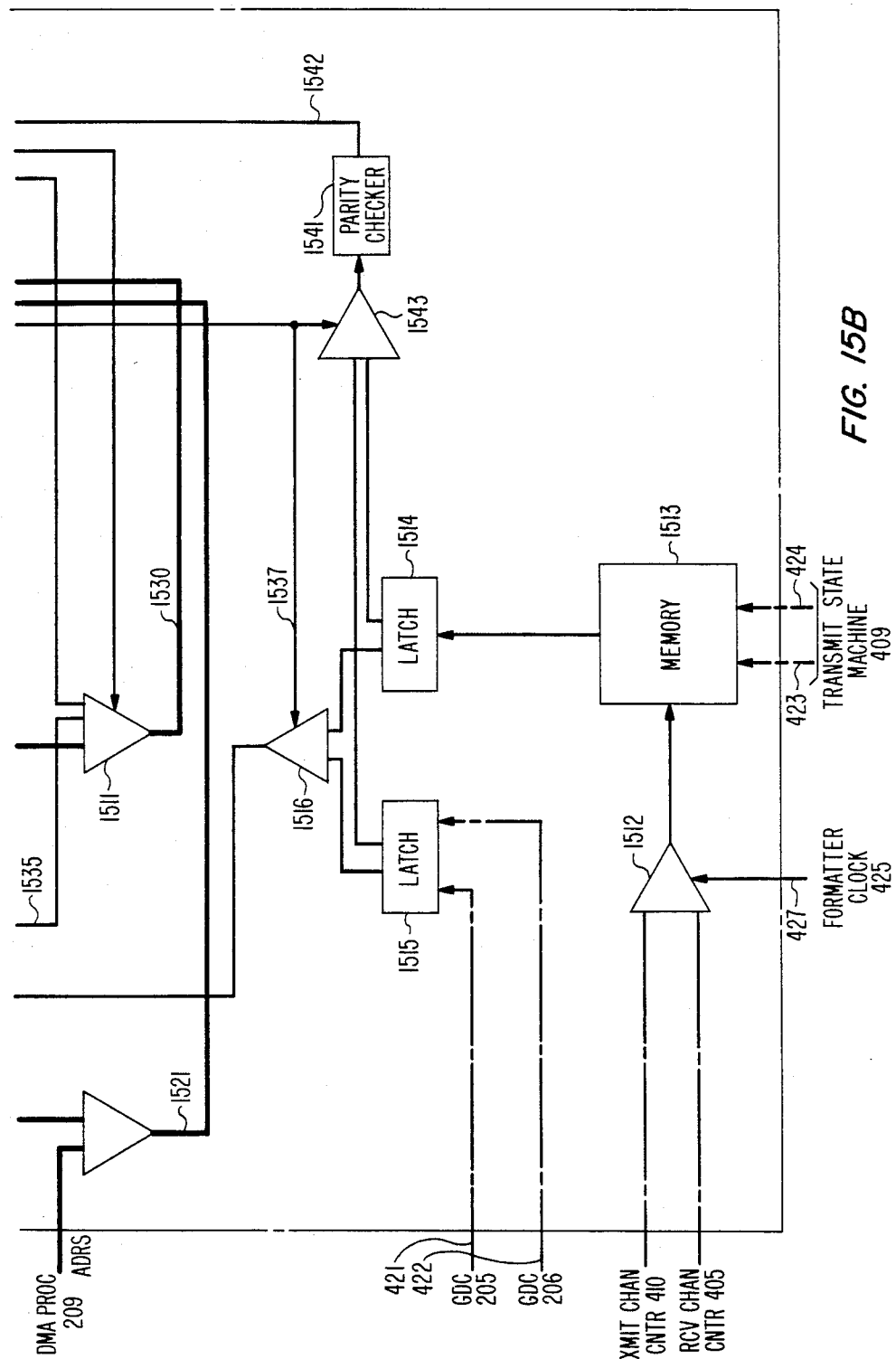

As described in greater detail in the discussion of FIG. 15B, the selection of the stored test transmitted bit signal rather than the data bit signal from the line circuit is accomplished by using data selector 1516. The latter is controlled by the readout loop signal to select the stored test transmitted bit signal.

Figure 6:
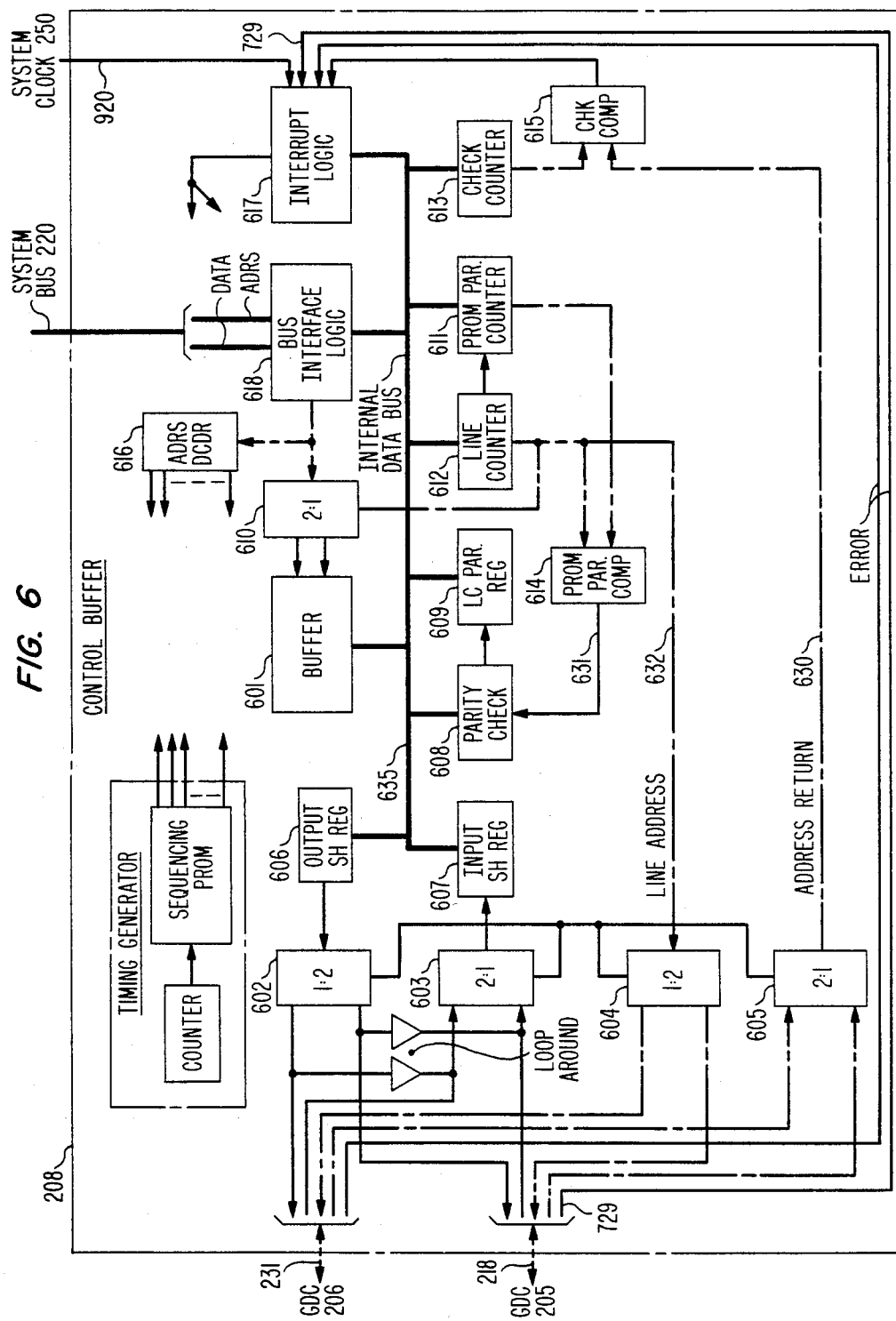
FIG. 6 is a detailed block diagram of control buffer 208.

Control buffer 208 is shown in greater detail in FIG. 6. Control buffer 208 provides a communications path between main processor 225 and each of the 128 line circuits. This communications path is used for control and status information, such as ringing detection and carrier detect for modem operation.

Control buffer 208 receives control information from main processor 225 via system bus 220, and forwards the control information to the appropriate line circuit via either group distributor circuit 205 or 206. The appropriate line circuit receives the control information, adds the appropriate status information in response to the control information, and returns both the control information (which is echoed) and the appropriate status information to control buffer 208. Main processor 225 then reads the status and echoed control information from control buffer 208 and verifies that the echoed control information is identical to the transmitted control information by comparing the two sets of control information using well known programming techniques.

Control buffer 208 receives control information from main processor 225 on system bus 220 via bus interface logic circuit 618. This control information is then written into buffer 601 via multiplexer 610 at the address specified by main processor 225, and decoded by address decoder 616. Buffer 601 contains separate memory locations for each of the 128 customers. These memory locations provide one word for control data, and one word for status and the return of the echoed control word. The 614.4 kb/sec control data, which contains two address bits and eight data bits, is sent to the appropriate group distributor circuit 205 or 206 via control buffer data bus 635 and output shift register 606. The group distributor to which the control data is transmitted is selected by multiplexer 602. One bit time after receiving the last control data bit, the line circuit that received the data echoes the eight control bits, and two bit times later, the line circuit sends eight status bits in response to the control data bits. The control and status bits pass through demultiplexer 603 and are shifted into input shift register 607. From there, they are written into the appropriate location in buffer 601, via control buffer data bus 635. The address is determined by line counter 612. Main processor 225 periodically reads buffer 601 in order to extract the returned status information from the individual line circuits.

The individual line circuit to which the control word is sent is determined via the line circuit address used in conjunction with the two address bit that are originated by line counter 612 and sent with the control word. The line circuit address is the address of one of the 32 line circuit cards that are associated with data subscriber interface 104. The two address bits are used to identify the specific one of the four line circuits that are contained in each line circuit card. For example, an address bit combination of "00" designates the line circuit associated with customer 100 of line circuit card 201-1, and an address bit combination of "01" designates the line circuit associated with customer 101 of line circuit card 201-1.

The integrity of the control and status data is protected in two ways: by a parity check scheme, and by verifying that the address corresponding to the customer receiving the data is correct. The address check operates in the following manner. During initialization, line counter 612 and check counter 613 are set to the same value by main processor 225. These two counters run in step as line counter 612 increments through each of the 128 customer numbers. The address sent by control buffer 208 via cable 632 and multiplexer 604 is returned by the associated group distributor circuit via demultiplexer 605 and cable 630. The returned address is compared with the address from check counter 613 by check comparator 615; if there is a difference, check comparator 615 notifies main processor 225 via interrupt logic 617.

The parity check operates in the following manner. Control buffer 208 sends one parity bit with each control word to each of the 128 line circuits, using a "promenade" parity scheme, which operates as follows. Control buffer 208 normally sends odd parity; however, within each cycle of sending one control word to each of the 128 line circuits, exactly one line circuit receives even parity. The line circuit that receives the even parity changes by one for each cycle, until each of the 128 line circuits has received even parity. This pattern then repeats. For example, during the first cycle of sending control words, the line circuit associated with customer 100 receives even parity; during the second cycle, the line circuit associated with customer 101 receives even parity. This continues until each of the 128 line circuits has received even parity. A line circuit that receives even parity with the control word ignores that word and returns bad parity to parity register 609. Main processor 225 can test the line circuits by comparing the line circuit that returned bad parity with the line circuit that was selected to return bad parity.

The line circuit that is to receive even parity is determined by promenade parity counter 611, which sequentially counts from 0 to 127. Promenade parity comparator 614 receives the count signal from promenade counter 611 and the line circuit address via cable 632. Thus, the line circuit whose number is currently in promenade parity counter 611 receives the even parity, via a signal on conductor 631, which is transmitted from promenade parity comparator 614 to parity check/generator 608. All parity bits are forwarded, along with the control word to the individual line circuits via output shift register 606. Each of the 128 line circuits returns one parity bit along with each returned status word. This parity is calculated over all 16 bits of the returned status and control word. This parity bit is the identical sense of the parity bit the line circuit received. Thus, if a line circuit receives even parity, it returns even parity; if it receives odd parity, it returns odd parity. Parity check/generator 608 compares the parity returned from a line circuit via input shift register 607 with the parity that was sent (this is obtained from the signal on conductor 631). If this comparison results in a mismatch, indicating a parity error, parity check 608 writes a parity error indication into parity register 609. This register is periodically read by main processor 225, to allow for notification of parity errors.

Figure 7:
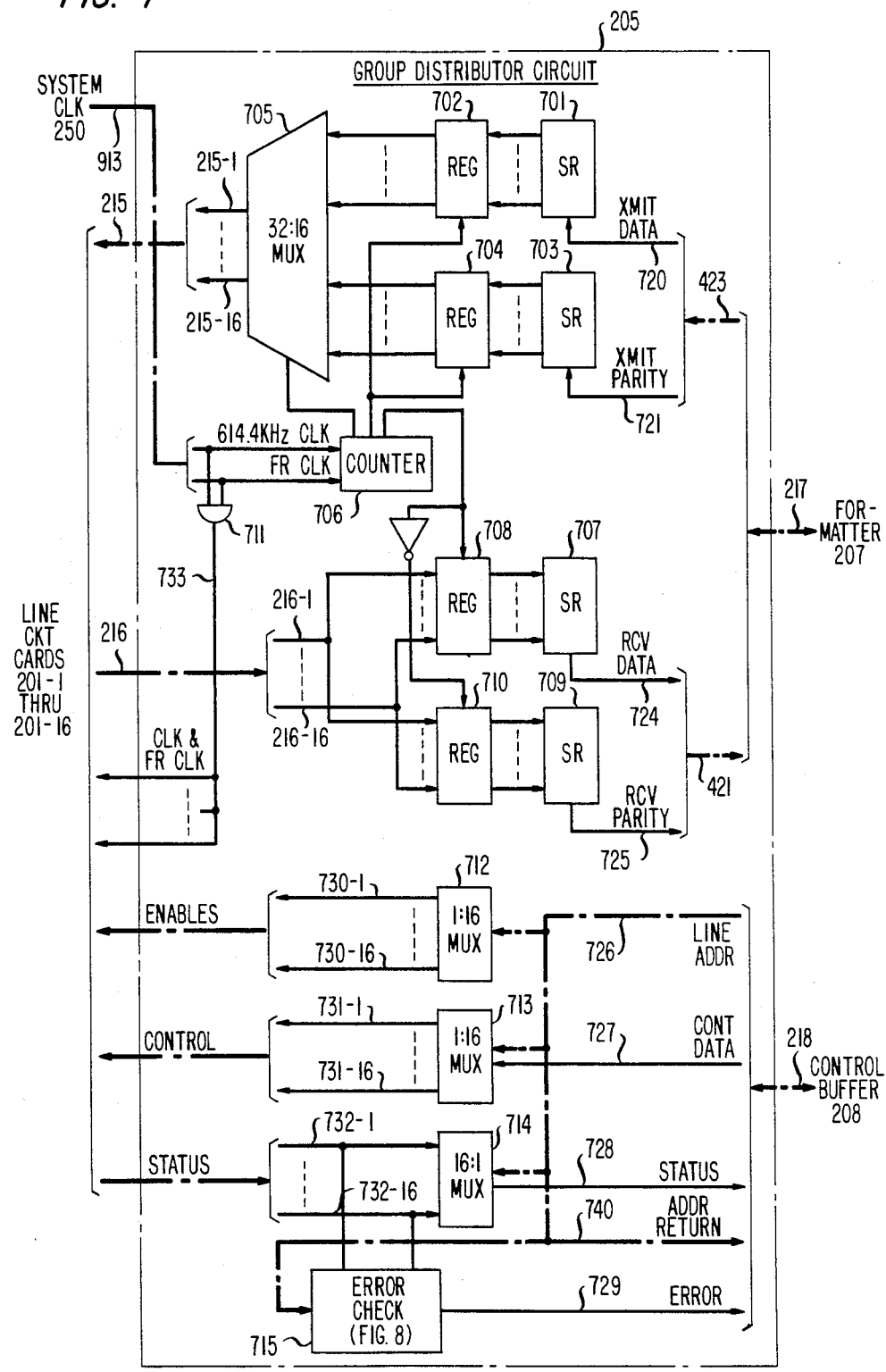
FIG. 7 is a detailed block diagram of group distributor circuit 205.

Group distributor circuit 205 is shown in greater detail in FIG. 7. Group distributor circuit 206 is identical to group distributor circuit 205. In the transmit direction, group distributor circuit 205 receives a multiplexed serial bit stream from formatter 207 on cable 217. This multiplexed bit stream consists of one data bit and one parity bit for each of the 64 customer that are connected to group distributor circuit 205. Group distributor circuit 205 multiplexes the parity bits and the data bits and transmits them in parallel (16 bits at a time) to each of the 16 line circuit cards, such as line circuit cards 201-1 and 201-16. In the receive direction, group distributor circuit 205 receives data and parity bits in parallel from each of the 16 line circuits, and demultiplexes them into two serial bit streams: one bit stream containing data, and the other bit stream containing parity from each of the 64 customers that are connected to group distributor circuit 205. This serial bit stream is forwarded to formatter 207 via cable 217. In addition to the data transfer, group distributor circuit 205 receives control information from, and transmits control information to, control buffer 208.

Group distributor circuit 205 is divided into three parts: transmit data and parity, receive data and parity, and status and control. The transmit data and parity part comprises shift registers 701 and 703, registers 702 and 704, and multiplexer 705. In addition, counter 706 controls the timing functions for all three parts, via signals from system clock 250 on cable 913. The timing signals from cable 913 are additionally distributed to line circuits 201-1 through 201-16 via AND gate 711 and conductor 733.

Transmit data and parity are received from formatter 207 on conductors 720 and 721. Transmit data is shifted into register 703, and transmit parity is shifted into register 703. After 16 bits have been shifted into each register, the bits in register 701 are transferred into register 702, and the bits in register 703 are transferred into register 704. Counter 706 alternately activates registers 702 and 704. When the respective register is activated, its contents are transmitted, via multiplexer 705, to each of the 16 line circuit card 201-1 through 201-16, via conductors 215-1 through 215-16. Thus, each of the 16 line circuits simultaneously receives one data bit, followed by one parity bit. Each line circuit has connected to it four customers, which can be designated "a" through "d". During the first cycle of the previously mentioned operation of transmitting data and parity bits, each of the 16 customers designated as "a" receives one data bit, followed by one parity bit. During the second cycle, each customer designated as "b" receives one data bit, followed by one parity bit. This process continues for the customers designated as "c" and "d".

Each of the 16 line circuits transmits one data bit, followed by one parity bit to group distributor circuit 205 via conductors 216-1 through 216-16. The 16 data bits are written into register 708 and the 16 parity bits are written into register 710, under control of counter 706. After registers 708 and 710 have received the bits, the bits are forwarded to shift register 707 (for receive data bits), and register 709 (for receive parity bits). The contents of registers 707 and 709 are then transferred in a serial manner to formatter 207 via conductors 724 and 725. The cycle that determines the bit position of each of the customer's "a" through "d" is identical to that of the transmit cycle, as previously described.

The status and control part of group distributor circuit 205 comprises demultiplexers 712 and 713, multiplexer 714, and error check circuit 715. Group distributor circuit 205 receives from control buffer 208 control words via conductor 727, and line circuit addresses via address bus 726. Upon receiving a line circuit address and associated control word, group distributor circuit 205 generates an enable signal to the specific line circuit, determined by the address on address bus 726, via conductors 730-1 through 730-16, and passes the control word to the associated line circuit via demultiplexer 713 and conductors 731-1 through 731-16. After receiving the control word, the associated line circuit echoes the control word, followed by a status word. The control and status words are received by group distributor circuit 205 on the associated conductor 732-1 through 732-16, and are sent to control buffer 208 via multiplexer 714 and cable 728. In addition, group distributor circuit 205 echoes the line card address via address return bus 740. Error check circuit 715 checks the parity over the status lines to find multiselect errors, and reports errors to interrupt logic 617 (located in control buffer 208) via conductor 729.

Figure 8:
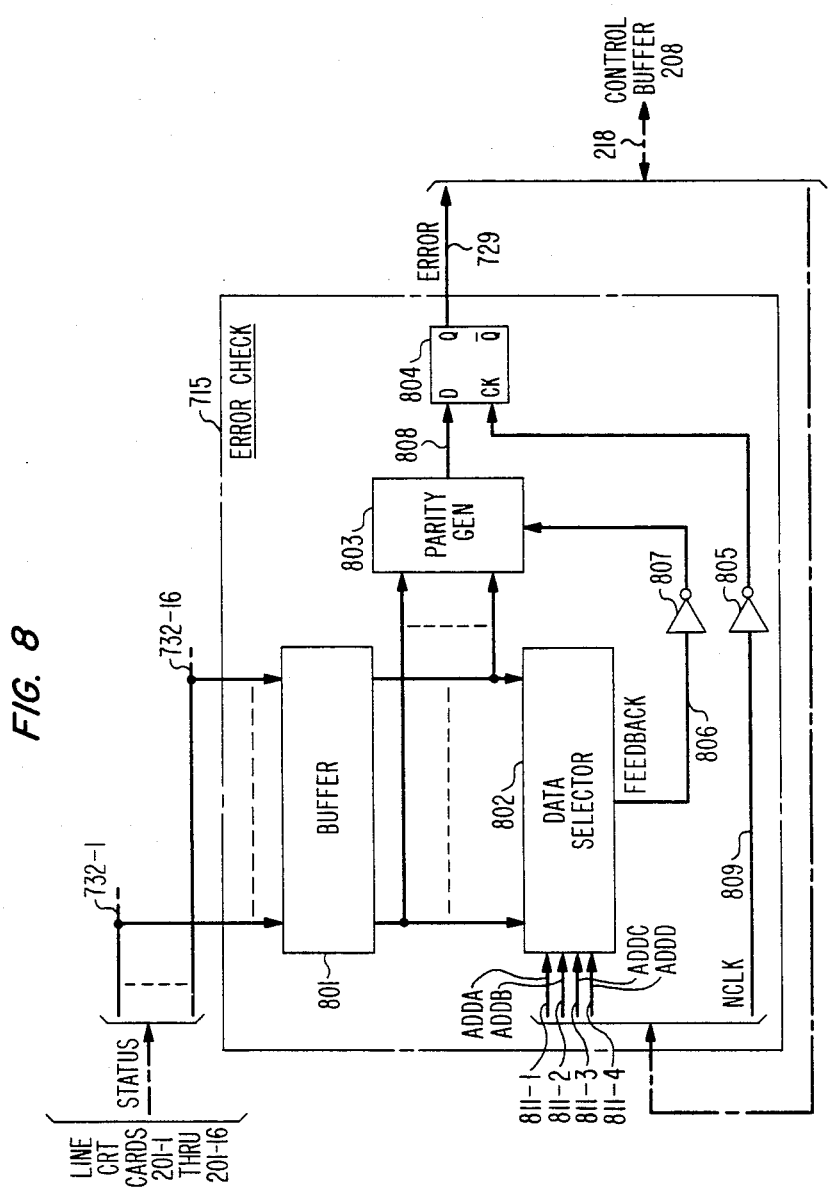
FIG. 8 is a detailed block diagram of error check circuit 715.

Error check circuit 715 is shown in greater detail in FIG. 8. Error check circuit 715 detects multiselect errors, which are errors that occur when a line circuit that was not selected to return a status word does return a status word, or when more than one line circuit simultaneously returns a status word. Error check circuit 715 operates by generating parity based on the status leads of each of the 16 line circuit cards, and comparing the generated parity against the expected parity. The expected parity is the parity expected from the 1 of 16 line circuit cards that is currently selected to return a status word.

During each bit time, buffer 801 interrogates the status leads from each of the 16 line circuit cards on conductors 732-1 through 732-16. During normal operation, only 1 of the 16 line circuit cards actually returns a status bit during the bit time; the other 15 line circuits cards return a "0". The line circuit card selected to return the status bit is determined from a 4-bit address on address leads 811-1 through 811-4. Data selector 802 uses this address to properly condition conductor 806 to transmit the expected sense of parity to parity generator 803 and inverter 807. The expected sense of parity is determined from the state of the selected status lead 732-1 through 732-16. For example, a "0" on the selected conductor 732-1 through 732-16 is inverted by inverter 807, and causes parity generator 803 to expect even parity. Similarly, a "1" on the selected conductor 732-1 through 732-16 is inverted by inverter 807, and causes parity generator 803 to expect odd parity. Parity generator 803 compares the parity generated over all 16 status leads 732-1 through 732-16 with the parity of the selected status lead 732-1 through 732-16, and generates a signal on conductor 808. If the sense of parity agrees, parity generator 803 generates a "1" on conductor 808; this keeps flip-flop 804 set. If the sense of parity does not agree, parity generator 803 generates a "0" on conductor 808; this resets flip-flop 804. When flip-flop 804 is reset, an error indication is passed to interrupt logic 617 (located on control buffer 208), via conductor 729. The timing of flop-flop 804 is controlled via a timing signal on conductor 809, and inverter 805.

Figure 9:
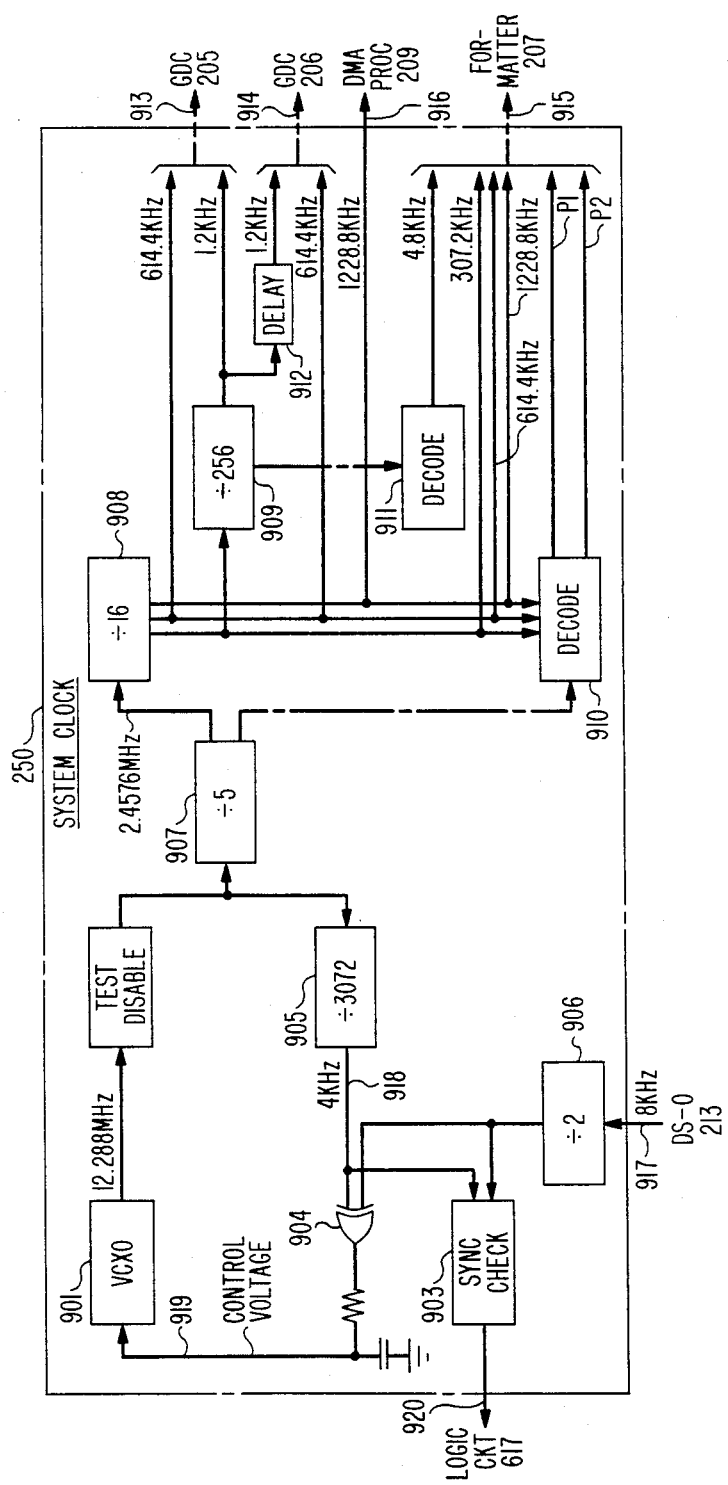
FIG. 9 is a detailed block diagram of system clock 250.

System clock 250 is shown in greater detail in FIG. 9. System clock 250 provides the main clock signals for formatter 207, DMA processor 209, and the individual line circuit cards (via group distributor circuits 205 and 206). The primary clock signal is 12.288 MHz, which is generated by crystal oscillator 901. The clock signals for the previously mentioned circuits are generated by various frequency dividers and decoders, and are distributed to the various circuits via cables 913 through 916. Crystal oscillator 901 can either free-run, or can be synchronized with an external signal via conductor 917.

Clock synchronization is provided in the following manner. Oscillator 901 generates a 12.288 MHz signal, which is divided by 3072 via divider 905 to produce a 4 kHz signal. This 4 kHz signal is sent to exclusive OR gate 904 via conductor 918. Exclusive OR gate 904 also receives a 4 kH signal, via conductor 918 and divider 906. Exclusive OR gate 904 compares these two 4 kHz signals and generates a feedback voltage to oscillator 901 via conductor 919 to maintain synchronization. Synchronization check circuit 903 also receives the two 4 kHz signals; if synchronization check circuit 903 detects a loss of synchronization, it generates a sync loss signal, which is sent to interrupt logic 617 via conductor 920.

The fundamental frequency from oscillator 901 is divided via dividers 907 and 908, and sent to decode 910 to produce the P1 and P2 clock signals. The P1 and P2 signals are sent to formatter 207 via cable 915 and are used to control the reading and writing functions. The output of divider 908 is also used to generate a 307.2 kHz, 614.4 kHz, and 1.228 MHz signal. The 307.2 kHz signal is passed to formatter 207 via cable 915 and is used for multiplexing customer data. The 614.4 kHz signal is passed to formatter 207 via cable 915 and to group distributor circuits 205 and 206 via cables 913 and 914. In formatter 207, this signal serves as the principal clock signal from which the other clocks signals in formatter 207 are generated. In group distributor circuits 205 and 206, this signal serves as the framing signal for each of the line circuit cards. The 1.228 MHz signal is passed to formatter 207 via cable 915 and to DMA processor 209 via conductor 916. DMA processor 209 and formatter 207 use this signal to avoid conflicts in accessing receive command memory 402 and transmit command memory 407.

The output from divider 908 is also passed to divider 909 to produce, via decode 911, the 4.8 kHz frame clock. This signal is passed to formatter 207 via cable 915 and corresponds to the 4800 baud rate of the customer lines. The output of divider 909 produces two framing signals: one signal is passed to group distributor circuit 205 via cable 913, the other signal is passed to group distributor circuit 206 via cable 914. Delay circuit 912 imposes a 1.63 microsecond delay between the signals on cables 913 and 914.

Figure 10A:
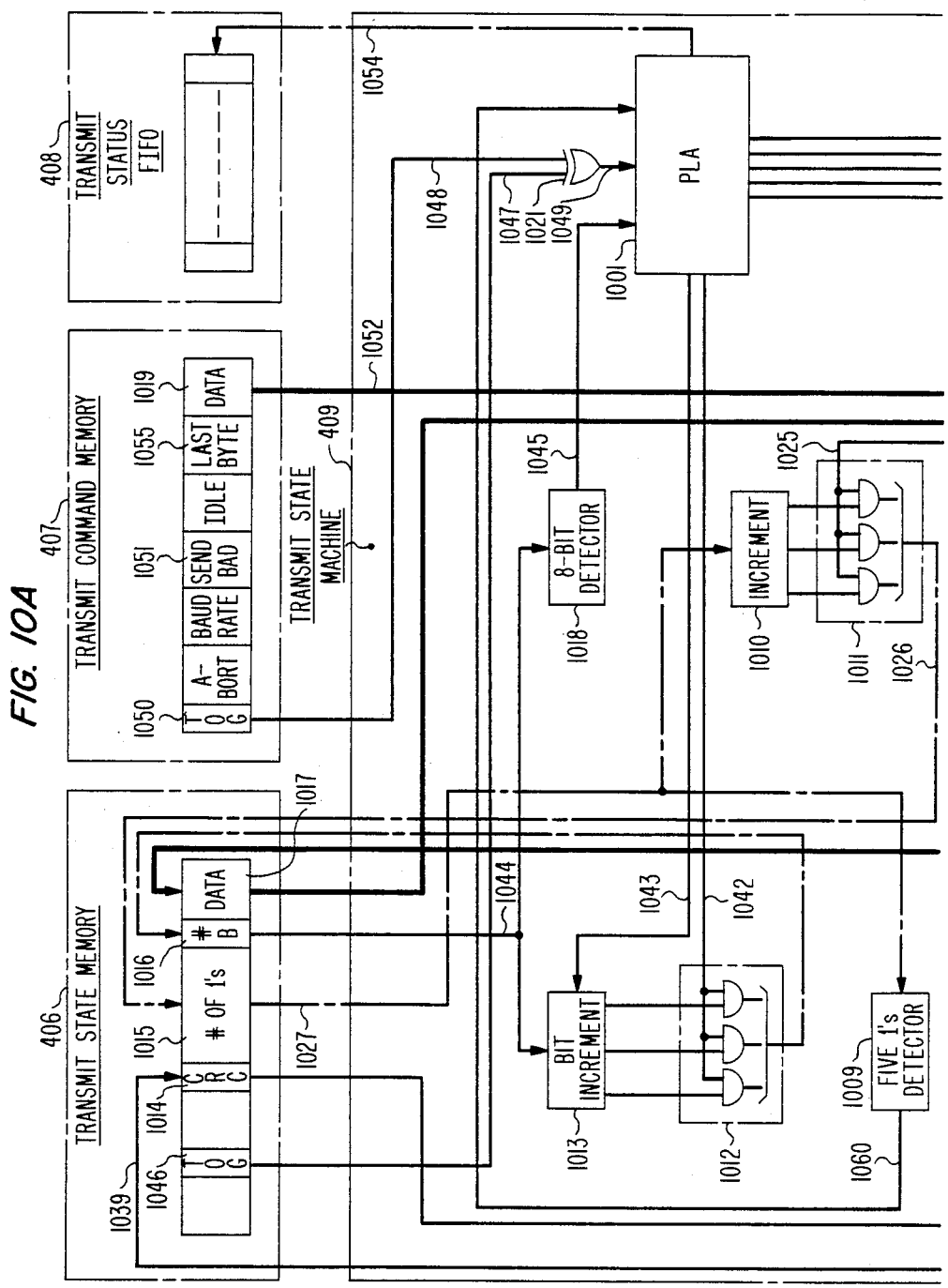
FIGS. 10A and 10B illustrate, in block diagram form, transmit state machine 409.
Figure 10B:
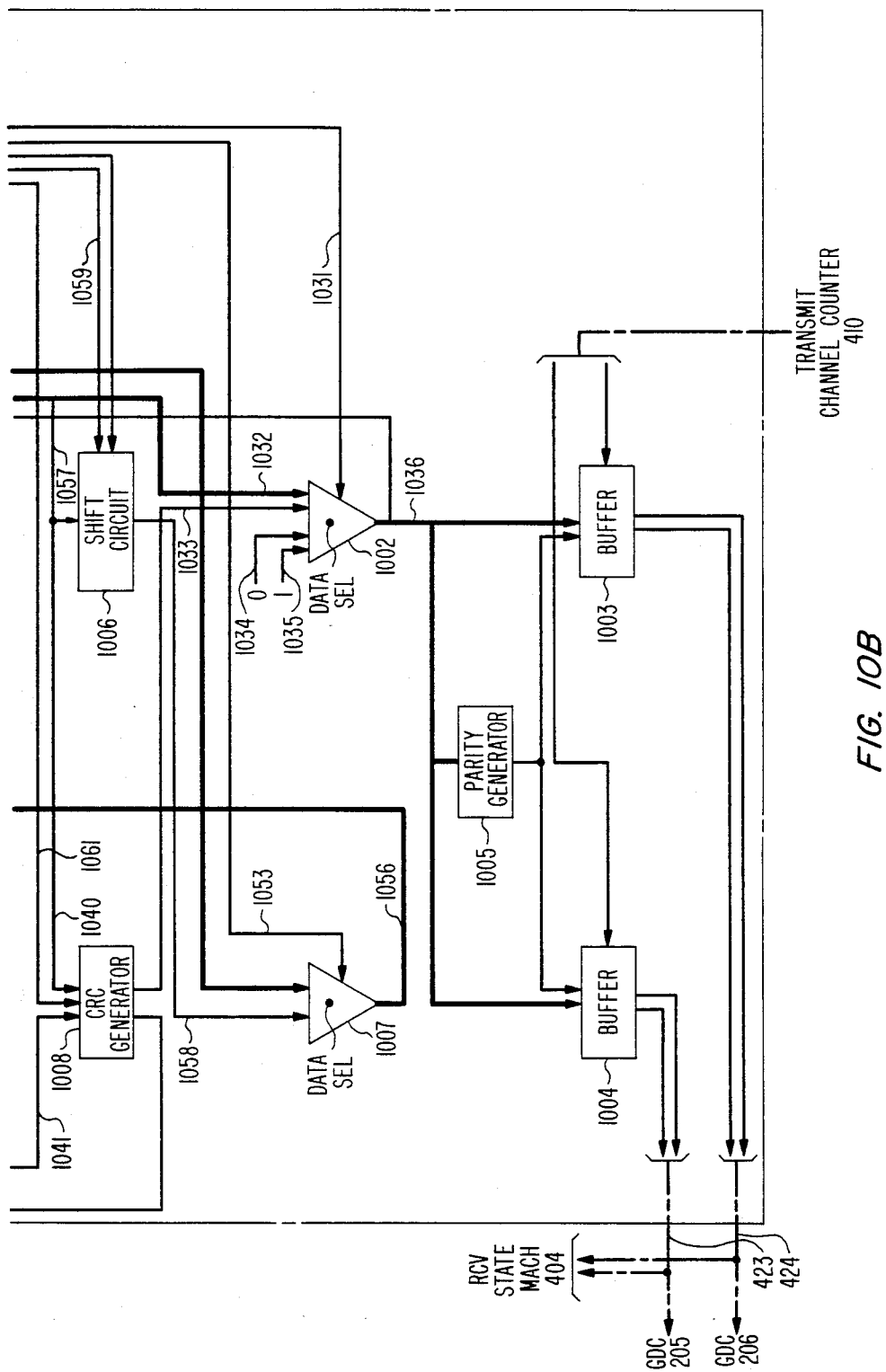
Figure 12:
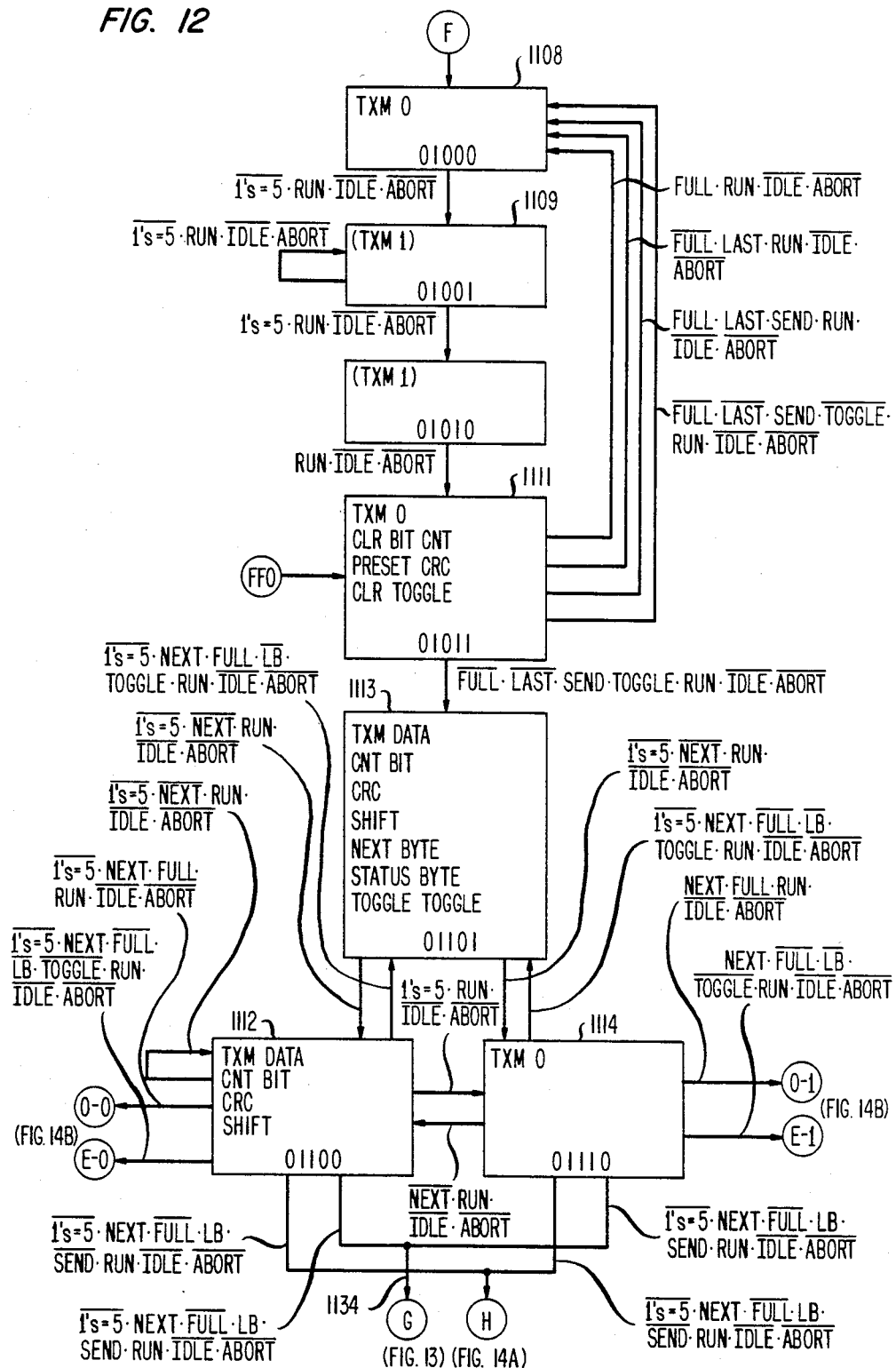
Figure 14A:
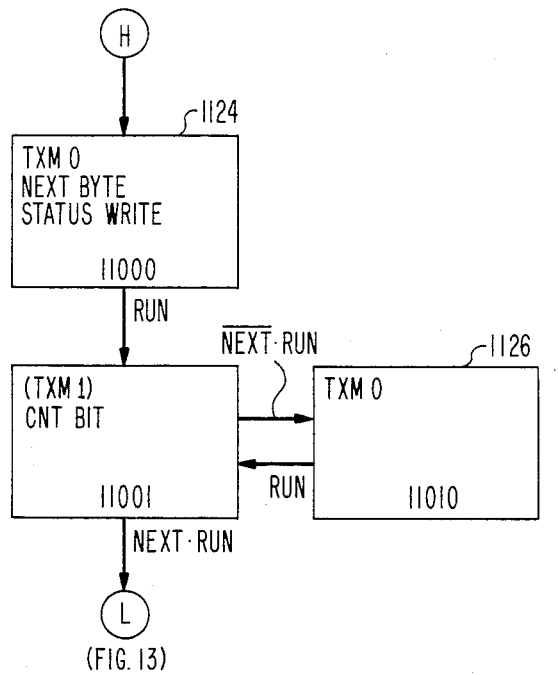
Figure 14B:
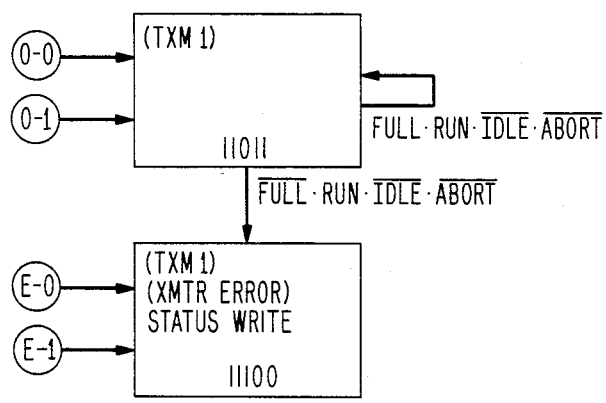

Transmit state machine 409 is shown in greater detail in FIG. 10. Transmit state machine 409 comprises a programmable logic array (PLA), and a number of associated hardware components that cooperate to perform the actual transmit data formatting. The following description pertains to the transmit data associated with customer 100; it should be understood that transmit state machine 409 performs similar functions for the transmit data associated with each of the other 127 customers. Transmit state machine 409 performs the following formatting functions: transmits an idle pattern (continuous 1's) during times that the circuit is idle; transmits an abort (seven consecutive "1's") when required, as an indication to the customer that the packet currently being transmitted should be ignored; transmits a continuous flag pattern (01111110) at the beginning and end of each packet, and during times that the circuit is not idle, but is not transmitting a packet; does bit stuffing; continuously calculates a CRC code as the packet is being transmitted; and places the final CRC code that has been calculated over the entire packet into the CRC field of the packet.

PLA 1001 contains the logical circuitry for transmit state machine 409. PLA 1001 receives data and control information from DMA processor 209 via transmit command memory 407. Transmit state machine 409 performs its formatting functions one bit at a time, under control of transmit channel counter 410. Transmit channel counter 410 continuously counts from 0 to 127; the current count of transmit channel counter 410 is the number of the customer whose data bit is currently being formatted. After the formatting of one bit takes place, transmit state machine 409 stores the state of customer 100's line in transmit state memory 406. When transmit state machine 409 is sequenced, via transmit channel counter 410, to format the next bit for customer 100, transmit state machine 409 reads transmit state memory 406 to determine the current state of the line, performs the formatting function on the new bit, and then writes the new state of the line back into transmit state memory 406. Each time DMA processor 209 sends a new data byte, it alternates the state of toggle bit field 1050 in transmit command memory 407. The state of toggle bit field 1050 that was transmitted by DMA processor is copied and stored in toggle bit field 1046 of transmit state memory 406. Each time that customer 100 is sequenced via transmit channel counter 410, exclusive OR gate 1021 compares the sense of toggle bit fields 1046 and 1050 via conductors 1047 and 1048. If exclusive OR gate 1021 detects a disagreement in the sense of these two bits (indicating that a new data byte has been written into transmit command memory 407) exclusive OR gate 1021 indicates this to PLA 1001 via a signal on conductor 1049. PLA 1001 reacts to this signal by proceeding with the data transfer.

Normal data transfer from transmit state machine to a customer is done in the following manner. Data from DMA processor 209 is transferred to formatter 207 via an entry in field 1019 of transmit command memory 407. The data from field 1019 is transferred to field 1017 via bus 1052, data selector 1007, and bus 1056, under control of PLA 1001 via conductor 1053. During each time slot, the data in field 1017 is right-shifted one bit position by bit shift circuit 1006, as follows. During each time slot, the contents of field 1017 are transferred to bit shift circuit 1006 via conductor 1057. Bit shift circuit 1006 performs the right-shift operation, and transfers the shifted data to data selector 1007 via conductor 1058. Data selector 1007 then writes the shifted data back into field 1017 via bus 1056. The least significant bit of the data from field 1017 passes to data selector 1002 via bus 1032. PLA 1001 uses cable 1031 to select the data on bus 1032 as the output data from data selector 1002. The data is then passed, via bus 1036, to parity generator 1005 and to buffers 1003 and 1004. Parity generator 1005 generates one parity bit for each data bit, and passes this parity bit to buffers 1003 and 1004. Buffer 1004 handles all data and parity bits for all customers associated with group distributor circuit 205 and buffer 1003 handles all data and parity bits for all customers associated with group distributor circuit 206. The buffer selected to transmit the data and parity bits is determined via a signal from transmit channel counter 410.

Bit stuffing is done in the following manner. Increment 1010, AND gate circuit 1011, and field 1015 cooperate to count the number of consecutive "1's". Each data bit from data field 1017 is passed, via data selector 1002, to AND gate circuit 1011 via conductor 1025. Each "1" contained in the least significant bit position in data field 1017 causes increment 101 to increment, and place the result of the counter into field 101 via cable 10265. Each "0" contained in the least significant bit position of data field 1017 causes AND gate circuit 1011 to reset field 1015 to "0". The current count in field 1015 is passed to increment 1010 and five 1's detector 1009 via cable 1027. If the count in field 1015 reaches "5", indicating that five "1's" have been transmitted in succession, five 1's detector 1009 signals this fact to receive PLA 1001 via conductor 1060. This signal causes PLA 1001 to signal data select 1002 to place a stuffed "0" into the data stream at the beginning of the next time slot. This is done by causing the "0" signal on conductor to be selected and thus to be passed, via bus 1036, to buffers 1003 and 1004, and parity generator 1005. When a bit stuff operation occurs, receive PLA 1001 also signals shift circuit 1006, via conductor 1059, not to shift the data.

CRC generation is done in the following manner. CRC generator 1008 receives each data bit via conductor 1040, and continually calculates the CRC for the data bits (excluding stuff bits) received thus far. After each CRC calculation, CRC generator 1008 stores the result in field 1014, via conductor 1039. After the last bit of the last data byte has been transmitted, CRC generator 1008 shifts the final calculated CRC code, one bit at a time, to data selector 1002 via conductor 1033, under control of PLA 1001 via conductor 1061. PLA 1001 then signal data selector 1002, via cable 1031, to use the calculated CRC code as its output. This CRC code is sent, one bit at a time, to buffers 1003 and 1004, and to parity generator 1005.

PLA 1001 must be notified when a complete byte has been transmitted, in order to obtain new bytes from DMA processor 209, and in order to properly signal the transmission of the CRC code at the end of the packet. Determining when a complete byte has been transmitted is done in the following manner. Each time a bit other than a stuff bit is transmitted, PLA 1001 signals bit increment 1013 via a signal on conductor 1043. Each time bit increment 1013 is signaled, it increments bit count field 1016 via AND gate circuit 1012 and conductor 1044. When field 1016 indicates that eight bits have been transmitted, 8-bit detector 1018 is signaled via a cable 1041; this causes 8-bit detector 1018 to notify PLA 1001, via a signal on conductor 1045, that a complete byte has been transmitted. PLA 1001 then clears field 1016 via AND gate circuit 1012 and conductor 1042.

Idle and flag patterns are transmitted under control of PLA 1001 and data selector 1002. This is done by PLA 1001 properly selecting, via cable 1031, the appropriate "0" and "1" signal from conductors 1034 and 1035.

The state diagrams for transmit state machine 409 are shown in FIGS. 11 through 14. State 1100 is the initial state of transmit state machine 409. If DMA processor 209 issues an abort command, transmit state machine 409 executes states 1103, 1101, 1104, 1105, 1106, and 1107; this sequence causes transmit state machine 409 to place an abort entry into transmit status FIFO 408, and to transmit a series of eight "1's". If DMA processor 209 does not issue an abort command, transmit state machine 409 executes states 1102, 1101, 1104, 1105, 1106, and 1107; this sequence causes transmit state machine 409 to transmit a series of eight "1's" without placing an entry into transmit status FIFO 408. Transmit state machine 409 remains in state 1107 as long as either an idle or abort command is being transmitted by DMA processor 209.

When DMA processor 209 removes the idle and abort commands, transmit state machine 409 executes states 1108 through 1111. This causes a flag pattern to be generated, as follows: state 1108 transmits a "0", state 1109 transmits five "1's" because it is repeated five times, state 1101 transmits a "1", and state 1111 transmits a "0". In addition to transmitting a "0", state 1111 clears bit count field 1016, presets CRC field 1014 and clears toggle bit field 1046 in transmit state memory 406. If any one of the following conditions are present, states 1108 through 1111 will be continually repeated: transmit status FIFO 408 is full, the last data byte has been transmitted, the send bit in field 1051 of transmit command memory 407 has not been set, or the toggle bit output from exclusive OR gate 1021 (conductor 1049) indicates that a new byte has not been received. If none of these previously mentioned conditions are met, state 1113 is executed.

When state 1113 is executed, several actions occur. First, the transmit data contained in field 1019 of transmit command memory 407 is transferred to data field 1017 of transmit status memory 406 via bus 1052 and data selector 1007. Data selector 1007 is controlled by PLA 1001 via conductor 1053. Next, bit count field 1016 is incremented by one, CRC field 1014 is updated with the current value via CRC generator 1008 and conductor 1039, the data in data field 1017 is right-shifted one bit position via bit shift circuit 1006, a next byte request is placed into transmit status FIFO 408 via conductor 1054, and the sense of toggle bit field 1046 in transmit status memory 406 is updated to agree with the sense of toggle bit field 1050 in transmit command memory 407. Finally, the first data bit is transferred from data field 1017 to the appropriate group distributor circuit, as previously described. After state 1113 is executed, state 1112 is executed. State 1112 performs bit count field updating, CRC calculation, right-shifting of data, and data bit transmission in manner identical to that of state 1113. State 1112 is repeatedly executed until five 1's detector 1009 detects five consecutive "1's", until eight bits are transmitted, or until an error condition occurs. When five "1's" are detected, state 1114, which performs the bit stuffing function, is executed. State 1114 stuffs a "0" into the data stream via data selector 1002 and cable 1031; however, the stuffed "0" does not increment bit count field 1016. State 1113, 1112, or 1114 is executed until the entire frame has been transmitted, as follows. State 1113 is executed during the transmission of the first bit of a new byte, state 1112 is executed after the first bit of a new byte has been transmitted, and state 1114 is executed each time it is necessary to stuff a "0" into the bit stream.

After an entire packet has been transmitted, transmit state machine 409 will execute either state 1117 (if good CRC is to be transmitted), or state 1124 (if bad CRC is to be transmitted). The end of the packet is indicated by a "1" in field 1055, which indicates that the last byte has been transferred from DMA processor 209 to formatter 207. The type of CRC to be transmitted is determined from field 1051, which is written by DMA processor 209. If field 1051 is "0", good CRC is transmitted; if field 1051 is "1", bad CRC is transmitted. If good CRC is to be transmitted, transmit state machine 409 goes to state 1117 via transition 1134 and executes states 1117, 1116, 1118, 1120, and 1121 as required. State 1117 transfers the first bit of the CRC code from CRC generator 1008 to data selector 1002, updates CRC field 1014, increments bit count field 1016 (which is counting the number of bits that are being transmitted in the CRC field), and places a next byte request into transmit status FIFO 408. This FIFO entry informs DMA processor 209 that formatter 207 is now transmitting the CRC bits. States 1116 and 1120 transmit each bit of the CRC code and increment field 1016 after each CRC bit is transmitted. Additionally, states 1118 and 1121 perform bit stuffing as required. After the last CRC bit has been transmitted, states 1122, 1123, and 1115 are executed to transmit the end flag pattern of the packet. At this time, transmit state machine 409 returns to state 1111 via transition 1135 in order to transmit the next packet.

If DMA processor 209 indicates, via field 1051, that bad CRC is to be transmitted, transmit state machine 409 goes to states 1124 through 1126. States 1124 through 1126 generate the bad CRC pattern, which is 16 bits of alternate "0" and "1". The number of bad CRC bits is maintained via field 1016.

Receive state machine 404 is shown in greater detail in FIG. 15. Receive state machine 404 comprises a programmable logic array (PLA), and a number of associated hardware components that cooperate to perform the actual receive data formatting. The following description pertains to the receive data associated with customer 100; it should be understood that receive state machine 404 performs similar functions for the receive data associated with each of the other 127 customers. Receive state machine 404 performs the following formatting functions: performs flag and packet recognition, does bit unstuffing, performs character assembly and passes characters to DMA processor 209, calculates and checks the CRC of each incoming packet, notifies DMA processor 209 at the end of each frame with good or bad CRC status, detects aborted frames and notifies DMA processor 209 of aborted frames, and notifies DMA processor 209 of idle lines. In addition to these formatting functions, receive state machine 404 also has the capability of looping data from the transmit data path directly to the receive path, in order to test both data paths.

Receive state machine 404 performs formatting functions for each of the 128 customers. Data and parity from each of the 128 customers are received from group distributor circuits 205 and 206 via cables 421 and 422. The customer to which the present incoming bits are associated is determined from receive channel counter 405. Receive channel counter 405 is preset to 49, wraps around from 127 to 0, and continues to count to 48. This preset creates an 80 bit time delay between the transmit and receive state machines. This occurs because of delays encountered from the data passing through the group distributor circuits and the line circuits. Each time receive channel counter 405 increments, receive state machine 404 reads receive state memory 401 and receive command memory 402 at the memory locations corresponding with the customer currently being serviced. The proper address in these memories is determined from receive channel counter 405, which properly addresses receive state memory 401 via bus 1520, and receive command memory 402 via conductor 1521.

Flag, abort, and idle line recognition is done in the following manner. The incoming bits, which include flags, data bits, stuff bits, and associated parity bits, are received from group distributor circuit 205 on cable 421 and from group distributor circuit 206 on conductor 422. This data is passed through latch 1515 to data selector 1516. Data selector 1516 normally selects data from latch 1515 as its input; it selects data from latch 1514 as its input only during a loop operation, as described later. Similarly, parity selector 1543 normally selects parity from latch 1515 as its input; it selects parity from latch 1514 as its input only during a loop operation. The data from data selector 1516 is passed to flag PLA 1502 via conductor 1522; the state of flag PLA 1502 is then written into field 1540 via cable 1539. Flag PLA 1502 detects flag patterns, abort patterns, and idle line patterns. Each time one of these patterns is detected, flag PLA 1502 passes the appropriate indication to receive PLA 1501 via cable 1518. The parity bits selected via parity selector 1543 are forwarded to parity check circuit 1541, which checks for parity errors. If any parity errors are found, that fact is reported to receive PLA 1501 via conductor 1542.

Bit unstuffing is done in the following manner. After flag PLA 1502 has detected a flag, it counts the number of consecutive "1's". Each time five consecutive "1's" are counted, and the next bit is a "0", flag PLA 1502 determines that this next bit is a stuffed "0"; flag PLA 1502 effectively removes this stuffed "0" by activating conductor 1519. When conductor 1519 is activated, bit counter 1508, shift circuit 1507, and CRC circuit 1509 ignore the stuffed "0", which removes it.

Data transfer from customer 100 to DMA processor 209 is done in the following manner. Each new data bit is received from group distributor circuit 205 on cable 421 and is transferred to the most significant bit position of shift circuit 1507 via conductor 1522. The new data bit, along with the shifted previous data bits, are then written into data field 1523 of receive state memory 401 via bus 1524. Each incoming data bit that is not a stuff bit causes bit counter 1508 to increment by one. The current bit count is stored in field 1525 via cable 1526. Once bit counter 1508 reaches eight, indicating that an entire data byte has been assembled, it signals this to receive PLA 1501 via conductor 1527. Receive PLA 1501 responds to this signal by placing a FIFO write signal on conductor 1529 and activating data selector 1511 via a signal on conductor 1528; this causes the data from bit field 1523 to be written into receive status FIFO 403 via bus 1530. If receive status FIFO 403 is full, it indicates this fact to receive PLA 1501 via a signal on conductor 1531.

CRC checking is done in the following manner. Each new data bit is passed from data field 1523 to CRC circuit 1509 via conductor 1517. CRC circuit 1509 calculates a new CRC code based on each new data bit, and writes the new value into field 1533 via cable 1534. With each new bit received, CRC circuit updates field 1533 with the CRC code calculated over the data bits received thus far. After an entire packet has been received (determined by the detection of a flag by flag PLA 1502), CRC circuit 1509 compares the CRC code that it calculated over the entire packet (including the CRC field) with a fixed constant. If there is a mismatch between the calculated CRC code and the fixed constant, CRC circuit 1509 generates a bad CRC signal on conductor 1535; if there is no mismatch, CRC circuit 1509 generates a good CRC signal on conductor 1535. This CRC signal (good or bad) is written into receive status FIFO 403 along with other status information that is generated by receive PLA 1501 and written into receive status FIFO 403 via conductor 1536 and data selector 1511.

Data looping is done in the following manner. Memory 1513 contains separate memory locations for each of the 128 customers. During normal operation, memory 1513 is loaded with transmit data and parity via cables 423 and 424 at the address specified by transmit channel counter 410 via selector 1512, which receives its timing signal from formatter clock 425 via conductor 427. However, the data and parity contained in memory 1513 is ignored because data selector 1516 selects the normal receive data from cables 421 and 422. DMA processor 209 requests a data looping function by setting the loop bit in field 1538 of receive command memory 402. This bit causes data selector 1516 to select memory 1513 as its data input via conductor 1537, thus causing the transmit data in memory 1513 to be read from memory 1513 at the location specified by receive channel counter 405, via selector 1512, and formatted in exactly the same way as the normal customer receive data. It then causes the transmit data to be transmitted back to DMA processor 209 via an entry in receive status FIFO 403. During the looping process, any data from the customer that is present on cables 421 or 422 is ignored.

Figure 17:
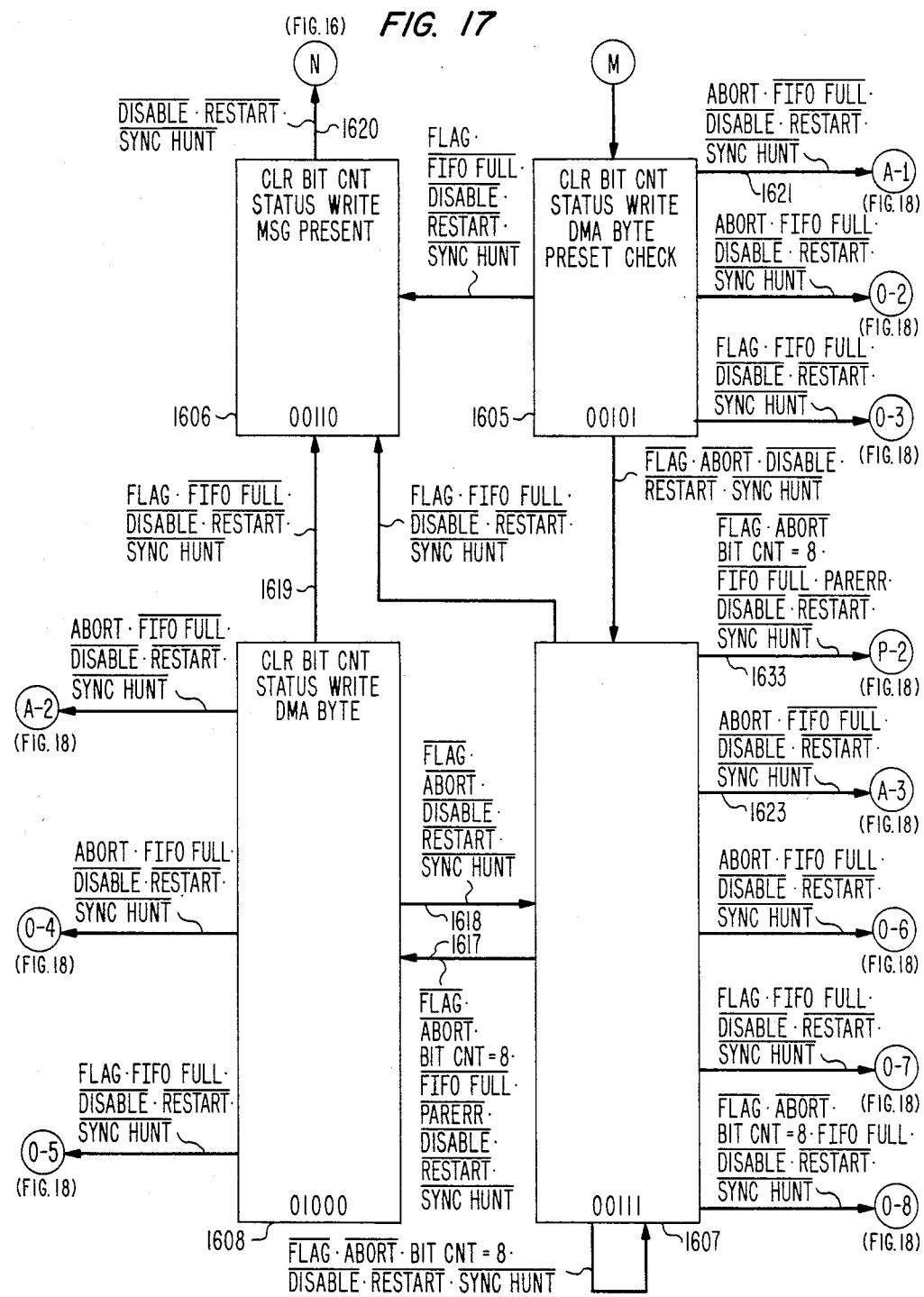
Figure 18:
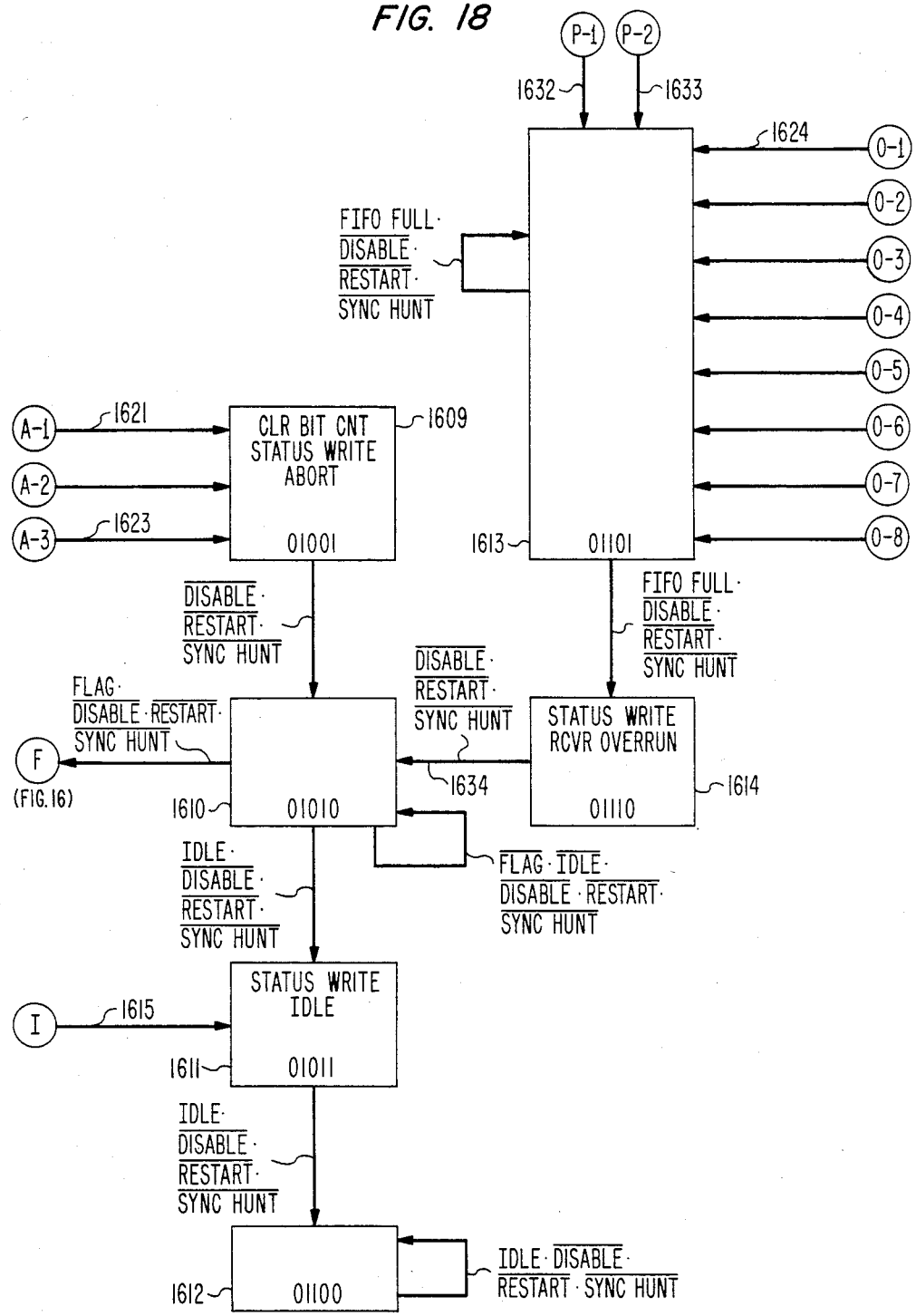

The state diagrams for receive state machine 404 are shown in FIGS. 16 through 18. State 1600 is the initial state of receive state machine 404. If the customer is idle, receive state machine 404 moves to state 1611 via transition 1615, and generates an idle condition to DMA processor 209 via a write command to receive status FIFO 403. Receive state machine 404 then remains in an idle state by continually executing state 1612. If the current state is 1600, and flag PLA 1502 detects a flag, indicating the possible start of a new packet, receive state machine 404 executes state 1601, which clears bit count field 1525. Next, state 1603 is executed. In state 1603, each new data bit is written into field 1523 and count field 1525 is incremented. State 1603 is repeated via transition 1616 until an entire data byte has been received. If a flag is detected as the next byte, it indicates that the previous flag was not the start of a new packet, but that it was a flag pattern that is transmitted between packets. Since the flag just received may be the start of a new packet, state 1601 is executed. Once an entire data byte has been received, state 1605 is executed. In state 1605, bit count field 1525 is cleared, the data byte contained in field 1523 is written into receive status FIFO 403, and the CRC check portion of CRC circuit 1509 is preset to all "1's". After state 1605 is executed once, state 1607 is executed. In state 1607, the next data byte is collected by writing each data bit into field 1523, and incrementing field 1525. After the entire data byte has been collected, state 1608 is executed. In state 1608, the just collected data byte is written into receive status FIFO 403 and bit count field 1525 is cleared. All subsequent data bytes of the packet are collected an written into receive status FIFO 403 by alternating the execution of states 1607 and 1608 via transitions 1617 and 1618. After the last data byte of a packet has been received (indicated by the reception of a trailing flag pattern), receive state machine 404 enters state 1606 via transition 1619. In state 1606 bit count field 1525 is cleared, and receive status FIFO 403 is written with an end of message indication. After state 1606 is executed, receive state machine 404 returns to state 1603 via transition 1620 to prepare to receive the next packet.

If receive state machine 404 receives an abort from the customer during the execution of states 1605, 1607, or 1608, and receive status FIFO 403 is not full, state 1609 is executed via transitions 1621 through 1623. When state 1609 is executed, field 1525 is cleared, an abort indication is written into receive status FIFO 403. After state 1609 is executed, state 1610 is executed; this state is repeatedly executed until either an idle or flag is received. If a flag is received, state 1601 is executed via transition 1632; if an idle is received, state 1611 is executed via transition 1633. In state 1611, an idle message is written into receive status FIFO 403.

If a parity error is detected, or if receive status FIFO 403 is filled when any state that writes to receive status FIFO 403 is executed, state 1613 is executed via transitions 1624 through 1633. State 1613 is repeatedly executed until FIFO 403 is no longer filled; at this time, state 1614 is executed. When state 1614 is executed, a receive overflow indication is written into receive status FIFO 403, and state 1610 is executed via transition 1634.

Figure 19:
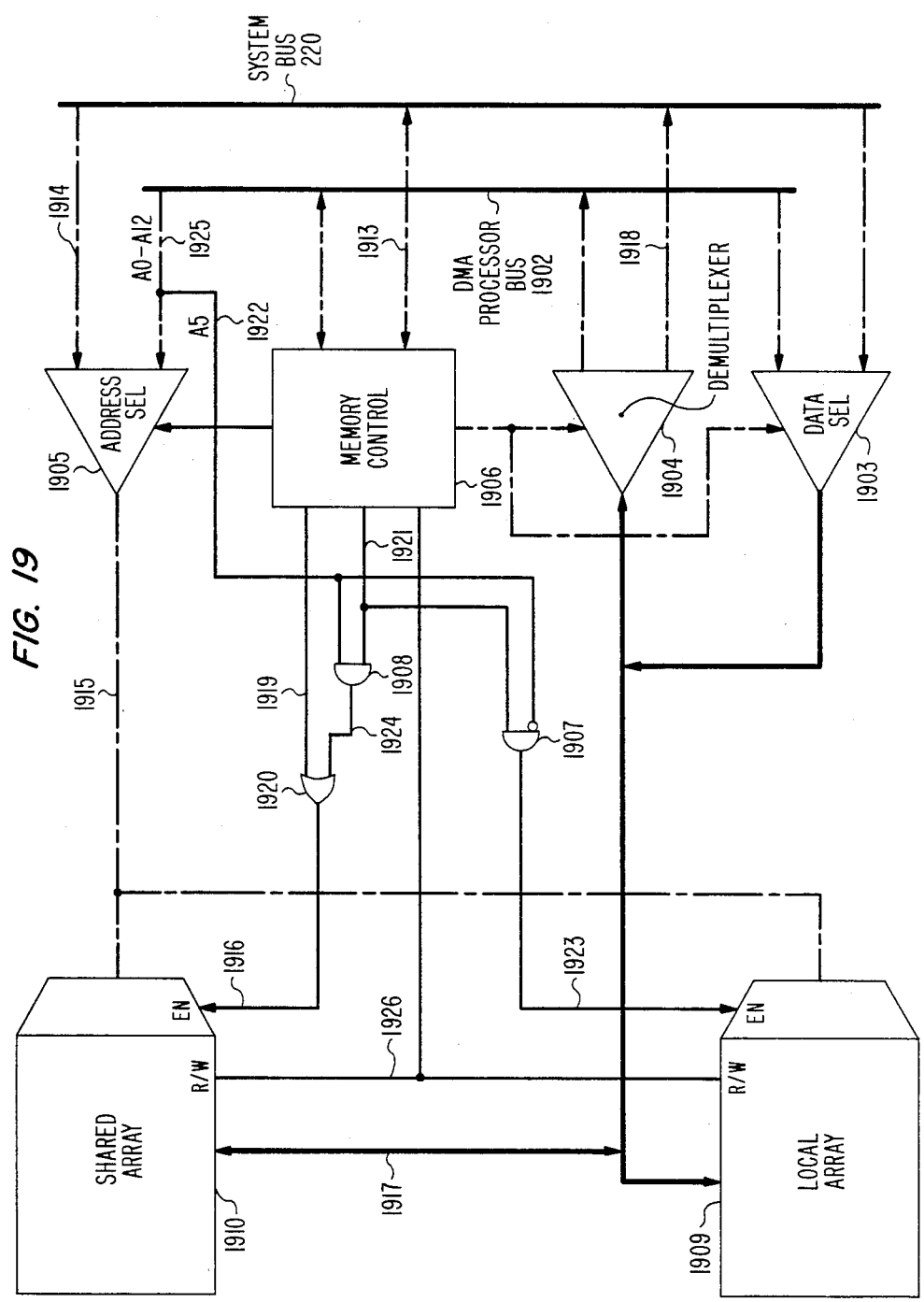
FIG. 19 is a detailed block diagram of shared memory 506.

Shared memory 506 is shown in greater detail in FIG. 19. As previously described, sections of words in shared memory 506 are logically associated with a channel. Main processor 225 addresses shared memory 506 as if its logical address space includes only words that are utilized by both main processor 225 and DMA processor 209 contiguously within the same memory space; whereas, DMA processor 209 addresses shared memory 506 assuming that its logical address space includes words that are used solely by DMA processor 209. FIG. 19 illustrates shared memory 506 and the fact that shared memory 506 comprises two unique memory arrays 1909 and 1910. Each array contains 32 words associated with each channel. Main processor 225 addresses only shared array 1910 whereas DMA processor 209 addresses both local array 1909 and shared array 1910. Within DMA processor 209's logical address space with respect to any particular channel the 32 words in local array 1909 are contiguous with the 32 words in shared array 1910. Main processor 225 writes messages each having a plurality of words into shared memory 506 by executing sets of program instructions.

This arrangement of the DMA processor's logical address space is accomplished by using the fifth address bit from DMA processor 209 to determine whether to access local array 1909 or shared array 1910. By utilizing the fifth address bit, the DMA processor's logical address space appears to be contiguous with respect to both local and shared memory words associated with any particular channel.

Turning now to a more detailed description of the operation of FIG. 19, main processor 225 accesses shared array 1910 by transmitting an address and a read request via system bus 220. Memory control circuit 1906 is responsive to the read request received from system bus 220 via cable 1913 to enable address selector 1905 to select the main processor address from system bus 220 via cable 1914. Address selector 1905 transmits this address to shared array 1910 via cable 1915. Memory control 1906 is also responsive to the read request to transmit an enable signal via conductor 1919 to OR gate 1920. OR gate 1920 is in turn responsive to the enable signal received via conductor 1919 to enable shared array 1910 via conductor 1916 to access the memory location designated by cable 1915. After shared array 1910 has been enabled, memory control 1906 transmits a read request via conductor 1926 to shared array 1910. Shared array 1910 is responsive to the read request to access the addressed memory location. After the latter has been performed, shared array 1910 transmits the contents of the accessed memory location to demultiplexer 1904 via bus 1917. Memory control 1906 has also conditioned demultiplexer 1904 to transmit the data received via bus 1917 to system bus 220 via cable 1918. In addition, memory control 1906 transmits to main processor 225 via system bus 220 and cable 1913 a memory completion signal. Main processor 225 is responsive to the memory completion signal to read the transmitted data from system bus 220.

Main processor 225 performs a write operation on shared array 1910 in a similar manner with the exception that the data is received from system bus 220 by memory control 1906 properly conditioning data selector 1903. After being properly conditioned, the latter transmits the information to the shared array 1910 via bus 1917. This information is written into shared array 1910 by memory control 1906 transmitting a write signal via conductor 1926 and properly enabling shared array 1910 via conductor 1919, OR gate 1920, and conductor 1916. Shared array 1910 is responsive to the write signal to store the information on bus 1917 into the memory location addressed by the address transmitted via cable 1915.

DMA processor 209 accesses the arrays 1909 and 1910 via DMA processor bus 1902 in a similar manner. The main difference is that the fifth address bit, A5, transmitted via conductor 1922 from cable 1925 is used to determine whether to select array 1909 or array 1910. Note that the remaining 12 address bits on cable 1925 are used by address selector 1905. If A5 is a "1", shared array 1910 is selected; whereas if A5 is a "0", local array 1909 is selected. When a read request is received by memory control 1906, the latter transmits a signal via conductor 1921 and a read signal via conductor 1926. If a "0" is being transmitted as the fifth address bit via conductor 1922, AND gate 1907 is properly conditioned and transmits the enable signal to local array 1909 via conductor 1923. If the state of the fifth address bit is a "1" on conductor 1922, then AND gate 1908 is properly enabled and transmits and enable signal to shared array 1910 via conductor 1924, OR gate 1920, and conductor 1916. Either shared array 1910 or local array 1909 is responsive to the enable signal to access the address data and to transmit this data via bus 1917 to demultiplexer 1904. Also, memory control 1906 properly conditions demultiplexer 1904 so that the accessed data is properly transmitted to DMA processor bus 1902. A memory write operation by DMA processor 209 is similarly executed with the exception that data selector 1903 is properly conditioned so that the information is transmitted to the appropriate array via bus 1917 along with the write signal.

Figure 20:
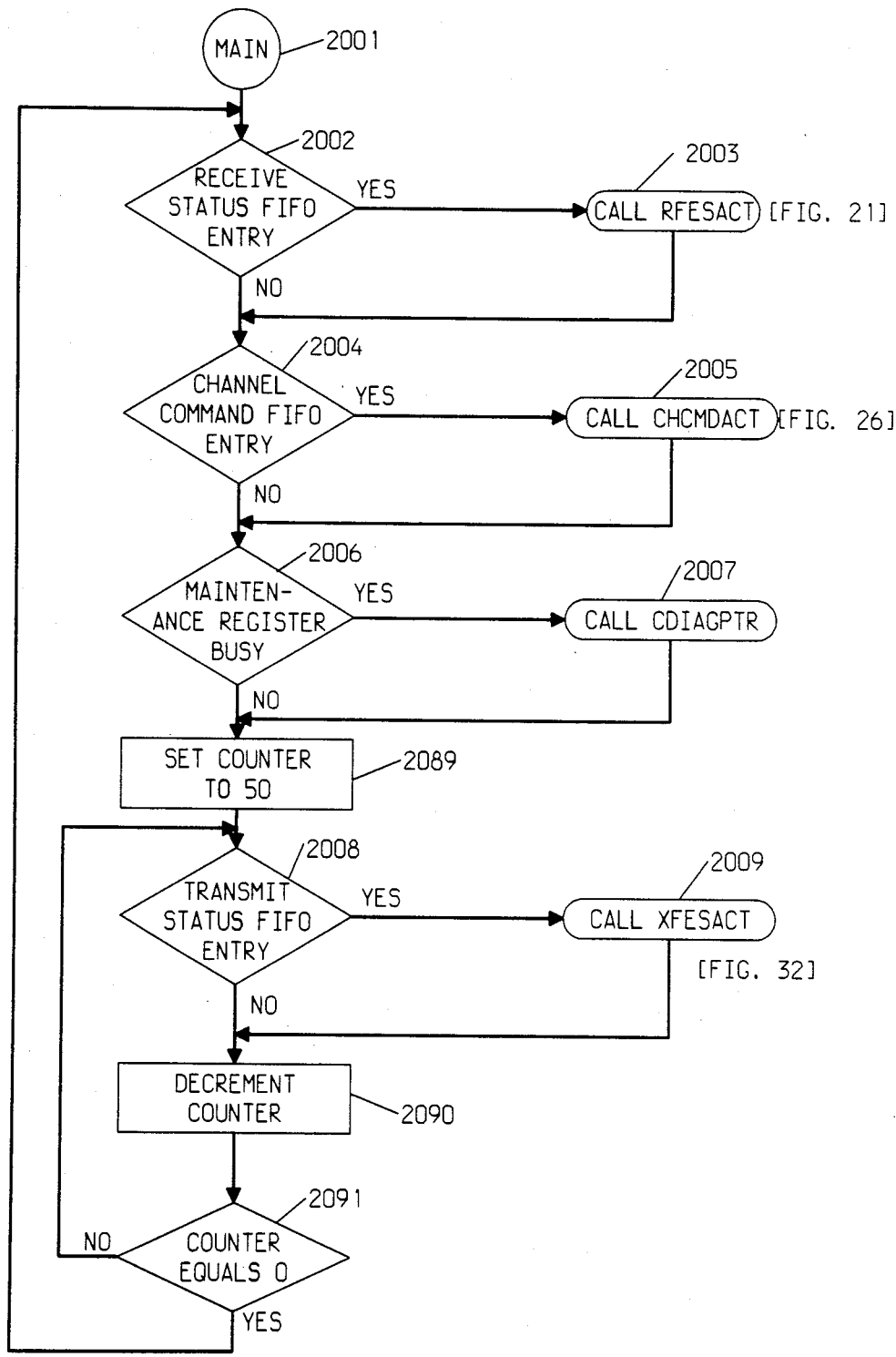
FIGS. 20 through 34 are flow charts for DMA processor 209.
Figure 21:
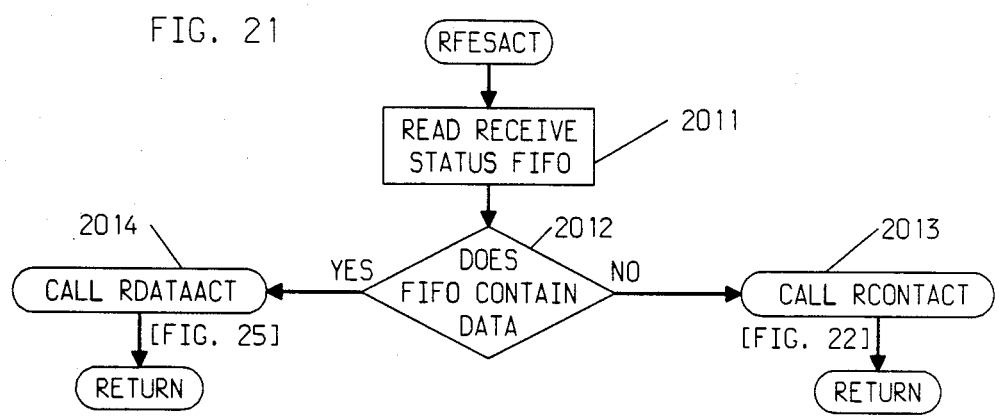
Figure 22:
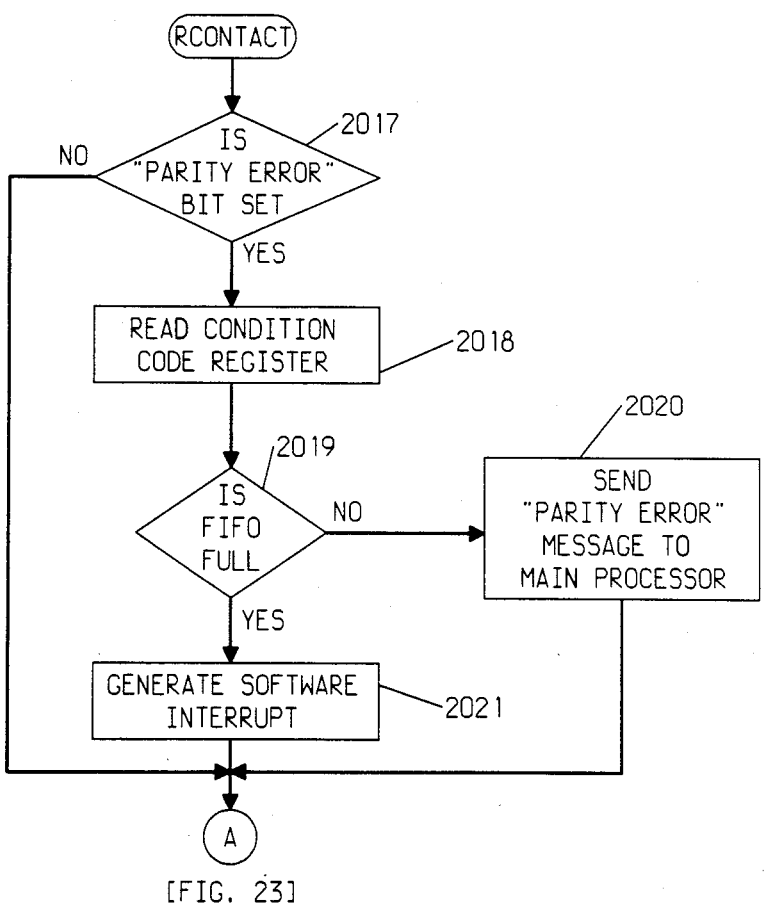
Figure 23:
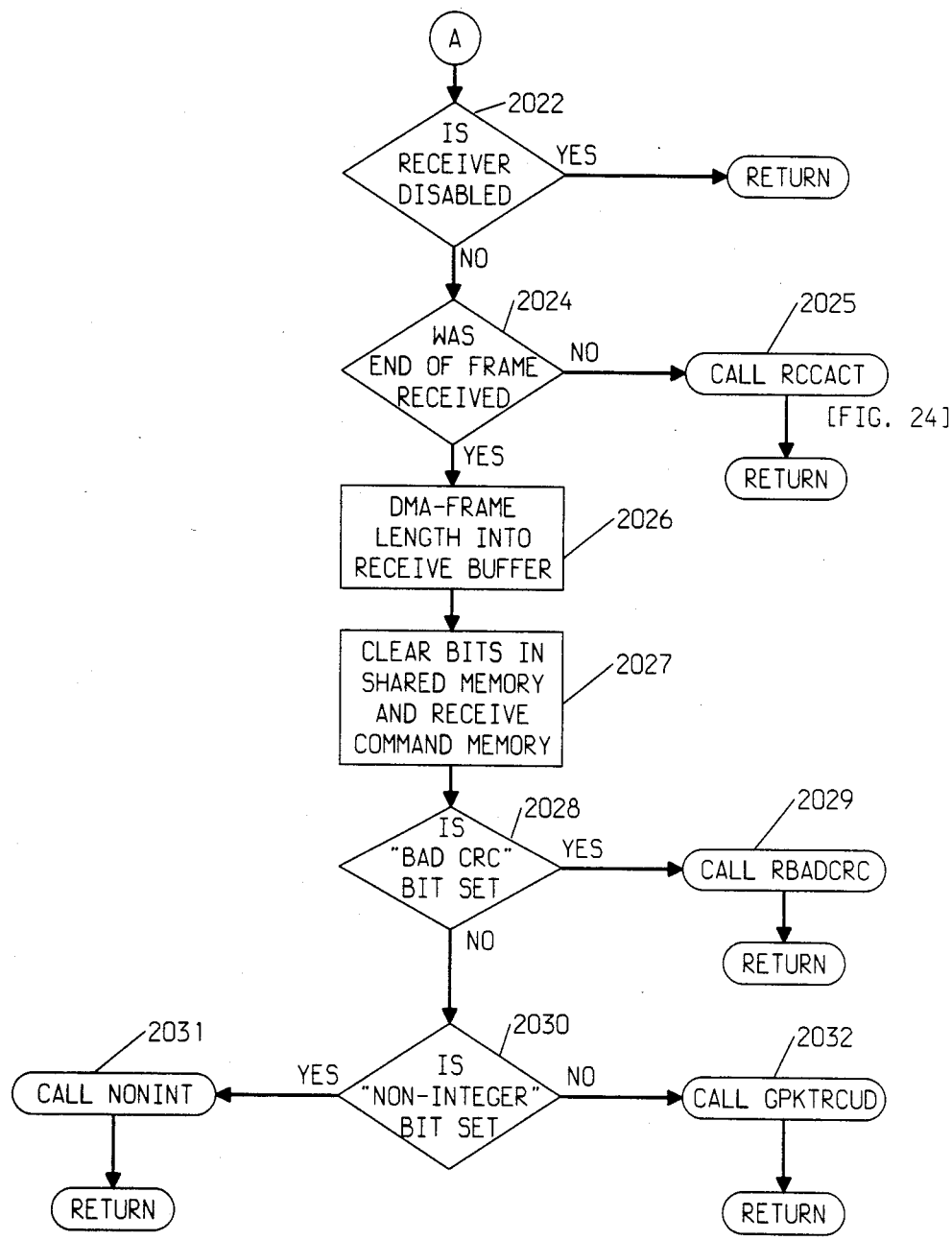
Figure 24:
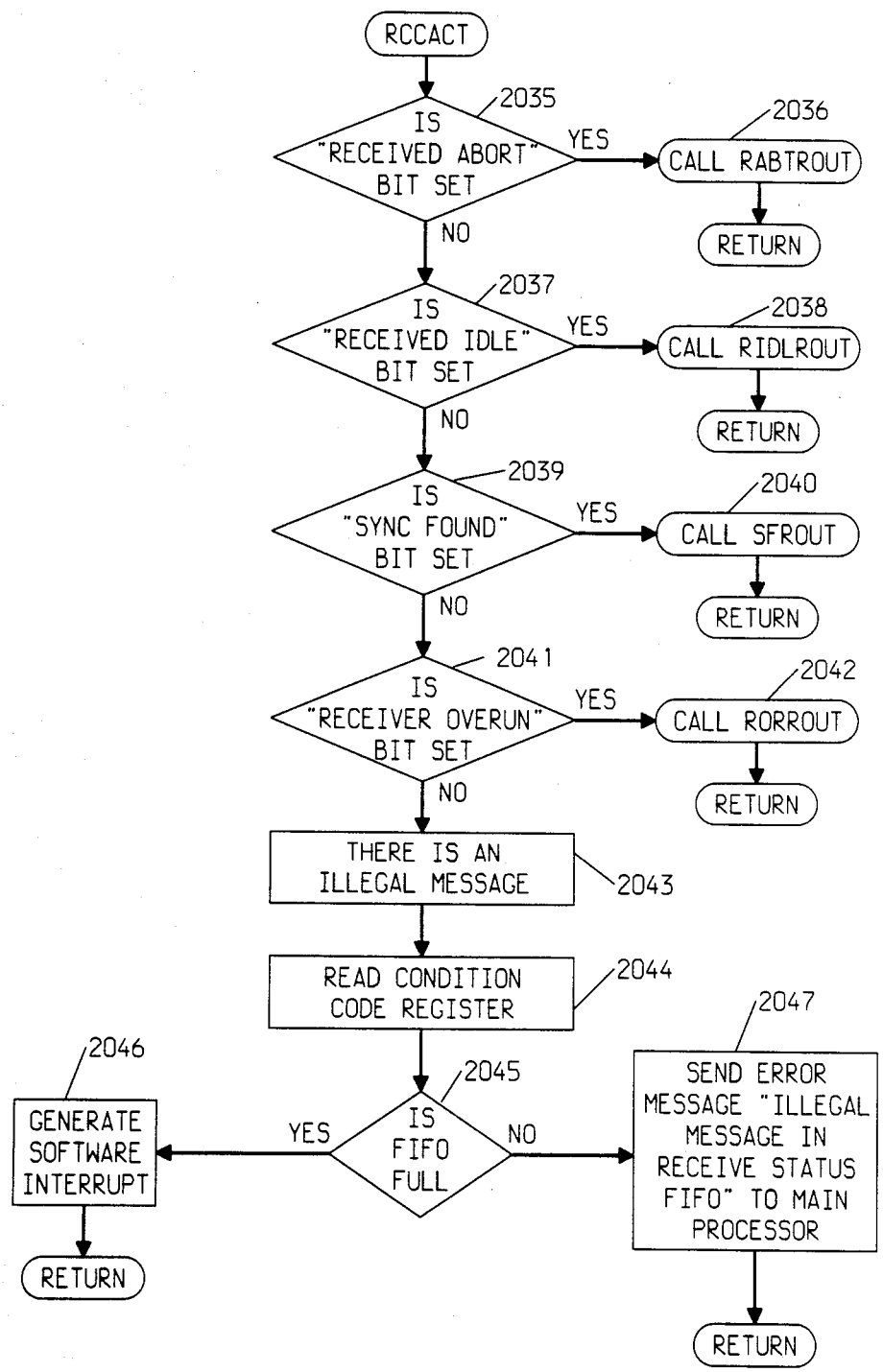
Figure 25:
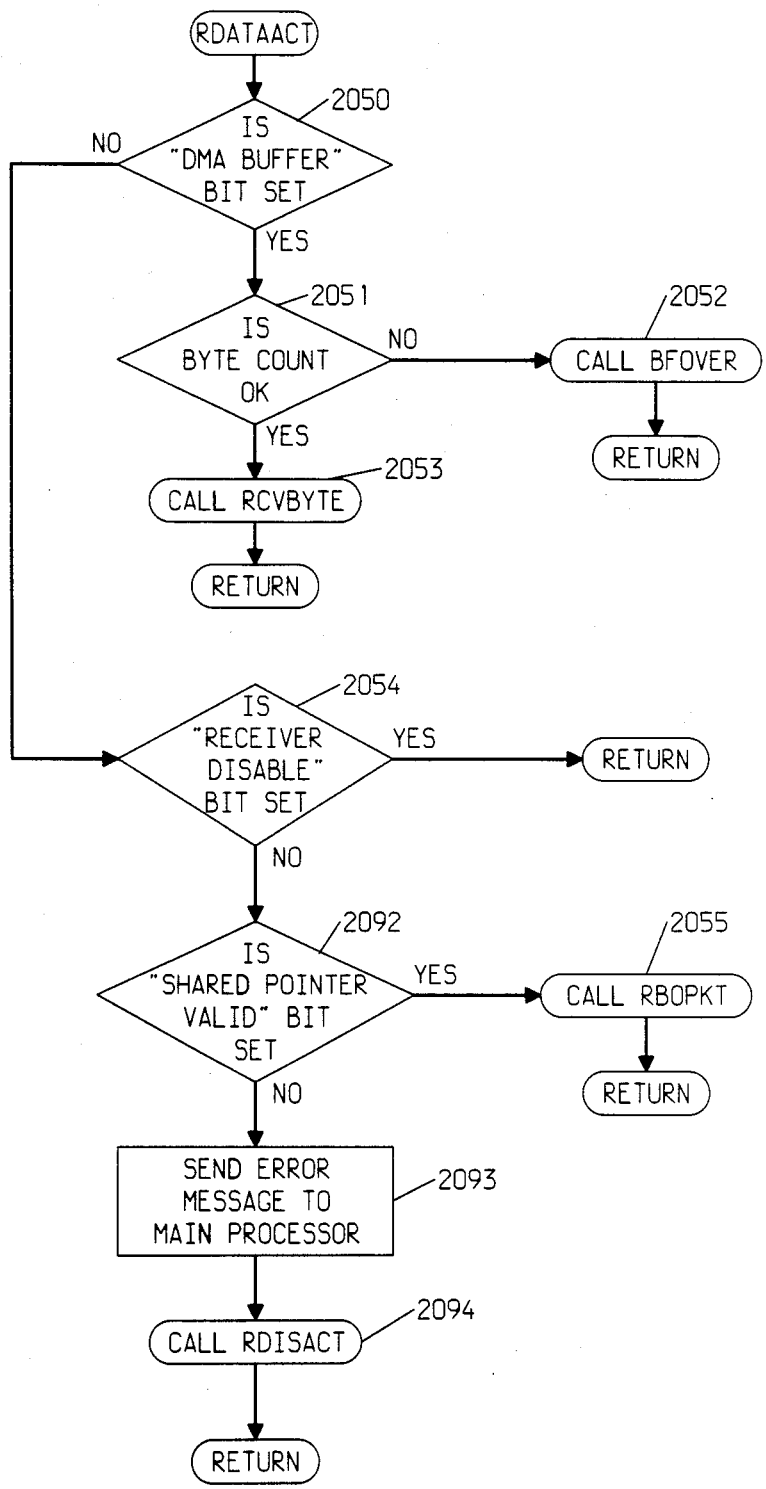
Figure 26:
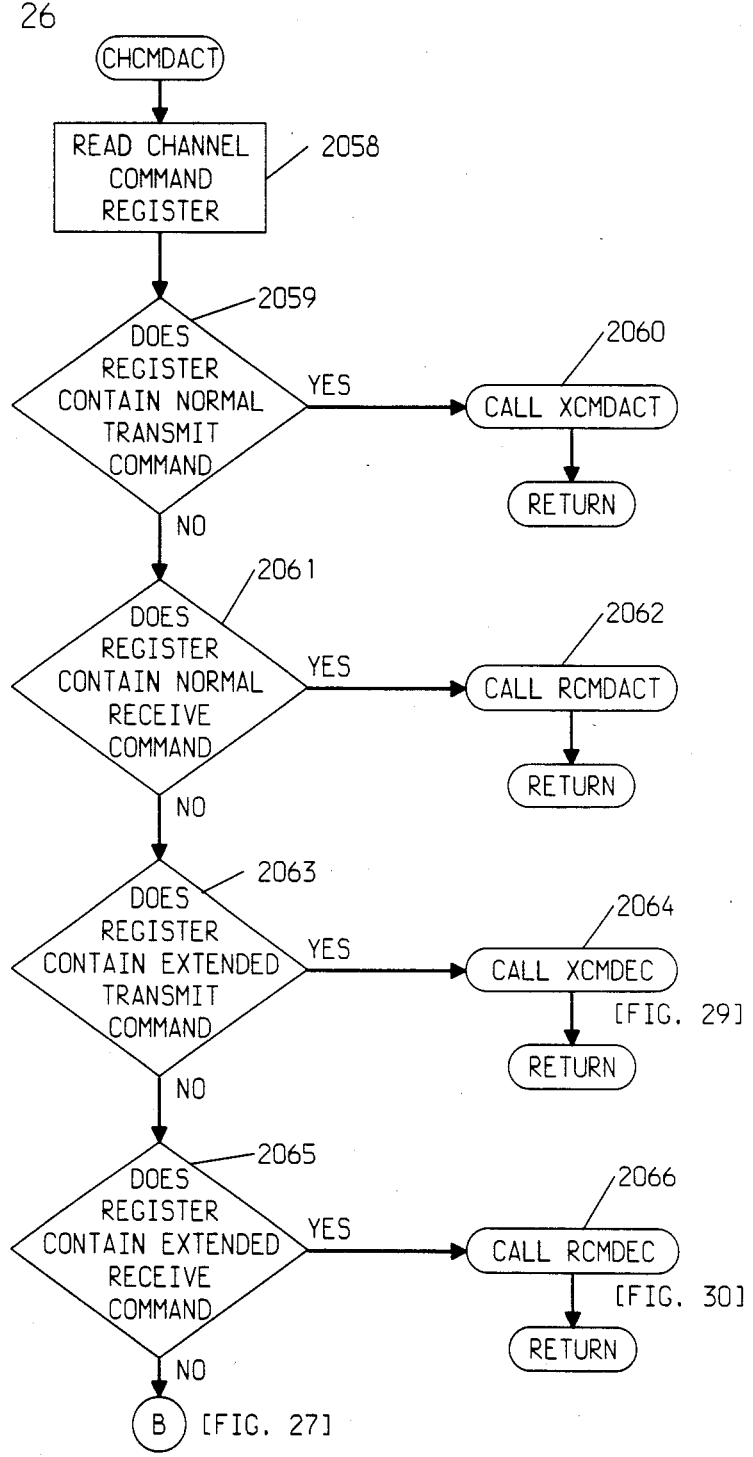
Figure 27:
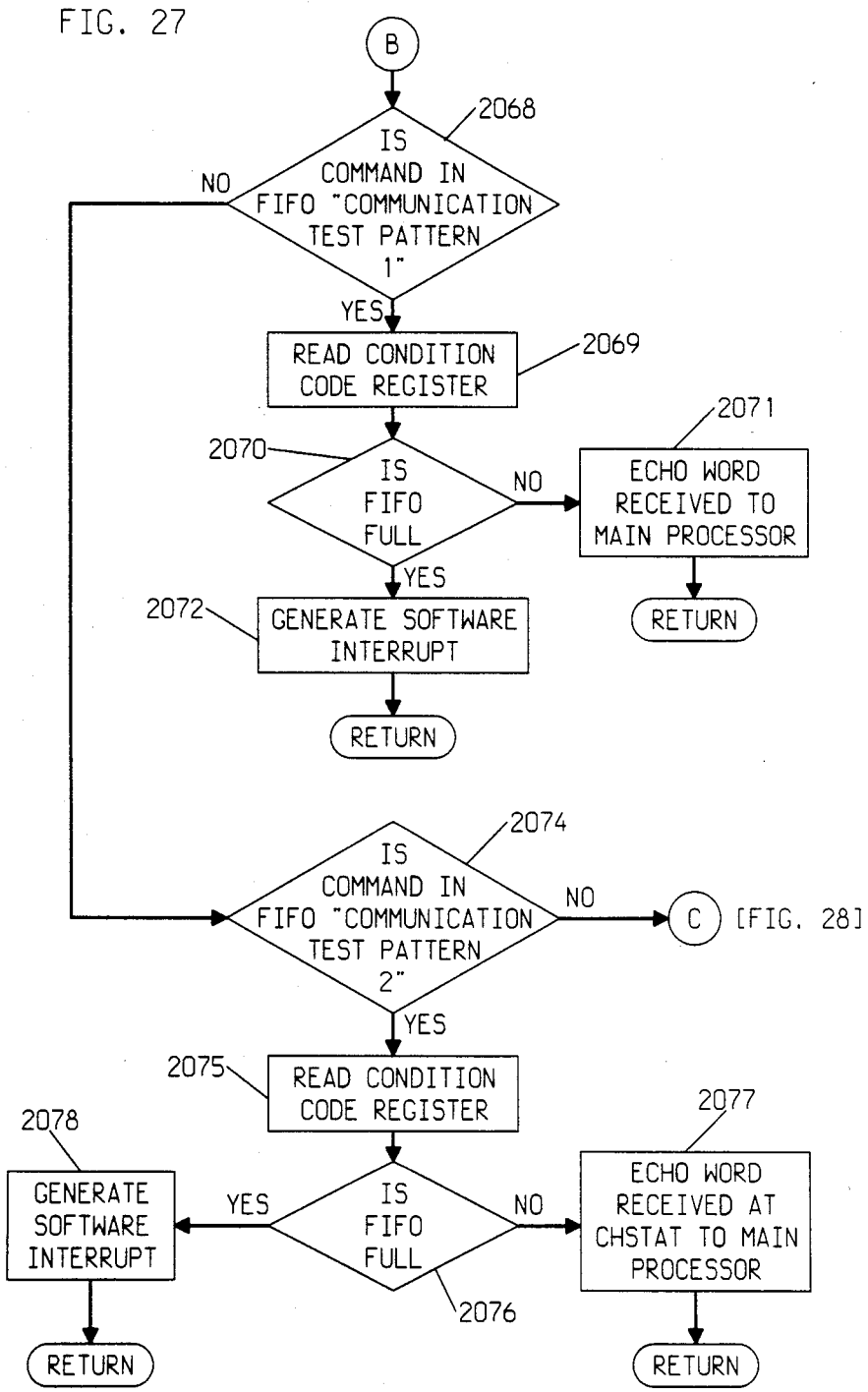
Figure 28:
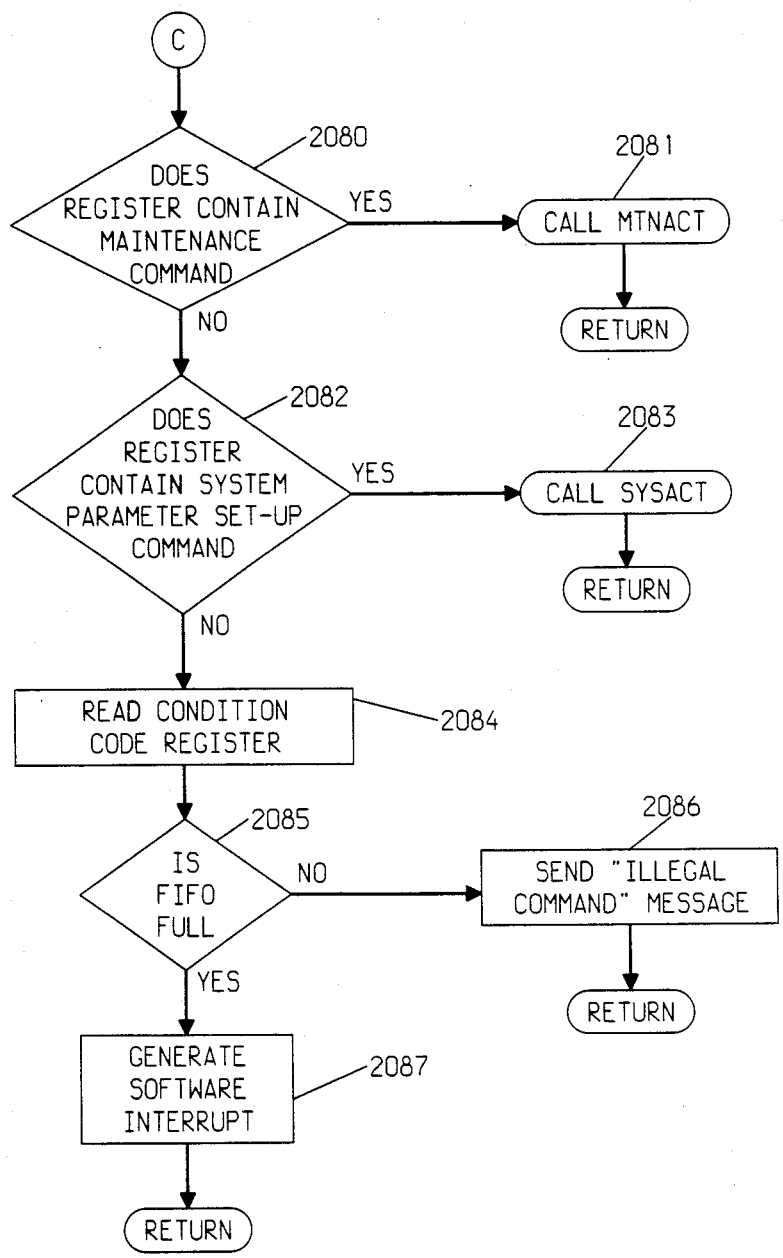
Figure 29:
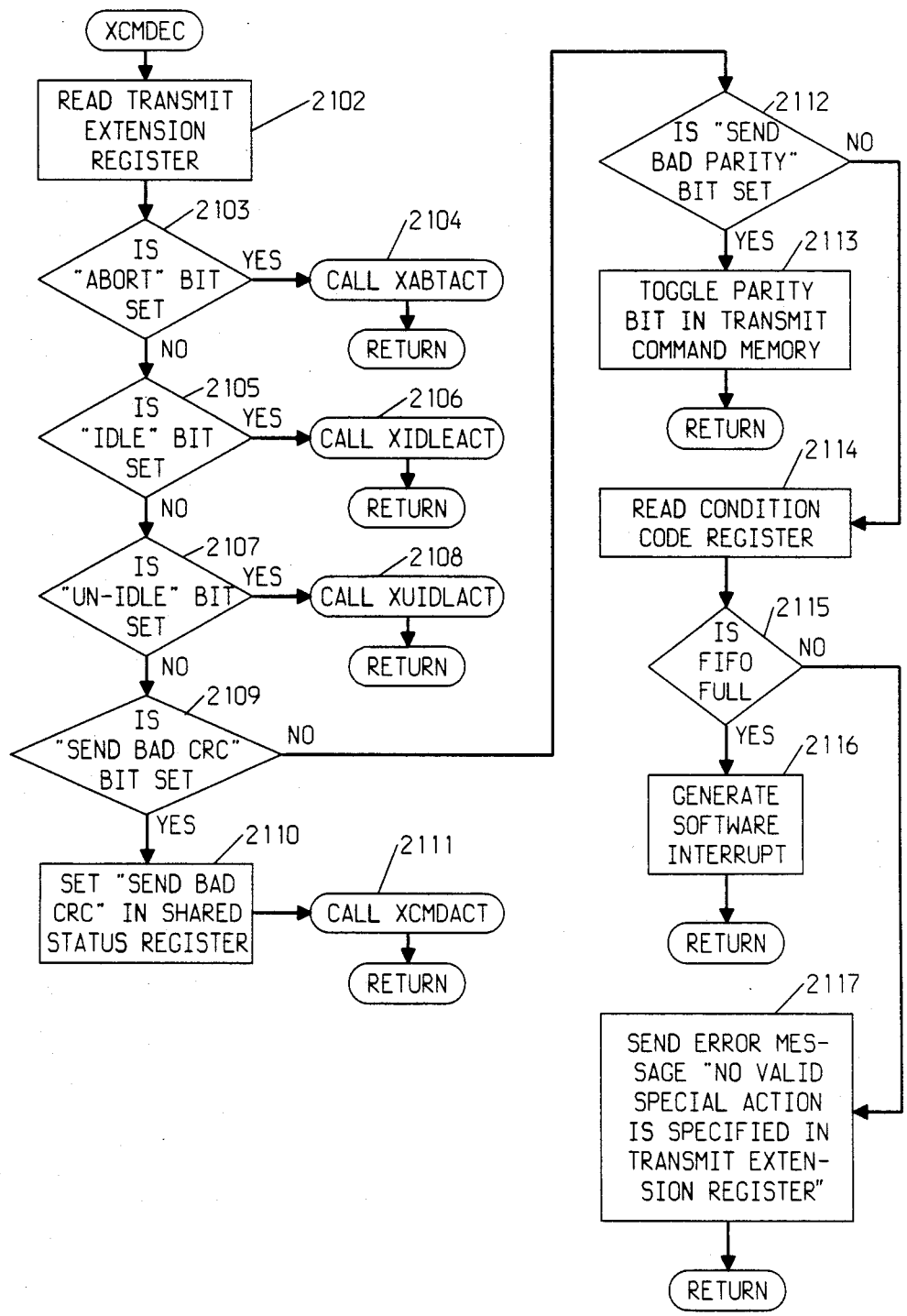
Figure 30:
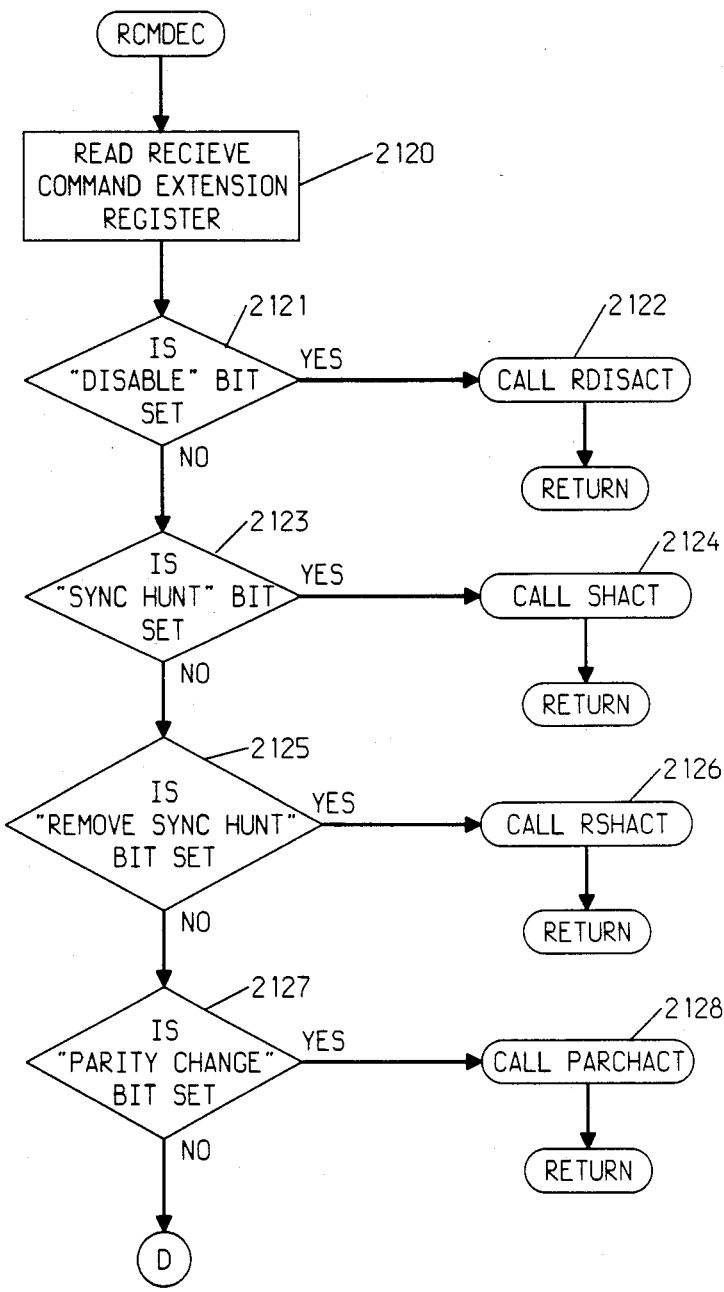
Figure 31:
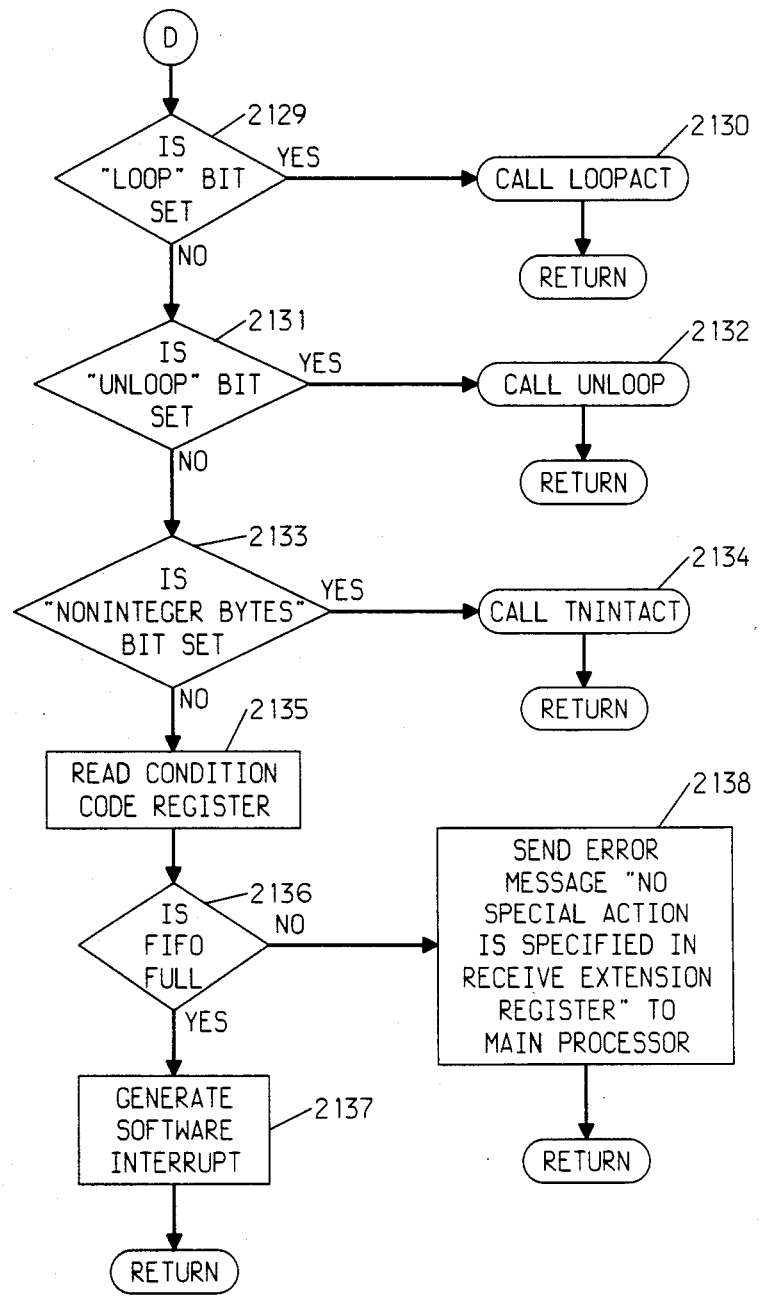
Figure 32:
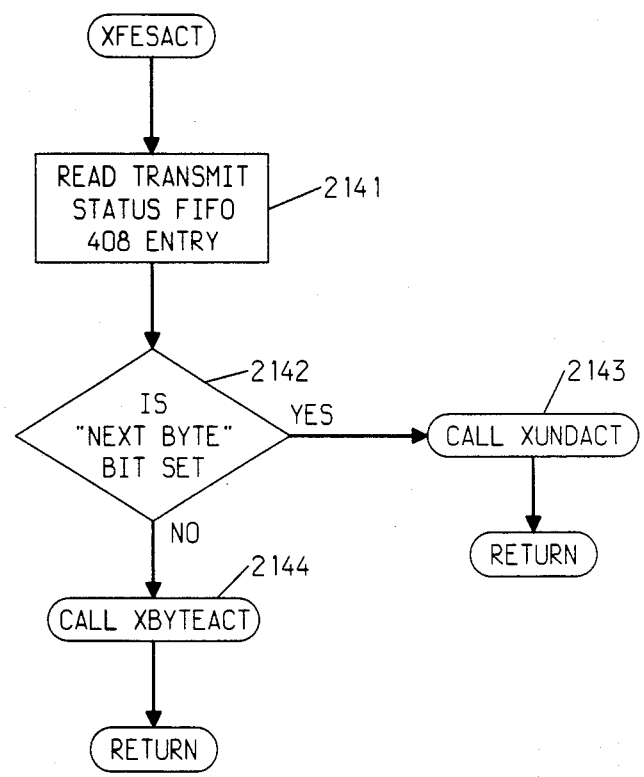
Figure 33:
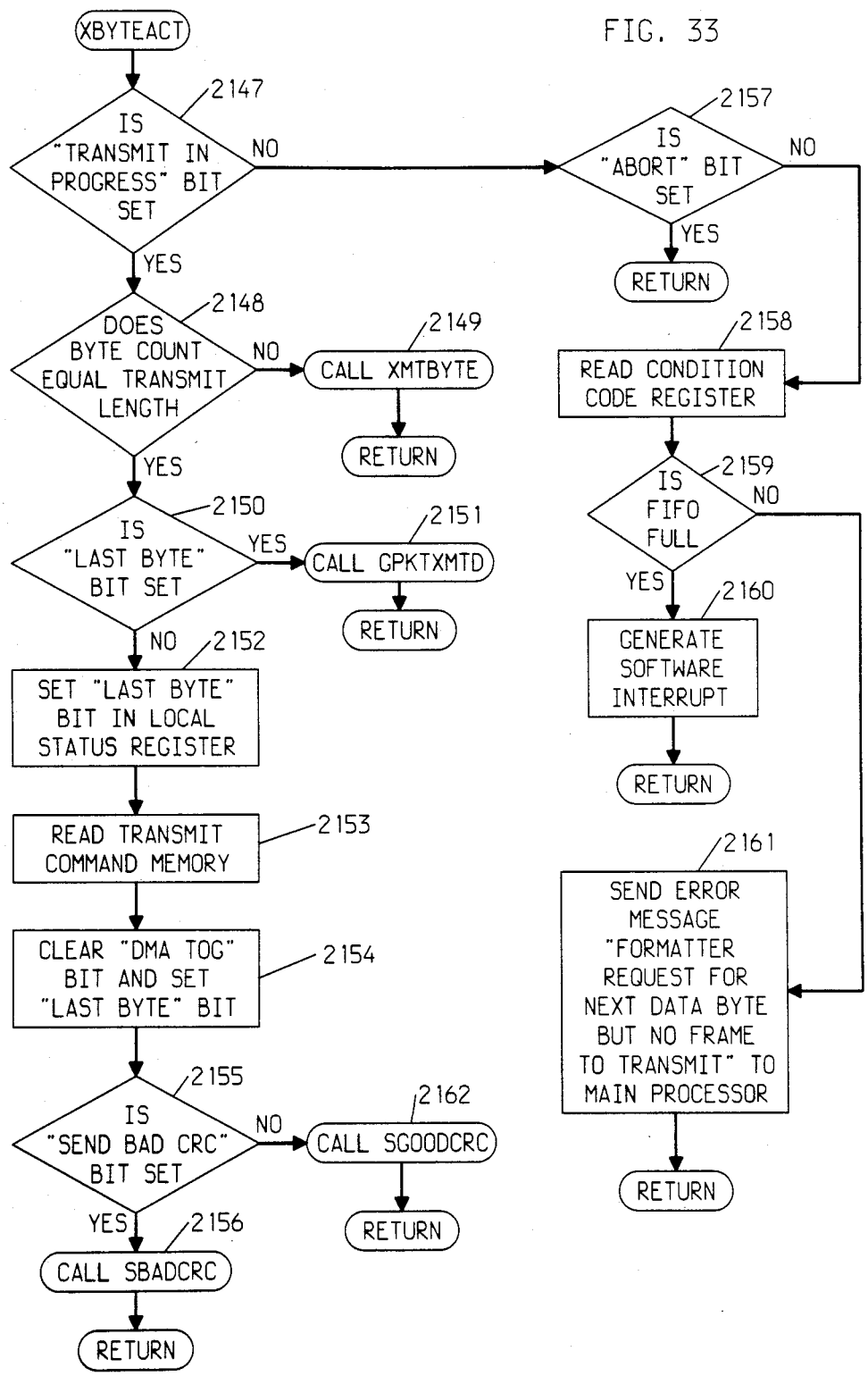
Figure 34:
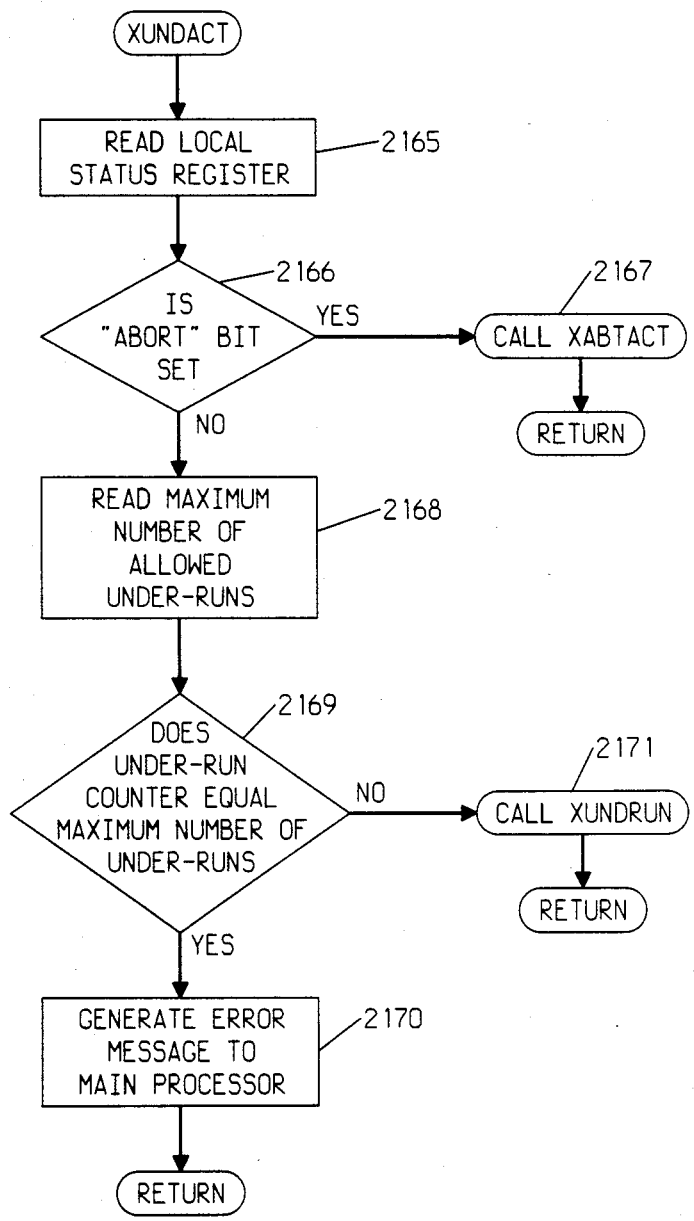

Flow charts for DMA processor 209 are shown in FIGS. 20 through 34. Routine main 2001, shown in FIG. 20, continually examines receive status FIFO 403, transmit status FIFO 408, and channel command FIFO 507 for entries. It then branches, via decision blocks 2002, 2004, and 2008, and execution blocks 2003, 2005, 2007, and 2009, to the appropriate routine after finding an entry: rfesact for a receive status entry, chcmdact for a channel command entry, cdiagptr for a maintenance entry, or xfesact for a transmit command entry. Routine cdiagptr is executed when maintenance is required. Since entries in transmit status FIFO 408 are the most time-critical, routine xfesact is executed 50 times, via execution blocks 2089 and 2090, and decision block 2091, for each time that routines rfesact, chdiagptr and chcmdact are executed.

The routine rfesact reads receive status FIFO 403 via execution block 2011 and determines if the FIFO entry is a data or control entry, via decision block 2012. If it is a control entry, rcontact is executed via execution block 2013; if it is a data entry, rdataact is executed via execution block 2014.

The routine rcontact is takes action when the end of a frame is received. Routine rcontact checks for parity error via decision block 2017; if there is no parity error, it continues with the next test. If there is a parity error, routine rcontact determines whether channel status FIFO 508 is full via execution block 2018 and decision block 2019. If the FIFO is full, routine rcontact generates an interrupt via execution block 2021; if the FIFO is not full, the routine places an error message into channel status FIFO 508 via execution block 2020. Routine rcontact then checks whether the receive portion of data subscriber interface 104 has been disabled, via decision block 2022. If the receive portion has been disabled, routine contact returns; if the receive portion has not been disabled, the routine determines whether the end of the frame has been received, via decision block 2024. If the end of the frame was not-received, routine rcontact calls routine rccact, which is described later, via execution block 2025, and returns. If the end of the frame was received, routine rcontact writes the frame length into the receive buffer via execution block 2026 and clears bits in shared memory 506 and receive command memory 402 via execution block 2027. Routine rcontact then checks whether the frame received had bad CRC, via decision block 2028. If bad CRC was received, routine rbadcrc is executed via execution block 2029. Routine rbadcrc sends an error message that notifies main processor 225 that a frame with bad CRC has been received. if bad CRC was not sent, routine rcontact checks whether the received frame had a non-integer number of bytes, via decision block 2030. If a non-integer number of bytes was sent, routine nonint is executed via execution block 2031; if a non-integer number of bytes was not sent, routine gpktrcvd is executed via execution block 2032. Routine nonint sends an error message that informs main processor 225 that a frame with a non-integer number of bytes was received. Routine gpktrcvd sends the good packet received indiction and the length of the packet to main processor 225.

Routine rccact decodes the contents of receive status FIFO 403 when it contains a special event, such as an idle, abort, or sync hunt. Routine rccact determines the type of special event via decision blocks 2035, 2037, 2039, and 2041, and causes the appropriate routine to execute, via execution blocks 2036, 2038, 2040, and 2042. Routine rabtrout informs main processor 225 that an abort indication has been received from a specific customer. Routine ridlrout informs main processor 225 that an idle sequence has been received from a specific customer. Routine sfrout informs main processor 225 that a flag character has been found on a specific customer line, providing a previous synchronization hunt for the specific customer was initiated by main processor 225. Routine rorrout informs main processor 225 that receive status FIFO 403 was full, and the frame received from the associated customer was lost.

If none of the expected special events are present in receive status FIFO 403, routine rccact concludes that the FIFO contains an illegal message, via execution block 2043. Routine rccact then determines whether channel status FIFO 508 is full, via execution block 2044 and decision block 2045. If channel status FIFO 508 is full, routine rccact generates an interrupt via execution block 2046; if the FIFO is not full, routine rccact places an error message into channel status FIFO 508 via execution block 2047.

The routine rdataact writes data into the receive buffer via direct memory access. Additionally, rdataact determines whether there is a valid buffer, and whether the valid buffer is long enough to receive the data. Routine rdataact determines whether there is a valid buffer, via decision block 2050. If there is a valid buffer, routine rccact determines whether the buffer is long enough to receive the data, via decision block 2051, and causes either routine rcvbyte or bfover to execute via execution blocks 2052 and 2053. Routine rcvbyte writes the data byte into main memory 211 via direct memory access. Routine bfover sends a buffer overflow error message to main processor 225. If there is no valid buffer, routine rdataact determines whether the line has been disabled by main processor 225 via decision block 2054. If the receiver has been disabled, routine rdataact returns; if the receiver has not been disabled, routine rdataact determines whether there is a pointer available in the receive buffer, via decision block 2092. If there is a pointer available, rdataact causes routine rbopkt to execute via execution block 2055. Routine rbopkt writes the first byte of the packet into main memory 211 and sends a first byte received message to main processor 225. If there is no pointer available, routine rdataact sends an error message to main processor 225 and causes routine rdisact to execute, via execution blocks 2093 and 2094. Routine rdisact disables the receiver for the specified customer.

Routine chcmdact reads commands from channel command FIFO 507 sets up appropriate registers, and branches to the appropriate routine, depending on the command. The possible commands are as follows: transmit a packet, set up to receive a packet, special transmit related command, special receive related command, loop-around, unloop, FIFO communication test command, maintenance command, and set up system parameter command.

Routine chcmdact reads channel command FIFO 507 via execution block 2058 and determines whether it contains a normal transmit, normal receive, extended transmit, or extended receive command, via decision blocks 2059, 2061, 2063, and 2065. It then branches to the appropriate routine, xcmdact, rcmdact, xcmdec, or rcmdec, via execution blocks 2060, 2062, 2064, and 2066. Routine xcmdact determines whether there is a frame currently being transmitted on the customer channel. If there is a frame currently being transmitted, routine xcmdact sends an error message to main processor 225; if there is no frame currently being transmitted, routine xcmdact writes the first byte of the message into transmit command memory 407. Routine rcmdact commands formatter 207 to search for a flag pattern for a specific customer. Routines xcmdec and rcmdec are described later in FIGS. 29 and 30.

If channel command FIFO 507 does not contain regular or extended transmit or receive commands, routine chcmdact determines if channel command FIFO 507's first entry is a communication test pattern 1, via decision block 2068. If it is a communication test pattern 1, routine chcmdact determines whether channel status FIFO 508 is full, via execution block 2069 and decision block 2070. If the FIFO is not full, routine chcmdact echoes the test pattern 1 contained in channel command FIFO 507 to main processor 225, via execution block 2071, and returns. If the FIFO is full, routine chcmdact generates an interrupt via execution block 2072 and returns.

If the entry in channel command FIFO 507 is not a communication test pattern 1, routine chcmdact determines whether the entry in the FIFO is a communication test pattern 2 via decision block 2074. If it is a communication test pattern 2, routine chcmdact determines whether channel status FIFO 508 is full, via execution block 2075 and decision block 2076. If the FIFO is not full, routine chcmdact echoes the test pattern 2 contained in channel command FIFO 508 to main processor 211, via execution block 2077, and returns. If the FIFO is full, routine chcmdact generates an interrupt via execution block 2078 and returns.

If the entry in channel command FIFO 507 is not a communication test pattern, routine chcmdact determines whether the FIFO contains a maintenance command, via decision block 2080. If the FIFO does contain a maintenance command, routine chcmdact executes routine mtnact, via execution block 2081. Routine mtnact decodes the maintenance command and executes the appropriate maintenance routine. If FIFO 507 does not contain a maintenance command, routine chcmdact determines whether FIFO 507 contains a system set-up parameter command, via decision block 2082. If the FIFO does contain a system set-up parameter command, routine chcmdact executes routine sysact, via execution block 2083. Routine sysact decodes the system parameter type, and stores the value in system memory. If FIFO 507 does not contain a system set-up parameter command, routine chcmdact concludes that there is an illegal channel command and determines whether channel status FIFO 508 is full, via execution block 2084 and decision block 2085, and generates an interrupt if it is full, via execution block 2087; or writes an illegal command error message into the FIFO if it is not full via execution block 2086. Routine chcmdact then returns.

Routine xcmdec decodes the extended transmit command from main processor 225 and takes the appropriate special action, as follows: abort the current frame, send idle to a specific customer, send a flag pattern to a specific customer, send bad CRC, or send one occurrence of bad parity.

Routine xcmdec reads the transmit extension register portion of shared memory 508, via execution block 2102, and determines the command type via decision blocks 2103, 2105, and 2107, and then branches to the appropriate routine, xabtact, xidleact, or xuidlact via execution blocks 2104, 2106, and 2108. Routine xabtact commands formatter 207 to abort the frame in progress for a specific customer. Routine xidleact commands formatter 207 to send an idle indication to a specific customer. If formatter 207 is currently processing a frame for the specific customer, routine xidleact sends an error message to main processor 209. Routine xuidlact commands formatter 207 to send a flag pattern to a specific customer. If the extension command is not abort, idle, or unidle, routine xcmdec determines if the extension command is send bad CRC, via decision block 2109. If the extension command is send bad CRC, a send bad CRC command is sent to transmit command memory 407, via execution block 2110, and routine xcmdec returns to routine xcmdact via execution block 2111. If the extension command is not send bad CRC, routine xcmdec determines if the extension command is send bad parity, via decision block 2112. If the extension command is send bad parity, routine xcmdec sends this indication to transmit command memory 407 via execution block 2113, and returns. If the extension command is not send bad parity, routine xcmdec concludes that there is no meaningful extended transmit command and determines whether channel status FIFO 508 is full, via execution block 2114 and decision block 2115, and generates an interrupt if it is full, via execution block 2116, or sends an error message to main processor 225 if it is not full, via execution block 2117.

Routine rcmdec decodes the extended receive command from main processor 225 and takes the appropriate special action, as follows sync hunt, disable receiver for specific line circuit, remove sync hunt for a specific line circuit, change parity error reporting scheme for a specific customer line, loop the receiver for a specific line circuit, unloop the receiver for a specific line circuit, or force a line circuit to receive a non-integer number of bytes frame.

Routine rcmdec determines the extension command type via execution block 2120 and decision blocks 2121, 2123, 2125, 2127, 2129, 2131, or 2133, and executes the appropriate routine rdisact, shact, rshact, parchact, loopact, unloop, or tnintact, via execution blocks 2122, 2124, 2126, 2128, 2130, 2132, or 2134. Routine rdisact disables the receive portion of formatter 207 for a specific customer. Routine shact commands formatter 207 to search for a flag pattern for a specific customer. Routine rshact commands formatter 207 to stop searching for a flag pattern for a specific customer. Routine parchact commands formatter 207 to change the parity error reporting scheme for a specific line circuit. Routine loopact commands formatter 207 to put a specific line circuit into the loop mode. If formatter 207 is currently processing a frame, an error message is sent to main processor 225, and the command is not executed. Routine unloop commands formatter 207 to remove a previous loop mode command for a specific line circuit. If formatter 207 is currently processing a frame for the specific customer, an error message is sent to main processor 225, and the command is not executed. Routine tnintact causes formatter 207 to receive one frame with a non-integer number of bytes.

If the receive extension does not contain a command previously described, routine rcmdec determines whether channel status FIFO 508 is full, via execution block 2135 and decision block 2136 and generates an interrupt via execution block 2137 if the FIFO is full, or sends an error message, via execution block 2138, to main processor 225 if the FIFO is not full. Routine rcmdec then returns.

Routine xfesact reads transmit status FIFO 408, via execution block 2141, and determines, via decision block 2142, whether it contains a data byte. It then branches to either routine xundact or xbyteact, via execution blocks 2143 or 2144, and returns.

Routine xbyteact sends a data byte to formatter 207 for transmission. Additionally, at the end of the frame, it commands formatter 207 to send either good or bad CRC, and informs main processor 225 that a data frame has been transmitted.

Routine xbyteact determines whether there is a transmission in progress via decision block 2147. If there is no transmission in progress, routine xbyteact determines whether there is an abort, via decision block 2157. If there is an abort, routine xbyteact returns; if there is no abort, the routine determines whether channel status FIFO 508 is full, via execution block 2158 and decision block 2159. If FIFO 508 is full, routine xbyteact generates an interrupt via execution block 2160; if the FIFO is not full, routine xbyteact writes an error message into FIFO 508 via execution block 2161. Routine xbyteact then returns.

If there is a transmission in progress, routine xbyteact determines whether the current byte count is equal to the total byte count of the frame, via execution block 2148. If the current byte count is not equal to the total byte count, routine xmitbyte is executed via execution block 2149. Routine xmitbyte writes a byte from main memory 211 to a specific customer location in transmit command memory 407. If the current byte count is equal to the total byte count, routine xbyteact determines whether the last byte bit has been set, via decision block block 2150. If the last byte bit has been set, routine xbyteact executes routine gpkxmtd via execution block 2151. Routine gpkxmtd informs main processor 225 that a packet has been successfully transmitted to a specific customer. If the last byte bit has not been set, it is then set via execution blocks 2152 through 2154. Routine xbyteact then determines whether the send bad CRC bit has been set via decision block 2155. If it has been set, routine sbadcrc is executed via execution block 2156; if it has not been set, routine sgoodcrc is executed via execution block 2162. Routine sbadcrc commands formatter 207 to send bad CRC to a specific customer. Routine sgoodcrc commands formatter 207 to send good CRC to a specific customer.

Routine xundact reads transmit status FIFO 408, via execution block 2165, and determines whether the message is a transmit abort acknowledge or a transmit under-run, via decision block 2166. If the message is transmit abort acknowledge, routine xabtact is executed, via execution block 2167. Routine xabtact removes the transmit abort bit in transmit command memory 407 for a specific customer. If the message is not a transmit abort acknowledgement, routine xundact determines whether the current number of under-runs is equal to the maximum allowed number of under-runs via execution block 2168 and decision block 2169. If the current number is equal, xundact generates an error message to main processor 225, via execution block 2170. If the number is not equal, routine xundact executes xundrun via execution block 2171. Routine xundrun notifies main processor 225 that a transmit under-run has occurred, and retransmits the current frame.

Figure 35:
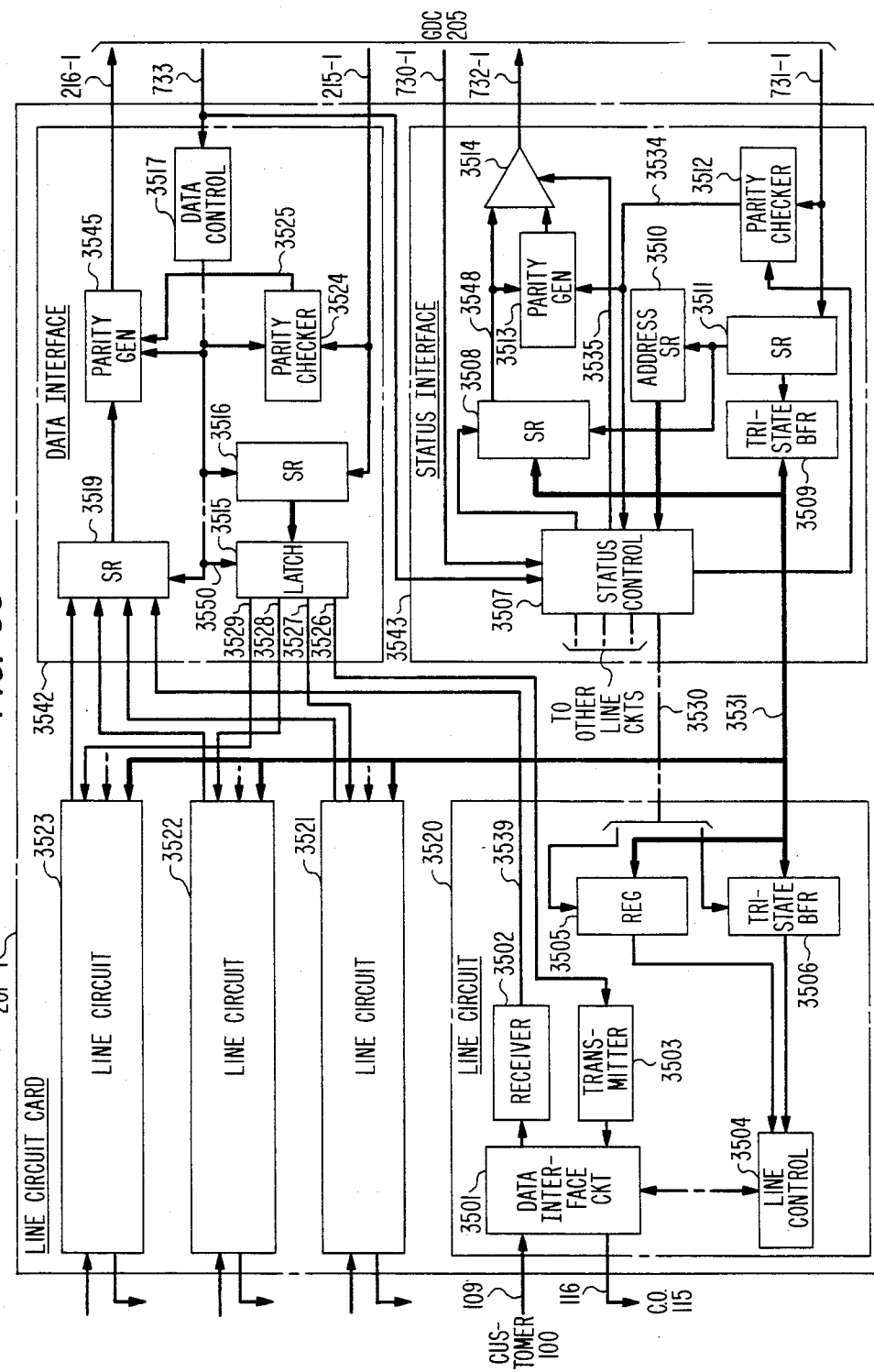
FIG. 35 is a detailed block diagram of line circuit card 201-1.

Line circuit card 201-1 is shown in greater detail in FIG. 35. The other line circuit cards are identical to line circuit card 201-1. Line circuit card 201-1 comprises four identical line circuits, 3520 through 3523, data interface 3542, and status interface 3543. Data interface 3542 receives data and parity bits from and transmits data and parity bits to group distributor circuit 205, and transmits data bits to and receives data bits from the appropriate line circuits 3520 through 3523. Similarly, status interface 3542 receives control and parity bits from and transmits control, status, and parity bits to group distributor circuit 205, and transmits these bits to and receives these bits from the appropriated line circuit 3520 through 3523. Each line circuit receives data and control bits from data interface 3542 and status interface 3543. Each line circuit contains a data interface circuit, such as data interface circuit 3501. Data interface circuit 3501 uses a specialized loop carrier that uses a data over voice scheme, thus providing full voice and synchronous data transmission over non-loaded loops. This is done by splitting the customer loop into two sections, so that the section from the customer to line circuit 3520 carries both data and voice, while the section from line circuit 3520 to central office 115 carries only voice. The data from line circuit 3520 to the customer is frequency modulated at approximately 76 kHz; the data from the customer to line circuit 3520 is frequency modulated at approximately 28 kHz. Voice is transmitted at normal voice frequencies.

Consider the transfer of data from formatter 207 to line circuit card 201-1, via group distributor circuit 205. Data from group distributor circuit 205 is received, in groups of four sequential bits at a time, on conductor 215-1, and is shifted into register 3516, under control of data control 3517. Data control 3517 and status control 3507 receive the appropriate timing signals from group distributor circuit 205 via conductor 733. Parity checker 3524 checks the parity of the incoming data bits, and reports parity errors to data control 3517 via conductor 3525. After all four bits have been shifted into shift register 3516, data control 3517 operates latch 3515, via conductor 3550; this causes one bit to be transferred to each line circuit, via conductors 3526 through 3529. For example, the data bit on conductor 3526 is forwarded to transmitter 3503, which transmits the bit to its associated customer via data interface circuit 3501 and cable 109.

The data from the associated customer is received on cable 109 and is forwarded, via data interface circuit 3501, to receiver 3502. Under control of data control 3517 the data is shifted into register 3519 and, at the appropriate time, the data is shifted out of register 3519 to group distributor circuit 205, via parity generator 3545 and conductor 216-1. Parity generator 3545 is responsive to the data bits to properly append the correct parity to the end of the data.

Consider the transfer of control and status information from control buffer 208 to line circuit card 201-1, via group distributor circuit 205. Control bits, including two bits of address information, are transmitted to line circuit card 201-1 via conductor 731-1. Shift register 3511 and address register 3510 receive the control and address bits under control of status control 3507. Status control 3507 is responsive to the address bits contained in address register 3510 to select the appropriate line circuit 3520 through 3523. Assuming that line circuit 3520 is the selected line circuit, status control 3507 transmits the contents of shift register 3511 to register 3505 via tristate buffer 3509 and cable 3531. This is done by status control 3510 placing a write command on control cable 3530. After the eight bits have been transferred to register 3505, status control 3507 conditions tristate buffer 3506 to transmit the status bits of line control 3504 to shift register 3508, via cable 3531. This is done by status control 3507 transmitting a read command to tristate buffer 3506 via control cable 3530, and simultaneously disabling tristate buffer 3509. The most significant bit of the status bits is always a "1" so that error check circuit 715 can properly detect transmissions by unselected line circuit cards. After the status information has been loaded into shift register 3508, status control 3507 causes shift registers 3508 and 3511 to begin shifting. This shifting causes register 3511 to shift into the least significant bit position of register 3508, causing the data in shift registers 3508 and 3511 to be concatenated. This data is then transmitted to group distributor circuit 205 via conductor 732-1 and data selector 3514, which is controlled by status control 3507, via conductor 3535.

Parity generation and checking of status and control information is done in the following manner. As control bits are received on conductor 731-1, parity checker 3512 determines whether odd or even parity has been transmitted by group distributor circuit 205; parity checker 3512 then informs parity generator 3513 and status control 3507 what sense of parity has been transmitted, via a signal on conductor 3534. Parity generator 3513 is conditioned by the signal on conductor 3534 to transmit to group distributor circuit 205 the same sense of parity that was received from group distributor circuit 205. Parity generator 3513 receives the contents of shift register 3508 via conductor 3548 and generates parity for the concatenated contents of registers 3511 and 3508 as the contents of these registers are transmitted to group distributor circuit 205. After the contents of registers 3511 and 3508 have been transmitted, the generated parity from parity generator 3513 is transmitted to group distributor circuit 205, via conductor 732-1, under control of status control 3507. This is done by status control 3507 properly selecting the output of parity generator 3513, by properly conditioning data selector 3514.

It is to be understood that the above-described embodiment is merely illustrative of the principles of the invention and that other arrangements may be devised by those skilled in the art without departing from the spirit and scope of the invention.

What is claimed is:

1. In a packet communication system having a plurality of customer interface units, a loop-around arrangement comprising
    means responsive to a receipt of bit signals from said units for forming said bit signals into receive byte signals associated with individual ones of said units;
    means responsive to a receipt of transmit byte signals associated with individual ones of said units for disassembling said transmit byte signals into transmit bit signals;
    means storing each of the transmit bit signals in association with individual ones of said units;
    means responsive to a receipt of a loop signal for accessing the stored transmit bit signals associated with one of said units to transfer the accessed transmit bit signals to said forming means; and
    said forming means being further responsive to said transferred transmit bit signals for forming the transferred transmit bit signals into looped byte signals.

2. The arrangement of claim 1 wherein said forming means further comprises control storage means having a plurality of memory locations each associated with an individual one of said units;
    means for storing said loop signal in one of said memory locations associated with said one of said units;
    means operative during a formation of said receive byte signals associated with said one of said units for accessing said one of said memory locations to readout said stored loop signal; and
    said stored transmit bit accessing means comprises means responsive to said readout loop signal for selecting said accessed transmit bit signals for transfer to said forming means.

3. The arrangement of claim 2 wherein said control storage means being further responsive to another loop signal associated with another one of said units for storing said other loop signal in another one of said memory locations associated with said other one of said units;
    said readout loop signal accessing means being further operative during a formation of the receive byte signals associated with said other one of said units for accessing said other one of said memory locations to readout said other stored loop signal;
    said transmit bit accessing means being further responsive to said other loop signal for accessing the other transmit bit signals associated with said other one of said units; and
    said selecting means being further responsive to said other loop signal for selecting said other accessed transmit bit signals for use by said forming means.

4. In a packet communication system having a plurality of customer terminals interconnected via customer interface units, a loop-around testing arrangement comprising main processor means and multiline protocol formatter means, said formatter means comprising means responsive to a receipt of bit signals from said units for forming the receive bit signals into receive byte signals associated with individual ones of said units;

formatter processor means responsive to said receive byte signals for assembling receive packets each associated with said individual ones of said units for transfer to said main processor means;

said main processor means operative for transferring data, packets to said formatter processor means;

said formatter processor means further comprises means responsive to said data packets for disassembling said data packets into transmit byte signals each associated with said individual ones of said units:

means responsive to said transmit byte signals for disassembling said transmit byte signals into transmit bit signals for transmission to said units;

means storing each of the transmitted transmit bit signals in association with individual ones of said units;

said main processor means being further operative to transfer a test packet associated with one of said units to said packet disassembling means via said formatter processor means;

said formatter processor means being further responsive to said test packet for generating a loop signal for transmission;

means responsive to said transmitted loop signal for accessing said stored transmit bit signals associated with said one of said units to transfer said accessed transmit bit signals to said forming means;

said forming means being further responsive to said transferred transmit bit signals for forming said transferred transmit bit signals into looped byte signals and to transfer the latter to said formatter processor means;

said formatter processor means being further responsive to said looped byte signals for reforming the latter into a reformed test packet for transmission to said main processor means; and said main processor means being further responsive to said reformed test packet for determining the integrity of said formatter means.

5. The arrangement of claim 4 wherein said forming means further comprises control storage means having a plurality of memory locations each associated with an individual one of said units;

means for storing said loop signal in one of said memory locations associated with said one of said units;

means operative during a formation of said receive byte signals associated with said one of said units for accessing said one of said memory locations to readout said stored loop signal; and said transmit bit accessing means comprises means responsive to said readout loop signal for selecting said accessed transmit bit signals for transfer to said forming means.

6. The arrangement of claim 5 wherein said main processor means being further operative to transfer another test packet associated with another one of said units to said disassembling means via said formatter processor means;

said formatter processor means being further responsive to said other test packet for transmitting to said forming means another loop signal;

said control storage means being further responsive to said other loop signal for storing the latter in another one of said memory locations associated with said other one of said units;

said readout loop signal accessing means being further operative during a formation of the receive byte signals associated with said other one of said units for accessing said other one of said memory locations to readout said other stored loop signal;

said transmit bit accessing means being further responsive to said other loop signal for accessing the other transmit bit signals associated with said other one of said units; and said selecting means being further responsive to said other loop signal for selecting said other accessed transmit bit signals for transfer to said forming means.

7. In a packet communication system having a plurality of customer interface units each connected via a transmission link to a customer terminal, a loop around test arrangement for a plural line protocol formatter for use in said packet communication system comprising means responsive to a receipt of byte signals associated with individual ones of said units for disassembling said byte signals into transmit bit signals for transmission to said units;

means storing each of the transmit bit signals in association with an individual one of said units;

means responsive to a receipt of bit signals from one of said units for forming said receive bit signals into receive byte signals associated with individual ones of said units;

processor means responsive to a receipt of a test packet associated with one of said units for disassembling said test packet into test byte signals for transfer to said disassembling means;

said processor means being further responsive to said receipt of said test packet for generating a loop signal for transmission to said forming means;

means responsive to a receipt of said loop signal for accessing the stored transmitted transmit test bit signals in said transmit bit storing means for transfer to said forming means; and said forming means being further responsive to said transferred transmit bit signals for reforming said transferred transmit bit signals into reformed test byte signals for transmission to said processor means.

8. The arrangement of claim 7 wherein said forming means further comprises control storage means having a plurality of memory locations each associated with an individual one of said units;

means for storing said loop signal in one of said memory locations associated with said one of said units;

means operative during a formation of said receive byte signals associated with said one of said units for accessing said one of said memory locations to readout said stored loop signal; and said transmit bit accessing means comprises means responsive to said readout loop signal for selecting said accessed transmit bit signals for transfer to said forming means.

9. The arrangement of claim 8 wherein said control storage means being further responsive to another loop signal associated with another one of said units for storing said other loop signal in another one of said memory locations associated with said other one of said units;

said stored loop signal accessing means being further operative during a formation of the receive byte signals associated with said other one of said units for accessing said other one of said memory locations to readout said other stored loop signal;

said transmit bit accessing means being further responsive to said other loop signal for accessing the other transmit bit signals associated with said other one of said units; and said selecting means being further responsive to said other loop signal for selecting said other accessed transmit bit signals for use by said forming means.

10. A method for testing a packet communication system comprising a first processor, a second processor, and a formatter circuit connectable to a plurality of customer interface units which in turn are connected via said lines to customer terminals and said formatter circuit having a receive means for receiving bit signals from said units to form said receive bit signals into receive byte signals associated with individual ones of said units and a transmit means responsive to transmit byte signals associated with individual ones of said units and received from said second processor means for disassembling said transmit byte signals into transmit bit signals for transmission to said units, said method comprising the steps of storing each of said transmit bit signals in association with individual ones of said units in a storing means after transmitting each of said transmit bit signals to said units;

generating a test packet associated with one of said units to test said formatter circuit by said first processor means for transfer to said second processor;

generating a loop signal in response to said test packet received from said first processor means by said second processor means to indicate that packets associated with said one of said units are to be looped;

disassembling said test packet into test byte signals by said second processor for transfer of said test byte signals to said transmit means;

transferring the stored test transmit bit signals from said storing means to said receive means in response to said loop signal;

forming said transferred test transmit bit signals into reformed test byte signals for transfer to said second processor means;

reforming said reformed test byte signals into a reformed test packet for transmission to said first processor means; and determining that said reformed test packet contains the same data as said test packet by said first processor means thus assuring the integrity of said formatter circuit.

11. The method of claim 10 wherein said receive means further comprises a control storage means having a plurality of memory locations each associated with an individual one of said units and said step of generating said loop signal comprises the step of storing said loop signal in the one of said memory locations associated with said one of said units; and accessing said loop signal during the time for the forming of the receive byte associated with said one of said units for reading out said loop signal; and selecting said test transmit bits for use by said receive means in reforming said test packet in response to said readout loop signal.

* * * * *